(12) United States Patent
Jackson

(10) Patent No.: US 12,120,040 B2
(45) Date of Patent: Oct. 15, 2024

(54) ON-DEMAND COMPUTE ENVIRONMENT

(71) Applicant: III Holdings 12, LLC, Wilmington, DE (US)

(72) Inventor: David Brian Jackson, Spanish Fork, UT (US)

(73) Assignee: III Holdings 12, LLC, Wilmington, DE (US)

( * ) Notice: Subject to any disclaimer, the term of this patent is extended or adjusted under 35 U.S.C. 154(b) by 0 days.

(21) Appl. No.: 17/722,076

(22) Filed: Apr. 15, 2022

(65) Prior Publication Data

US 2022/0247694 A1    Aug. 4, 2022

Related U.S. Application Data

(63) Continuation of application No. 14/827,927, filed on Aug. 17, 2015, now Pat. No. 11,356,385, which is a
(Continued)

(51) Int. Cl.
  *G06F 15/16* (2006.01)
  *G06F 9/50* (2006.01)
  (Continued)

(52) U.S. Cl.
  CPC .......... *H04L 47/80* (2013.01); *G06F 9/5027* (2013.01); *G06F 9/5061* (2013.01); *G06F 9/5072* (2013.01); *G06F 9/5077* (2013.01); *G06Q 10/06* (2013.01); *H04L 47/70* (2013.01); *H04L 67/10* (2013.01); *H04L 67/1001* (2022.05); *H04L 67/125* (2013.01); *G06F 11/2038* (2013.01);
  (Continued)

(58) Field of Classification Search
  CPC ..... H04L 47/80; H04L 67/1001; H04L 47/70; H04L 67/10; H04L 67/125; G06F 9/5027; G06F 9/5061; G06F 9/5072; G06F 9/5077; G06F 11/2038; G06F 15/173; G06F 2209/5014; G06F 2209/509; G06Q 10/06; G08C 17/00
  USPC ....................................................... 709/226
  See application file for complete search history.

(56) References Cited

U.S. PATENT DOCUMENTS

| 4,215,406 A | 7/1980 | Gomola et al. |
| 4,412,288 A | 10/1983 | Herman |

(Continued)

FOREIGN PATENT DOCUMENTS

| CA | 2496783 | 3/2004 |
| DE | 60216001 | 7/2007 |

(Continued)

OTHER PUBLICATIONS

US 7,774,482 B1, 08/2010, Szeto et al. (withdrawn)
(Continued)

*Primary Examiner* — Oleg Survillo
(74) *Attorney, Agent, or Firm* — Crowell & Moring LLP

(57) ABSTRACT

An on-demand compute environment comprises a plurality of nodes within an on-demand compute environment available for provisioning and a slave management module operating on a dedicated node within the on-demand compute environment, wherein upon instructions from a master management module at a local compute environment, the slave management module modifies at least one node of the plurality of nodes.

32 Claims, 9 Drawing Sheets

Related U.S. Application Data continuation of application No. 13/758,164, filed on Feb. 4, 2013, now Pat. No. 9,112,813, which is a continuation of application No. 12/752,622, filed on Apr. 1, 2010, now Pat. No. 8,370,495, which is a continuation of application No. 11/276,856, filed on Mar. 16, 2006, now Pat. No. 7,698,430.

(60) Provisional application No. 60/662,240, filed on Mar. 16, 2005.

(51) Int. Cl.
| | | |
|---|---|---|
| *G06Q 10/06* | (2023.01) | |
| *H04L 47/70* | (2022.01) | |
| *H04L 47/80* | (2022.01) | |
| *H04L 67/10* | (2022.01) | |
| *H04L 67/1001* | (2022.01) | |
| *H04L 67/125* | (2022.01) | |
| *G06F 11/20* | (2006.01) | |
| *G06F 15/173* | (2006.01) | |
| *G08C 17/00* | (2006.01) | |

(52) U.S. Cl.
CPC .... *G06F 15/173* (2013.01); *G06F 2209/5014* (2013.01); *G06F 2209/509* (2013.01); *G08C 17/00* (2013.01)

(56) References Cited

U.S. PATENT DOCUMENTS

| | | |
|---|---|---|
| 4,525,780 A | 6/1985 | Bratt et al. |
| 4,532,893 A | 8/1985 | Day et al. |
| 4,542,458 A | 11/1985 | Kitajima |
| 4,553,202 A | 11/1985 | Trufyn |
| 4,677,614 A | 6/1987 | Circo |
| 4,850,891 A | 7/1989 | Walkup et al. |
| 4,852,001 A | 7/1989 | Tsushima et al. |
| 4,943,932 A | 7/1990 | Lark et al. |
| 4,975,840 A | 12/1990 | DeTore |
| 4,992,958 A | 2/1991 | Kageyama |
| 5,012,409 A | 4/1991 | Fletcher |
| 5,056,070 A | 10/1991 | Shibuya |
| 5,084,696 A | 1/1992 | Guscott |
| 5,132,625 A | 7/1992 | Shaland |
| 5,146,561 A | 9/1992 | Carey et al. |
| 5,168,441 A | 12/1992 | Onarheim |
| 5,175,800 A | 12/1992 | Galis et al. |
| 5,233,533 A | 8/1993 | Edstrom |
| 5,257,374 A | 10/1993 | Hammer et al. |
| 5,274,809 A | 12/1993 | Iwasaki |
| 5,276,877 A | 1/1994 | Friedrich |
| 5,299,115 A | 3/1994 | Fields et al. |
| 5,307,496 A | 4/1994 | Ichinose et al. |
| 5,325,526 A | 6/1994 | Cameron et al. |
| 5,349,682 A | 9/1994 | Rosenberry |
| 5,355,508 A | 10/1994 | Kan |
| 5,377,332 A | 12/1994 | Entwistle et al. |
| 5,408,663 A | 4/1995 | Miller |
| 5,451,936 A | 9/1995 | Yang et al. |
| 5,465,328 A | 11/1995 | Dievendorff |
| 5,469,566 A | 11/1995 | Hohenstein |
| 5,473,773 A | 12/1995 | Aman et al. |
| 5,477,546 A | 12/1995 | Shibata |
| 5,495,533 A | 2/1996 | Linehan et al. |
| 5,504,894 A | 4/1996 | Ferguson et al. |
| 5,542,000 A | 7/1996 | Semba |
| 5,550,970 A | 8/1996 | Cline et al. |
| 5,594,901 A | 1/1997 | Andoh |
| 5,594,908 A | 1/1997 | Hyatt |
| 5,598,536 A | 1/1997 | Slaughter et al. |
| 5,600,844 A | 2/1997 | Shaw et al. |
| 5,623,641 A | 4/1997 | Kadoyashiki |
| 5,623,672 A | 4/1997 | Popat |
| 5,651,006 A | 7/1997 | Fujino et al. |
| 5,652,841 A | 7/1997 | Nemirovsky et al. |
| 5,666,293 A | 9/1997 | Metz |
| 5,675,739 A | 10/1997 | Eilert et al. |
| 5,701,451 A | 12/1997 | Rogers et al. |
| 5,729,754 A | 3/1998 | Estes |
| 5,732,077 A | 3/1998 | Whitehead |
| 5,734,818 A | 3/1998 | Kern et al. |
| 5,737,009 A | 4/1998 | Payton |
| 5,745,694 A | 4/1998 | Egawa |
| 5,752,022 A | 5/1998 | Chiu |
| 5,752,030 A | 5/1998 | Konno et al. |
| 5,757,771 A | 5/1998 | Li |
| 5,761,433 A | 6/1998 | Billings |
| 5,761,475 A | 6/1998 | Yung |
| 5,761,484 A | 6/1998 | Agarwal et al. |
| 5,765,146 A | 6/1998 | Wolf |
| 5,774,660 A | 6/1998 | Brendel et al. |
| 5,774,668 A * | 6/1998 | Choquier ............ H04L 67/1008 709/227 |
| 5,781,187 A | 7/1998 | Gephardt et al. |
| 5,781,624 A | 7/1998 | Mitra et al. |
| 5,787,000 A | 7/1998 | Lilly |
| 5,787,459 A | 7/1998 | Stallmo et al. |
| 5,799,174 A | 8/1998 | Muntz et al. |
| 5,801,985 A | 9/1998 | Roohparvar et al. |
| 5,826,080 A | 10/1998 | Dworzecki |
| 5,826,082 A | 10/1998 | Bishop et al. |
| 5,826,236 A | 10/1998 | Narimatsu et al. |
| 5,826,239 A | 10/1998 | Du et al. |
| 5,828,743 A | 10/1998 | Pinnell |
| 5,828,888 A | 10/1998 | Kozaki et al. |
| 5,832,517 A | 11/1998 | Knutsen, II |
| 5,854,887 A | 12/1998 | Kindell et al. |
| 5,862,478 A | 1/1999 | Cutler, Jr. et al. |
| 5,867,382 A | 2/1999 | McLaughlin |
| 5,874,789 A | 2/1999 | Su |
| 5,881,238 A | 3/1999 | Aman et al. |
| 5,901,048 A | 5/1999 | Hu |
| 5,908,468 A | 6/1999 | Hartmann |
| 5,911,143 A | 6/1999 | Deinhart et al. |
| 5,913,921 A | 6/1999 | Tosey |
| 5,918,017 A | 6/1999 | Attanasio et al. |
| 5,920,545 A | 7/1999 | Raesaenen et al. |
| 5,920,863 A | 7/1999 | McKeehan et al. |
| 5,926,798 A | 7/1999 | Carter |
| 5,930,167 A | 7/1999 | Lee et al. |
| 5,933,417 A | 8/1999 | Rottoo |
| 5,935,293 A | 8/1999 | Detering et al. |
| 5,950,190 A | 9/1999 | Yeager |
| 5,956,715 A | 9/1999 | Glasser |
| 5,958,003 A | 9/1999 | Preining et al. |
| 5,961,599 A | 10/1999 | Kalavade et al. |
| 5,963,911 A | 10/1999 | Walker |
| 5,968,176 A | 10/1999 | Nessett et al. |
| 5,971,804 A | 10/1999 | Gallagher et al. |
| 5,978,356 A | 11/1999 | Elwalid et al. |
| 5,987,611 A | 11/1999 | Freund |
| 6,003,061 A * | 12/1999 | Jones ................. G06F 9/50 718/104 |
| 6,006,192 A | 12/1999 | Cheng et al. |
| 6,012,052 A | 1/2000 | Altschuler et al. |
| 6,021,425 A | 2/2000 | Waldron, III et al. |
| 6,032,224 A | 2/2000 | Blumenau |
| 6,052,707 A | 4/2000 | D'Souza |
| 6,055,618 A | 4/2000 | Thorson |
| 6,058,416 A | 5/2000 | Mukherjee et al. |
| 6,067,545 A | 5/2000 | Wolff |
| 6,076,174 A | 6/2000 | Freund |
| 6,078,953 A | 6/2000 | Vaid et al. |
| 6,079,863 A | 6/2000 | Furukawa |
| 6,085,238 A | 7/2000 | Yuasa et al. |
| 6,088,718 A | 7/2000 | Altschuler et al. |
| 6,092,178 A | 7/2000 | Jindal et al. |
| 6,094,712 A | 7/2000 | Follett |
| 6,097,882 A | 8/2000 | Mogul |
| 6,098,090 A | 8/2000 | Burns |
| 6,101,508 A | 8/2000 | Wolff |
| 6,105,117 A | 8/2000 | Ripley |

(56) References Cited

U.S. PATENT DOCUMENTS

| | | | |
|---|---|---|---|
| 6,108,662 A | 8/2000 | Hoskins et al. | |
| 6,115,382 A | 9/2000 | Abe | |
| 6,122,664 A | 9/2000 | Boukobza | |
| 6,141,214 A | 10/2000 | Ahn | |
| 6,151,598 A | 11/2000 | Shaw et al. | |
| 6,154,778 A | 11/2000 | Koistinen et al. | |
| 6,161,170 A | 12/2000 | Burger et al. | |
| 6,167,445 A | 12/2000 | Gai et al. | |
| 6,175,869 B1 | 1/2001 | Ahuja et al. | |
| 6,181,699 B1 | 1/2001 | Crinion et al. | |
| 6,182,139 B1 | 1/2001 | Brendel et al. | |
| 6,182,142 B1 | 1/2001 | Win et al. | |
| 6,185,272 B1 | 2/2001 | Hiraoglu | |
| 6,185,575 B1 | 2/2001 | Orcutt | |
| 6,185,601 B1 | 2/2001 | Wolff | |
| 6,189,111 B1 | 2/2001 | Alexander | |
| 6,192,414 B1 | 2/2001 | Horn | |
| 6,195,678 B1 | 2/2001 | Komuro | |
| 6,198,741 B1 | 3/2001 | Yoshizawa et al. | |
| 6,201,611 B1 | 3/2001 | Carter et al. | |
| 6,202,080 B1 | 3/2001 | Lu et al. | |
| 6,205,465 B1 | 3/2001 | Schoening et al. | |
| 6,210,275 B1 | 4/2001 | Olsen | |
| 6,212,542 B1 | 4/2001 | Kahle et al. | |
| 6,223,202 B1 | 4/2001 | Bayeh | |
| 6,226,677 B1 | 5/2001 | Slemmer | |
| 6,226,788 B1 | 5/2001 | Schoening et al. | |
| 6,240,453 B1 | 5/2001 | Chang | |
| 6,247,056 B1 | 6/2001 | Chou et al. | |
| 6,252,878 B1 | 6/2001 | Locklear | |
| 6,253,230 B1 | 6/2001 | Couland et al. | |
| 6,256,704 B1 | 7/2001 | Hlava | |
| 6,259,675 B1 | 7/2001 | Honda | |
| 6,263,359 B1 | 7/2001 | Fong et al. | |
| 6,266,667 B1 | 7/2001 | Olsson | |
| 6,269,398 B1 | 7/2001 | Leong | |
| 6,278,712 B1 | 8/2001 | Takihiro et al. | |
| 6,282,561 B1 | 8/2001 | Jones et al. | |
| 6,289,382 B1 | 9/2001 | Bowman-Amuah | |
| 6,298,352 B1 | 10/2001 | Kannan et al. | |
| 6,304,549 B1 | 10/2001 | Srinivasan | |
| 6,314,114 B1 | 11/2001 | Coyle et al. | |
| 6,314,487 B1 | 11/2001 | Hahn et al. | |
| 6,314,501 B1 | 11/2001 | Gulick et al. | |
| 6,314,555 B1 | 11/2001 | Ndumu et al. | |
| 6,317,787 B1 | 11/2001 | Boyd et al. | |
| 6,324,279 B1 | 11/2001 | Kalmanek, Jr. et al. | |
| 6,327,364 B1 | 12/2001 | Shaffer et al. | |
| 6,330,008 B1 | 12/2001 | Razdow et al. | |
| 6,330,562 B1 | 12/2001 | Boden et al. | |
| 6,330,583 B1 | 12/2001 | Reiffin | |
| 6,330,605 B1 | 12/2001 | Christensen et al. | |
| 6,333,936 B1 | 12/2001 | Johansson et al. | |
| 6,334,114 B1 | 12/2001 | Jacobs et al. | |
| 6,338,085 B1 | 1/2002 | Ramaswamy | |
| 6,338,112 B1 | 1/2002 | Wipfel et al. | |
| 6,339,717 B1 | 1/2002 | Baumgartl et al. | |
| 6,343,311 B1 | 1/2002 | Nishida et al. | |
| 6,343,488 B1 | 2/2002 | Hackfort | |
| 6,345,287 B1 | 2/2002 | Fong et al. | |
| 6,345,294 B1 | 2/2002 | O'Toole et al. | |
| 6,349,295 B1 | 2/2002 | Tedesco | |
| 6,351,775 B1 | 2/2002 | Yu | |
| 6,353,844 B1 * | 3/2002 | Bitar | G06F 9/5077 718/102 |
| 6,363,434 B1 | 3/2002 | Eytchison | |
| 6,363,488 B1 | 3/2002 | Ginter et al. | |
| 6,366,945 B1 | 4/2002 | Fong et al. | |
| 6,370,154 B1 | 4/2002 | Wickham | |
| 6,370,584 B1 | 4/2002 | Bestavros et al. | |
| 6,373,841 B1 | 4/2002 | Goh et al. | |
| 6,374,254 B1 | 4/2002 | Cochran et al. | |
| 6,374,297 B1 | 4/2002 | Wolf et al. | |
| 6,384,842 B1 | 5/2002 | DeKoning | |
| 6,385,302 B1 | 5/2002 | Antonucci et al. | |
| 6,392,989 B1 | 5/2002 | Jardetzky et al. | |
| 6,393,569 B1 | 5/2002 | Orenshteyn | |
| 6,393,581 B1 | 5/2002 | Friedman et al. | |
| 6,400,996 B1 | 6/2002 | Hoffberg et al. | |
| 6,401,133 B1 | 6/2002 | York | |
| 6,404,768 B1 | 6/2002 | Basak et al. | |
| 6,405,212 B1 | 6/2002 | Samu | |
| 6,405,234 B2 | 6/2002 | Ventrone | |
| 6,418,459 B1 | 7/2002 | Gulick | |
| 6,434,568 B1 | 8/2002 | Bowman-Amuah | |
| 6,438,125 B1 | 8/2002 | Brothers | |
| 6,438,134 B1 | 8/2002 | Chow et al. | |
| 6,438,553 B1 | 8/2002 | Yamada | |
| 6,438,594 B1 | 8/2002 | Bowman-Amuah | |
| 6,438,652 B1 | 8/2002 | Jordan et al. | |
| 6,442,137 B1 | 8/2002 | Yu et al. | |
| 6,445,968 B1 | 9/2002 | Jalla | |
| 6,446,192 B1 | 9/2002 | Narasimhan et al. | |
| 6,446,206 B1 | 9/2002 | Feldbaum | |
| 6,452,809 B1 | 9/2002 | Jackson et al. | |
| 6,452,924 B1 | 9/2002 | Golden et al. | |
| 6,453,349 B1 | 9/2002 | Kano et al. | |
| 6,453,383 B1 | 9/2002 | Stoddard et al. | |
| 6,460,082 B1 | 10/2002 | Lumelsky et al. | |
| 6,463,454 B1 | 10/2002 | Lumelsky et al. | |
| 6,464,261 B1 | 10/2002 | Dybevik et al. | |
| 6,466,935 B1 | 10/2002 | Stuart | |
| 6,466,965 B1 | 10/2002 | Chessell et al. | |
| 6,466,980 B1 | 10/2002 | Lumelsky et al. | |
| 6,477,575 B1 | 11/2002 | Koeppel | |
| 6,477,580 B1 | 11/2002 | Bowman-Amuah | |
| 6,487,390 B1 | 11/2002 | Virine et al. | |
| 6,490,432 B1 | 12/2002 | Wegener et al. | |
| 6,496,566 B1 | 12/2002 | Posthuma | |
| 6,496,866 B2 | 12/2002 | Attanasio et al. | |
| 6,496,872 B1 | 12/2002 | Katz et al. | |
| 6,502,135 B1 | 12/2002 | Munger et al. | |
| 6,505,228 B1 | 1/2003 | Schoening et al. | |
| 6,507,586 B1 | 1/2003 | Satran et al. | |
| 6,519,571 B1 | 2/2003 | Guheen et al. | |
| 6,520,591 B1 | 2/2003 | Jun et al. | |
| 6,526,442 B1 | 2/2003 | Stupek, Jr. et al. | |
| 6,529,499 B1 | 3/2003 | Doshi et al. | |
| 6,529,932 B1 | 3/2003 | Dadiomov et al. | |
| 6,538,994 B1 | 3/2003 | Horspool | |
| 6,549,940 B1 | 4/2003 | Allen et al. | |
| 6,556,952 B1 | 4/2003 | Magro | |
| 6,557,073 B1 | 4/2003 | Fujiwara | |
| 6,564,261 B1 | 5/2003 | Gudjonsson et al. | |
| 6,571,215 B1 | 5/2003 | Mahapatro | |
| 6,571,391 B1 | 5/2003 | Acharya et al. | |
| 6,574,238 B1 | 6/2003 | Thrysoe | |
| 6,574,632 B2 | 6/2003 | Fox et al. | |
| 6,578,005 B1 | 6/2003 | Lesaint | |
| 6,578,068 B1 | 6/2003 | Bowman-Amuah | |
| 6,584,489 B1 | 6/2003 | Jones et al. | |
| 6,584,499 B1 | 6/2003 | Jantz et al. | |
| 6,587,469 B1 | 7/2003 | Bragg | |
| 6,587,938 B1 * | 7/2003 | Eilert | G06F 9/5061 718/104 |
| 6,590,587 B1 | 7/2003 | Wichelman et al. | |
| 6,594,718 B1 | 7/2003 | Ebner | |
| 6,600,898 B1 | 7/2003 | Bonet et al. | |
| 6,601,234 B1 | 7/2003 | Bowman-Amuah | |
| 6,606,660 B1 | 8/2003 | Bowman-Amuah | |
| 6,618,820 B1 | 9/2003 | Krum | |
| 6,622,168 B1 | 9/2003 | Datta | |
| 6,626,077 B1 | 9/2003 | Gilbert | |
| 6,628,649 B1 | 9/2003 | Raj et al. | |
| 6,629,081 B1 | 9/2003 | Cornelius et al. | |
| 6,629,148 B1 | 9/2003 | Ahmed et al. | |
| 6,633,544 B1 | 10/2003 | Rexford et al. | |
| 6,636,853 B1 | 10/2003 | Stephens, Jr. | |
| 6,640,145 B2 | 10/2003 | Hoffberg et al. | |
| 6,640,238 B1 | 10/2003 | Bowman-Amuah | |
| 6,640,248 B1 | 10/2003 | Jorgensen | |
| 6,651,098 B1 | 11/2003 | Carroll et al. | |
| 6,651,125 B2 | 11/2003 | Maergner | |
| 6,661,671 B1 | 12/2003 | Franke et al. | |

(56) References Cited

U.S. PATENT DOCUMENTS

| | | |
|---|---|---|
| 6,661,787 B1 | 12/2003 | O'Connell et al. |
| 6,662,202 B1 | 12/2003 | Krusche et al. |
| 6,662,219 B1 | 12/2003 | Nishanov et al. |
| 6,668,304 B1 | 12/2003 | Satran et al. |
| 6,678,065 B1 | 1/2004 | Hikawa |
| 6,687,257 B1 | 2/2004 | Balasubramanian |
| 6,690,400 B1 | 2/2004 | Moayyad et al. |
| 6,690,647 B1 | 2/2004 | Tang et al. |
| 6,701,318 B2 | 3/2004 | Fox et al. |
| 6,704,489 B1 | 3/2004 | Kurauchi |
| 6,708,220 B1 | 3/2004 | Olin |
| 6,711,691 B1 | 3/2004 | Howard et al. |
| 6,714,778 B2 | 3/2004 | Nykanen et al. |
| 6,724,733 B1 | 4/2004 | Schuba et al. |
| 6,725,456 B1 | 4/2004 | Bruno et al. |
| 6,735,188 B1 | 5/2004 | Becker et al. |
| 6,735,630 B1 | 5/2004 | Gelvin et al. |
| 6,735,716 B1 | 5/2004 | Podanoffsky |
| 6,738,736 B1 | 5/2004 | Bond |
| 6,738,974 B1 | 5/2004 | Nageswaran |
| 6,745,221 B1 | 6/2004 | Ronca |
| 6,745,246 B1 | 6/2004 | Erimli et al. |
| 6,745,262 B1 | 6/2004 | Benhase |
| 6,748,559 B1 | 6/2004 | Pfister |
| 6,754,892 B1 | 6/2004 | Johnson |
| 6,757,723 B1 | 6/2004 | O'Toole et al. |
| 6,757,897 B1 | 6/2004 | Shi |
| 6,760,306 B1 | 7/2004 | Pan et al. |
| 6,763,519 B1 * | 7/2004 | McColl ............... G06F 9/5044 718/107 |
| 6,763,520 B1 | 7/2004 | Seeds |
| 6,766,389 B2 | 7/2004 | Hayter et al. |
| 6,771,661 B1 | 8/2004 | Chawla et al. |
| 6,772,211 B2 | 8/2004 | Lu et al. |
| 6,775,701 B1 | 8/2004 | Pan et al. |
| 6,779,016 B1 | 8/2004 | Aziz et al. |
| 6,781,990 B1 | 8/2004 | Puri et al. |
| 6,782,408 B1 | 8/2004 | Chandra |
| 6,785,724 B1 | 8/2004 | Drainville et al. |
| 6,785,794 B2 | 8/2004 | Chase et al. |
| 6,813,676 B1 | 11/2004 | Henry et al. |
| 6,816,750 B1 | 11/2004 | Klaas |
| 6,816,903 B1 | 11/2004 | Rakoshitz et al. |
| 6,816,905 B1 | 11/2004 | Sheets et al. |
| 6,823,377 B1 | 11/2004 | Wu et al. |
| 6,826,607 B1 | 11/2004 | Gelvin et al. |
| 6,829,206 B1 | 12/2004 | Watanabe |
| 6,829,762 B2 | 12/2004 | Arimilli et al. |
| 6,832,251 B1 | 12/2004 | Gelvin et al. |
| 6,836,806 B1 | 12/2004 | Raciborski et al. |
| 6,842,430 B1 | 1/2005 | Melnik |
| 6,850,966 B2 | 2/2005 | Matsuura et al. |
| 6,857,020 B1 | 2/2005 | Chaar et al. |
| 6,857,026 B1 | 2/2005 | Cain |
| 6,857,938 B1 | 2/2005 | Smith et al. |
| 6,859,831 B1 | 2/2005 | Gelvin et al. |
| 6,859,927 B2 | 2/2005 | Moody et al. |
| 6,862,451 B1 | 3/2005 | Alard |
| 6,862,606 B1 | 3/2005 | Major et al. |
| 6,868,097 B1 | 3/2005 | Soda et al. |
| 6,874,031 B2 | 3/2005 | Corbeil |
| 6,882,718 B1 | 4/2005 | Smith |
| 6,894,792 B1 | 5/2005 | Abe |
| 6,904,460 B1 | 6/2005 | Raciborski et al. |
| 6,912,533 B1 | 6/2005 | Hornick |
| 6,922,664 B1 | 7/2005 | Fernandez et al. |
| 6,925,431 B1 | 8/2005 | Papaefstathiou |
| 6,928,471 B2 | 8/2005 | Pabari et al. |
| 6,931,640 B2 | 8/2005 | Asano et al. |
| 6,934,702 B2 | 8/2005 | Faybishenko et al. |
| 6,938,256 B2 | 8/2005 | Deng et al. |
| 6,947,982 B2 | 9/2005 | McGann et al. |
| 6,948,171 B2 | 9/2005 | Dan et al. |
| 6,950,821 B2 | 9/2005 | Faybishenko et al. |
| 6,950,833 B2 | 9/2005 | Costello et al. |
| 6,952,828 B2 | 10/2005 | Greene |
| 6,954,784 B2 | 10/2005 | Aiken et al. |
| 6,963,917 B1 | 11/2005 | Callis et al. |
| 6,963,926 B1 | 11/2005 | Robinson |
| 6,963,948 B1 | 11/2005 | Gulick |
| 6,965,930 B1 | 11/2005 | Arrowood et al. |
| 6,966,033 B1 | 11/2005 | Gasser et al. |
| 6,968,323 B1 | 11/2005 | Bansal et al. |
| 6,971,098 B2 | 11/2005 | Khare et al. |
| 6,975,609 B1 | 12/2005 | Khaleghi et al. |
| 6,977,939 B2 | 12/2005 | Joy et al. |
| 6,978,310 B1 | 12/2005 | Rodriguez et al. |
| 6,978,447 B1 | 12/2005 | Okmianski |
| 6,985,461 B2 | 1/2006 | Singh |
| 6,985,937 B1 | 1/2006 | Keshav et al. |
| 6,988,170 B2 | 1/2006 | Barroso et al. |
| 6,990,063 B1 | 1/2006 | Lenoski et al. |
| 6,990,616 B1 | 1/2006 | Botton-Dascal |
| 6,990,677 B1 | 1/2006 | Pietraszak et al. |
| 6,996,821 B1 | 2/2006 | Butterworth |
| 6,996,822 B1 | 2/2006 | Willen |
| 7,003,414 B1 | 2/2006 | Wichelman et al. |
| 7,006,881 B1 | 2/2006 | Hoffberg et al. |
| 7,013,303 B2 | 3/2006 | Faybishenko et al. |
| 7,013,322 B2 | 3/2006 | Lahr |
| 7,017,186 B2 | 3/2006 | Day |
| 7,020,695 B1 | 3/2006 | Kundu et al. |
| 7,020,701 B1 | 3/2006 | Gelvin et al. |
| 7,020,719 B1 | 3/2006 | Grove et al. |
| 7,032,119 B2 | 4/2006 | Fung |
| 7,034,686 B2 | 4/2006 | Matsumura |
| 7,035,230 B1 | 4/2006 | Shaffer et al. |
| 7,035,240 B1 | 4/2006 | Balakrishnan et al. |
| 7,035,854 B2 | 4/2006 | Hsiao et al. |
| 7,035,911 B2 | 4/2006 | Lowery et al. |
| 7,043,605 B2 | 5/2006 | Suzuki |
| 7,058,070 B2 | 6/2006 | Tran et al. |
| 7,058,716 B1 | 6/2006 | Sundaresan et al. |
| 7,058,949 B1 | 6/2006 | Willen |
| 7,058,951 B2 | 6/2006 | Bril et al. |
| 7,065,579 B2 | 6/2006 | Traversal et al. |
| 7,065,764 B1 | 6/2006 | Prael et al. |
| 7,072,807 B2 | 7/2006 | Brown et al. |
| 7,076,717 B2 | 7/2006 | Grossman, IV et al. |
| 7,080,078 B1 | 7/2006 | Slaughter et al. |
| 7,080,283 B1 | 7/2006 | Songer et al. |
| 7,080,285 B2 | 7/2006 | Kosugi |
| 7,080,378 B1 | 7/2006 | Noland et al. |
| 7,082,606 B2 | 7/2006 | Wood et al. |
| 7,085,825 B1 | 8/2006 | Pishevar et al. |
| 7,085,837 B2 | 8/2006 | Kimbrel et al. |
| 7,085,893 B2 | 8/2006 | Krissell et al. |
| 7,089,294 B1 | 8/2006 | Baskey et al. |
| 7,093,256 B2 | 8/2006 | Bloks |
| 7,095,738 B1 | 8/2006 | Desanti |
| 7,099,933 B1 | 8/2006 | Wallace et al. |
| 7,100,192 B1 | 8/2006 | Igawa et al. |
| 7,102,996 B1 | 9/2006 | Amdahl et al. |
| 7,103,625 B1 | 9/2006 | Hipp et al. |
| 7,103,664 B1 | 9/2006 | Novaes et al. |
| 7,107,578 B1 | 9/2006 | Alpem |
| 7,107,589 B1 | 9/2006 | Tal |
| 7,117,208 B2 | 10/2006 | Tamayo et al. |
| 7,117,273 B1 | 10/2006 | O'Toole et al. |
| 7,119,591 B1 | 10/2006 | Lin |
| 7,124,289 B1 | 10/2006 | Suorsa |
| 7,124,410 B2 | 10/2006 | Berg et al. |
| 7,126,913 B1 | 10/2006 | Patel et al. |
| 7,127,613 B2 | 10/2006 | Pabla et al. |
| 7,127,633 B1 | 10/2006 | Olson et al. |
| 7,136,927 B2 | 11/2006 | Traversal et al. |
| 7,140,020 B2 | 11/2006 | McCarthy et al. |
| 7,143,088 B2 | 11/2006 | Green et al. |
| 7,143,153 B1 | 11/2006 | Black et al. |
| 7,143,168 B1 | 11/2006 | BiBiasio et al. |
| 7,145,995 B2 | 12/2006 | Oltmanns et al. |
| 7,146,233 B2 | 12/2006 | Aziz et al. |
| 7,146,353 B2 | 12/2006 | Garg et al. |
| 7,146,416 B1 | 12/2006 | Yoo et al. |

(56) References Cited

U.S. PATENT DOCUMENTS

| | | |
|---|---|---|
| 7,150,044 B2 | 12/2006 | Hoefelmeyer et al. |
| 7,154,621 B2 | 12/2006 | Rodriguez et al. |
| 7,155,478 B2 | 12/2006 | Ims et al. |
| 7,155,502 B1 | 12/2006 | Galloway et al. |
| 7,165,107 B2 | 1/2007 | Pouyoul et al. |
| 7,165,120 B1 | 1/2007 | Giles et al. |
| 7,167,920 B2 | 1/2007 | Traversat et al. |
| 7,168,049 B2 | 1/2007 | Day |
| 7,170,315 B2 | 1/2007 | Bakker et al. |
| 7,171,415 B2 | 1/2007 | Kan et al. |
| 7,171,476 B2 | 1/2007 | Maeda et al. |
| 7,171,491 B1 | 1/2007 | O'Toole et al. |
| 7,171,593 B1 | 1/2007 | Whittaker |
| 7,177,823 B2 | 2/2007 | Lam et al. |
| 7,180,866 B1 | 2/2007 | Chartre et al. |
| 7,185,046 B2 | 2/2007 | Ferstl et al. |
| 7,185,073 B1 | 2/2007 | Gai et al. |
| 7,185,077 B1 | 2/2007 | O'Toole et al. |
| 7,188,145 B2 | 3/2007 | Lowery et al. |
| 7,188,174 B2 | 3/2007 | Rolia et al. |
| 7,191,244 B2 | 3/2007 | Jennings et al. |
| 7,197,071 B1 | 3/2007 | Weigand |
| 7,197,549 B1 | 3/2007 | Salama et al. |
| 7,197,559 B2 | 3/2007 | Goldstein et al. |
| 7,197,561 B1 | 3/2007 | Lovy et al. |
| 7,197,565 B2 | 3/2007 | Abdelaziz et al. |
| 7,200,716 B1 | 4/2007 | Aiello |
| 7,203,063 B2 | 4/2007 | Bash et al. |
| 7,203,746 B1 | 4/2007 | Harrop |
| 7,203,753 B2 | 4/2007 | Yeager et al. |
| 7,206,819 B2 | 4/2007 | Schmidt |
| 7,206,841 B2 | 4/2007 | Traversal et al. |
| 7,206,934 B2 | 4/2007 | Pabla et al. |
| 7,213,047 B2 | 5/2007 | Yeager et et al. |
| 7,213,050 B1 | 5/2007 | Shaffer et |
| 7,213,062 B1 | 5/2007 | Raciborski et al. |
| 7,213,065 B2 | 5/2007 | Watt |
| 7,216,173 B2 | 5/2007 | Clayton et al. |
| 7,222,187 B2 | 5/2007 | Yeager et al. |
| 7,222,343 B2 | 5/2007 | Heyrman et al. |
| 7,225,249 B1 | 5/2007 | Barry et al. |
| 7,225,442 B1 | 5/2007 | Dutta et al. |
| 7,228,348 B1 | 6/2007 | Farley |
| 7,228,350 B2 | 6/2007 | Hong et al. |
| 7,231,445 B1 | 6/2007 | Aweya et al. |
| 7,233,569 B1 | 6/2007 | Swallow |
| 7,233,669 B2 | 6/2007 | Candelore |
| 7,236,915 B2 | 6/2007 | Algieri et al. |
| 7,237,243 B2 | 6/2007 | Sutton et al. |
| 7,242,501 B2 | 7/2007 | Ishimoto |
| 7,243,351 B2 | 7/2007 | Kundu |
| 7,249,179 B1 | 7/2007 | Romero et al. |
| 7,251,222 B2 | 7/2007 | Chen et al. |
| 7,251,688 B2 | 7/2007 | Leighton et al. |
| 7,254,608 B2 | 8/2007 | Yeager et al. |
| 7,257,655 B1 | 8/2007 | Burney et al. |
| 7,260,846 B2 | 8/2007 | Day |
| 7,263,288 B1 | 8/2007 | Islam |
| 7,263,560 B2 | 8/2007 | Abdelaziz et al. |
| 7,263,596 B1 | 8/2007 | Wideman |
| 7,274,705 B2 | 9/2007 | Chang et al. |
| 7,275,018 B2 | 9/2007 | Abu-El-Zeet et al. |
| 7,275,102 B2 | 9/2007 | Yeager et al. |
| 7,275,249 B1 | 9/2007 | Miller et al. |
| 7,278,008 B1 | 10/2007 | Case et al. |
| 7,278,142 B2 | 10/2007 | Bandhole et al. |
| 7,278,582 B1 | 10/2007 | Siegel et al. |
| 7,281,045 B2 | 10/2007 | Aggarwal et al. |
| 7,283,838 B2 | 10/2007 | Lu |
| 7,284,109 B1 | 10/2007 | Paxie et al. |
| 7,289,619 B2 | 10/2007 | Vivadelli et al. |
| 7,289,985 B2 | 10/2007 | Zeng et al. |
| 7,293,092 B2 | 11/2007 | Sukegawa |
| 7,296,268 B2 | 11/2007 | Darling et al. |
| 7,299,294 B1 | 11/2007 | Bruck et al. |
| 7,305,464 B2 | 12/2007 | Phillipi et al. |
| 7,308,496 B2 | 12/2007 | Yeager et al. |
| 7,308,687 B2 | 12/2007 | Trossman et al. |
| 7,310,319 B2 | 12/2007 | Awsienko et al. |
| 7,313,793 B2 | 12/2007 | Traut et al. |
| 7,315,887 B1 | 1/2008 | Liang et al. |
| 7,320,025 B1 | 1/2008 | Steinberg et al. |
| 7,324,555 B1 | 1/2008 | Chen et al. |
| 7,325,050 B2 | 1/2008 | O'Connor et al. |
| 7,328,243 B2 | 2/2008 | Yeager et al. |
| 7,328,264 B2 | 2/2008 | Babka |
| 7,328,406 B2 | 2/2008 | Kalinoski et al. |
| 7,334,108 B1 | 2/2008 | Case et al. |
| 7,334,230 B2 | 2/2008 | Chung et al. |
| 7,337,333 B2 | 2/2008 | O'Conner et al. |
| 7,337,446 B2 | 2/2008 | Sankaranarayan et al. |
| 7,340,500 B2 | 3/2008 | Traversal et al. |
| 7,340,578 B1 | 3/2008 | Khanzode |
| 7,340,777 B1 | 3/2008 | Szor |
| 7,343,467 B2 | 3/2008 | Brown et al. |
| 7,349,348 B1 | 3/2008 | Johnson et al. |
| 7,350,186 B2 | 3/2008 | Coleman et al. |
| 7,353,276 B2 | 4/2008 | Bain et al. |
| 7,353,362 B2 | 4/2008 | Georgiou et al. |
| 7,353,495 B2 | 4/2008 | Somogyi |
| 7,356,655 B2 | 4/2008 | Allen et al. |
| 7,356,770 B1 | 4/2008 | Jackson |
| 7,363,346 B2 | 4/2008 | Groner et al. |
| 7,366,101 B1 | 4/2008 | Varier et al. |
| 7,366,719 B2 | 4/2008 | Shaw |
| 7,370,092 B2 | 5/2008 | Aderton et al. |
| 7,373,391 B2 | 5/2008 | Iinuma |
| 7,373,524 B2 | 5/2008 | Motsinger et al. |
| 7,376,693 B2 | 5/2008 | Neiman et al. |
| 7,380,039 B2 | 5/2008 | Miloushev et al. |
| 7,382,154 B2 | 6/2008 | Ramos et al. |
| 7,383,433 B2 | 6/2008 | Yeager et al. |
| 7,386,586 B1 | 6/2008 | Headley et al. |
| 7,386,611 B2 | 6/2008 | Dias et al. |
| 7,386,850 B2 | 6/2008 | Mullen |
| 7,386,888 B2 | 6/2008 | Liang et al. |
| 7,389,310 B1 | 6/2008 | Bhagwan et al. |
| 7,392,325 B2 | 6/2008 | Grove et al. |
| 7,392,360 B1 | 6/2008 | Aharoni |
| 7,395,536 B2 | 7/2008 | Verbeke et al. |
| 7,395,537 B1 | 7/2008 | Brown |
| 7,398,216 B2 | 7/2008 | Barnett et al. |
| 7,398,471 B1 | 7/2008 | Rambacher |
| 7,398,525 B2 | 7/2008 | Leymann |
| 7,401,114 B1 | 7/2008 | Block et al. |
| 7,401,152 B2 | 7/2008 | Traversal et al. |
| 7,401,153 B2 | 7/2008 | Traversal et al. |
| 7,401,355 B2 | 7/2008 | Supnik et al. |
| 7,403,994 B1 | 7/2008 | Vogl et al. |
| 7,409,433 B2 | 8/2008 | Lowery et al. |
| 7,412,492 B1 | 8/2008 | Waldspurger |
| 7,412,703 B2 | 8/2008 | Cleary et al. |
| 7,415,709 B2 | 8/2008 | Hipp et al. |
| 7,418,518 B2 | 8/2008 | Grove et al. |
| 7,418,534 B2 | 8/2008 | Hayter et al. |
| 7,421,402 B2 | 9/2008 | Chang et al. |
| 7,421,500 B2 | 9/2008 | Talwar et al. |
| 7,423,971 B1 | 9/2008 | Mohaban et al. |
| 7,426,489 B2 | 9/2008 | Van Soestbergen et al. |
| 7,426,546 B2 | 9/2008 | Breiter et al. |
| 7,428,540 B1 | 9/2008 | Coates et al. |
| 7,433,304 B1 | 10/2008 | Galloway et al. |
| 7,437,460 B2 | 10/2008 | Chidambaran et al. |
| 7,437,540 B2 | 10/2008 | Paolucci et al. |
| 7,437,730 B2 | 10/2008 | Goyal |
| 7,441,261 B2 | 10/2008 | Slater et al. |
| 7,447,147 B2 | 11/2008 | Nguyen et al. |
| 7,447,197 B2 | 11/2008 | Terrell et al. |
| 7,451,197 B2 | 11/2008 | Davis |
| 7,451,199 B2 | 11/2008 | Kandefer et al. |
| 7,451,201 B2 | 11/2008 | Alex et al. |
| 7,454,467 B2 | 11/2008 | Girouard et al. |
| 7,461,134 B2 | 12/2008 | Ambrose |
| 7,463,587 B2 | 12/2008 | Rajsic et al. |

(56) References Cited

U.S. PATENT DOCUMENTS

| | | |
|---|---|---|
| 7,464,159 B2 | 12/2008 | Luoffo et al. |
| 7,464,160 B2 | 12/2008 | Iszlai et al. |
| 7,466,712 B2 | 12/2008 | Makishima et al. |
| 7,466,810 B1 | 12/2008 | Quon et al. |
| 7,467,225 B2 | 12/2008 | Anerousis et al. |
| 7,467,306 B2 | 12/2008 | Cartes et al. |
| 7,467,358 B2 | 12/2008 | Kang et al. |
| 7,475,419 B1 | 1/2009 | Basu et al. |
| 7,483,945 B2 | 1/2009 | Blumofe |
| 7,484,008 B1 | 1/2009 | Gelvin et al. |
| 7,484,225 B2 | 1/2009 | Hugly et al. |
| 7,487,254 B2 | 2/2009 | Walsh et al. |
| 7,487,509 B2 | 2/2009 | Hugly et al. |
| 7,492,720 B2 | 2/2009 | Pruthi et al. |
| 7,496,494 B2 | 2/2009 | Altman |
| 7,502,747 B1 | 3/2009 | Pardo et al. |
| 7,502,884 B1 | 3/2009 | Shah et al. |
| 7,503,045 B1 | 3/2009 | Aziz et al. |
| 7,505,463 B2 | 3/2009 | Schuba |
| 7,512,649 B2 | 3/2009 | Faybishenko et al. |
| 7,512,894 B1 | 3/2009 | Hintermeister |
| 7,516,208 B1 | 4/2009 | Kerrison |
| 7,516,221 B2 | 4/2009 | Souder et al. |
| 7,516,455 B2 | 4/2009 | Matheson et al. |
| 7,519,677 B2 | 4/2009 | Lowery et al. |
| 7,519,843 B1 | 4/2009 | Buterbaugh et al. |
| 7,526,479 B2 | 4/2009 | Zenz |
| 7,529,835 B1 | 5/2009 | Agronow et al. |
| 7,533,141 B2 | 5/2009 | Nadgir et al. |
| 7,533,161 B2 | 5/2009 | Hugly et al. |
| 7,533,172 B2 | 5/2009 | Traversal et al. |
| 7,533,385 B1 | 5/2009 | Barnes |
| 7,536,541 B2 | 5/2009 | Isaacson |
| 7,543,052 B1 | 6/2009 | Klein |
| 7,546,553 B2 | 6/2009 | Bozak et al. |
| 7,551,614 B2 | 6/2009 | Teisberg et al. |
| 7,554,930 B2 | 6/2009 | Gaddis et al. |
| 7,555,666 B2 | 6/2009 | Brundridge et al. |
| 7,562,143 B2 | 7/2009 | Fellenstein et al. |
| 7,568,199 B2 | 7/2009 | Bozak et al. |
| 7,570,943 B2 | 8/2009 | Sorvari et al. |
| 7,571,438 B2 | 8/2009 | Jones et al. |
| 7,574,523 B2 | 8/2009 | Traversal et al. |
| 7,577,722 B1 | 8/2009 | Khandekar et al. |
| 7,577,834 B1 | 8/2009 | Traversal et al. |
| 7,577,959 B2 | 8/2009 | Nguyen et al. |
| 7,580,382 B1 | 8/2009 | Amis et al. |
| 7,580,919 B1 | 8/2009 | Hannel |
| 7,583,607 B2 | 9/2009 | Steele et al. |
| 7,583,661 B2 | 9/2009 | Chaudhuri |
| 7,584,239 B1 | 9/2009 | Yan |
| 7,584,274 B2 | 9/2009 | Bond et al. |
| 7,586,841 B2 | 9/2009 | Vasseur |
| 7,590,746 B2 | 9/2009 | Slater et al. |
| 7,590,747 B2 | 9/2009 | Coates et al. |
| 7,594,011 B2 | 9/2009 | Chandra |
| 7,594,015 B2 | 9/2009 | Bozak et al. |
| 7,596,144 B2 | 9/2009 | Pong |
| 7,596,784 B2 | 9/2009 | Abrams et al. |
| 7,599,360 B2 | 10/2009 | Edsall et al. |
| 7,606,225 B2 | 10/2009 | Xie et al. |
| 7,606,245 B2 | 10/2009 | Ma et al. |
| 7,610,266 B2 | 10/2009 | Cascaval |
| 7,610,289 B2 | 10/2009 | Muret et al. |
| 7,613,796 B2 | 11/2009 | Harvey et al. |
| 7,616,646 B1 | 11/2009 | Ma et al. |
| 7,620,057 B1 | 11/2009 | Aloni et al. |
| 7,620,635 B2 | 11/2009 | Hornick |
| 7,620,706 B2 | 11/2009 | Jackson |
| 7,624,118 B2 | 11/2009 | Schipunov et al. |
| 7,624,194 B2 | 11/2009 | Kakivaya et al. |
| 7,627,691 B1 | 12/2009 | Buchsbaum et al. |
| 7,631,066 B1 | 12/2009 | Schatz et al. |
| 7,631,307 B2 | 12/2009 | Wang et al. |
| 7,640,353 B2 | 12/2009 | Shen et al. |
| 7,640,547 B2 | 12/2009 | Neiman et al. |
| 7,644,215 B2 | 1/2010 | Wallace et al. |
| 7,657,535 B2 | 2/2010 | Moyaux et al. |
| 7,657,597 B2 | 2/2010 | Arora et al. |
| 7,657,626 B1 | 2/2010 | Zwicky |
| 7,657,677 B2 | 2/2010 | Huang et al. |
| 7,657,756 B2 | 2/2010 | Hall |
| 7,657,779 B2 | 2/2010 | Kaminsky |
| 7,660,887 B2 | 2/2010 | Reedy et al. |
| 7,660,922 B2 | 2/2010 | Harriman |
| 7,664,110 B1 | 2/2010 | Lovett et al. |
| 7,665,090 B1 | 2/2010 | Tormasov et al. |
| 7,668,809 B1 | 2/2010 | Kelly et al. |
| 7,673,164 B1 | 3/2010 | Agarwal |
| 7,680,933 B2 | 3/2010 | Fatula, Jr. |
| 7,685,281 B1 | 3/2010 | Saraiya et al. |
| 7,685,599 B2 | 3/2010 | Kanai et al. |
| 7,685,602 B1 | 3/2010 | Tran et al. |
| 7,689,661 B2 | 3/2010 | Lowery et al. |
| 7,693,976 B2 | 4/2010 | Perry et al. |
| 7,693,993 B2 | 4/2010 | Sheets et al. |
| 7,694,076 B2 | 4/2010 | Lowery et al. |
| 7,694,305 B2 | 4/2010 | Karlsson et al. |
| 7,698,386 B2 | 4/2010 | Amidon et al. |
| 7,698,398 B1 | 4/2010 | Lai |
| 7,698,430 B2 | 4/2010 | Jackson |
| 7,701,948 B2 | 4/2010 | Rabie et al. |
| 7,702,779 B1 | 4/2010 | Gupta et al. |
| 7,707,088 B2 | 4/2010 | Schmelzer |
| 7,707,185 B1 | 4/2010 | Czezatke |
| 7,710,936 B2 | 5/2010 | Morales Barroso |
| 7,711,652 B2 | 5/2010 | Schmelzer |
| 7,716,193 B2 | 5/2010 | Krishnamoorthy |
| 7,716,334 B2 | 5/2010 | Rao et al. |
| 7,719,834 B2 | 5/2010 | Miyamoto et al. |
| 7,721,125 B2 | 5/2010 | Fung |
| 7,725,583 B2 | 5/2010 | Jackson |
| 7,730,220 B2 | 6/2010 | Hasha et al. |
| 7,730,262 B2 | 6/2010 | Lowery et al. |
| 7,730,488 B2 | 6/2010 | Ilzuka et al. |
| 7,739,308 B2 | 6/2010 | Baffier et al. |
| 7,739,541 B1 | 6/2010 | Rao et al. |
| 7,742,425 B2 | 6/2010 | El-Damhougy |
| 7,742,476 B2 | 6/2010 | Branda et al. |
| 7,743,147 B2 | 6/2010 | Suorsa et al. |
| 7,747,451 B2 | 6/2010 | Keohane et al. |
| RE41,440 E | 7/2010 | Briscoe et al. |
| 7,751,433 B2 | 7/2010 | Dollo et al. |
| 7,752,258 B2 | 7/2010 | Lewin et al. |
| 7,752,624 B2 | 7/2010 | Crawford, Jr. et al. |
| 7,756,658 B2 | 7/2010 | Kulkarni et al. |
| 7,757,033 B1 | 7/2010 | Mehrotra |
| 7,757,236 B1 | 7/2010 | Singh |
| 7,760,720 B2 | 7/2010 | Pullela et al. |
| 7,761,557 B2 | 7/2010 | Fellenstein et al. |
| 7,761,687 B2 | 7/2010 | Blumrich et al. |
| 7,765,288 B2 | 7/2010 | Bainbridge et al. |
| 7,765,299 B2 | 7/2010 | Romero |
| 7,769,620 B1 | 8/2010 | Fernandez et al. |
| 7,769,803 B2 | 8/2010 | Birdwell et al. |
| 7,770,120 B2 | 8/2010 | Baudisch |
| 7,774,331 B2 | 8/2010 | Barth et al. |
| 7,774,495 B2 | 8/2010 | Pabla et al. |
| 7,778,234 B2 | 8/2010 | Cooke et al. |
| 7,782,813 B2 | 8/2010 | Wheeler et al. |
| 7,783,777 B1 | 8/2010 | Pabla et al. |
| 7,783,786 B1 | 8/2010 | Lauterbach |
| 7,783,910 B2 | 8/2010 | Felter et al. |
| 7,788,403 B2 | 8/2010 | Darugar et al. |
| 7,788,477 B1 | 8/2010 | Huang et al. |
| 7,791,894 B2 | 9/2010 | Bechtolsheim |
| 7,792,113 B1 | 9/2010 | Foschiano et al. |
| 7,793,288 B2 | 9/2010 | Sameske |
| 7,796,399 B2 | 9/2010 | Clayton et al. |
| 7,796,619 B1 | 9/2010 | Feldmann et al. |
| 7,797,367 B1 | 9/2010 | Gelvin et al. |
| 7,797,393 B2 | 9/2010 | Qiu et al. |
| 7,801,132 B2 | 9/2010 | Ofek et al. |
| 7,802,017 B2 | 9/2010 | Uemura et al. |

(56) References Cited

U.S. PATENT DOCUMENTS

| | | |
|---|---|---|
| 7,805,448 B2 | 9/2010 | Andrzejak et al. |
| 7,805,575 B1 | 9/2010 | Agarwal et al. |
| 7,810,090 B2 | 10/2010 | Gebhart |
| 7,813,822 B1 | 10/2010 | Hoffberg |
| 7,827,361 B1 | 11/2010 | Karlsson et al. |
| 7,830,820 B2 | 11/2010 | Duke et al. |
| 7,831,839 B2 | 11/2010 | Hatakeyama |
| 7,840,353 B2 | 11/2010 | Ouksel et al. |
| 7,840,703 B2 | 11/2010 | Arimilli et al. |
| 7,840,810 B2 | 11/2010 | Eastham |
| 7,844,687 B1 | 11/2010 | Gelvin et al. |
| 7,844,787 B2 | 11/2010 | Ranganathan et al. |
| 7,848,262 B2 | 12/2010 | El-Damhougy |
| 7,849,139 B2 | 12/2010 | Wolfson et al. |
| 7,849,140 B2 | 12/2010 | Abdel-Aziz et al. |
| 7,853,880 B2 | 12/2010 | Porter |
| 7,860,999 B1 | 12/2010 | Subramanian et al. |
| 7,865,614 B2 | 1/2011 | Lu et al. |
| 7,886,023 B1 | 2/2011 | Johnson |
| 7,889,675 B2 | 2/2011 | Mack-Crane et al. |
| 7,890,571 B1 | 2/2011 | Kriegsman |
| 7,890,701 B2 | 2/2011 | Lowery et al. |
| 7,891,004 B1 | 2/2011 | Gelvin et al. |
| RE42,262 E | 3/2011 | Stephens, Jr. |
| 7,899,047 B2 | 3/2011 | Cabrera et al. |
| 7,899,864 B2 | 3/2011 | Margulis |
| 7,900,206 B1 | 3/2011 | Joshi et al. |
| 7,904,569 B1 | 3/2011 | Gelvin et al. |
| 7,921,169 B2 | 4/2011 | Jacobs |
| 7,925,795 B2 | 4/2011 | Tamir et al. |
| 7,930,397 B2 | 4/2011 | Midgley |
| 7,934,005 B2 | 4/2011 | Fascenda |
| 7,958,262 B2 | 6/2011 | Hasha et al. |
| 7,970,830 B2 | 6/2011 | Staggs |
| 7,970,929 B1 | 6/2011 | Mahalingaiah |
| 7,971,204 B2 | 6/2011 | Jackson |
| 7,975,032 B2 | 7/2011 | Lowery et al. |
| 7,975,035 B2 | 7/2011 | Popescu et al. |
| 7,975,110 B1 | 7/2011 | Spaur et al. |
| 7,984,137 B2 | 7/2011 | O'Toole, Jr. et al. |
| 7,984,183 B2 | 7/2011 | Andersen et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 7,992,983 B2 | 8/2011 | Nanjo |
| 7,995,501 B2 | 8/2011 | Jetcheva et al. |
| 7,996,458 B2 | 8/2011 | Nielsen |
| 7,996,510 B2 | 8/2011 | Vicente |
| 8,000,288 B2 | 8/2011 | Wheeler et al. |
| 8,014,408 B2 | 9/2011 | Habetha et al. |
| 8,018,860 B1 | 9/2011 | Cook |
| 8,019,832 B2 | 9/2011 | De Sousa et al. |
| 8,032,634 B1 | 10/2011 | Eppstein |
| 8,037,202 B2 | 10/2011 | Yeager et al. |
| 8,037,475 B1 | 10/2011 | Jackson |
| 8,041,773 B2 | 10/2011 | Abu-Ghazaleh et al. |
| 8,055,788 B1 | 11/2011 | Chan et al. |
| 8,060,552 B2 | 11/2011 | Hinni et al. |
| 8,060,619 B1 | 11/2011 | Saulpaugh |
| 8,060,760 B2 | 11/2011 | Shetty et al. |
| 8,060,775 B1 | 11/2011 | Sharma et al. |
| 8,073,978 B2 | 12/2011 | Sengupta et al. |
| 8,078,708 B1 | 12/2011 | Wang et al. |
| 8,079,118 B2 | 12/2011 | Gelvin et al. |
| 8,082,400 B1 | 12/2011 | Chang et al. |
| 8,090,880 B2 | 1/2012 | Hasha et al. |
| 8,095,600 B2 | 1/2012 | Hasha et al. |
| 8,095,601 B2 | 1/2012 | Hasha et al. |
| 8,103,543 B1 | 1/2012 | Zwicky |
| 8,108,455 B2 | 1/2012 | Yeager et al. |
| 8,108,508 B1 | 1/2012 | Goh et al. |
| 8,108,512 B2 | 1/2012 | Howard et al. |
| 8,108,930 B2 | 1/2012 | Hoefelmeyer et al. |
| 8,122,269 B2 | 2/2012 | Houlihan et al. |
| 8,132,034 B2 | 3/2012 | Lambert et al. |
| 8,135,812 B2 | 3/2012 | Lowery et al. |
| 8,140,658 B1 | 3/2012 | Gelvin et al. |
| 8,151,103 B2 | 4/2012 | Jackson |
| 8,155,113 B1 | 4/2012 | Agarwal |
| 8,156,362 B2 | 4/2012 | Branover et al. |
| 8,160,077 B2 | 4/2012 | Traversal et al. |
| 8,161,391 B2 | 4/2012 | McClelland et al. |
| 8,165,120 B2 | 4/2012 | Maruccia et al. |
| 8,166,063 B2 | 4/2012 | Andersen et al. |
| 8,166,204 B2 | 4/2012 | Basu et al. |
| 8,170,040 B2 | 5/2012 | Konda |
| 8,171,136 B2 | 5/2012 | Petite |
| 8,176,189 B2 | 5/2012 | Traversal et al. |
| 8,176,490 B1 | 5/2012 | Jackson |
| 8,180,996 B2 | 5/2012 | Fullerton et al. |
| 8,185,776 B1 | 5/2012 | Gentes et al. |
| 8,189,612 B2 | 5/2012 | Lemaire et al. |
| 8,194,659 B2 | 6/2012 | Ban |
| 8,196,133 B2 | 6/2012 | Kakumani et al. |
| 8,199,636 B1 | 6/2012 | Rouyer et al. |
| 8,204,992 B2 | 6/2012 | Arora et al. |
| 8,205,044 B2 | 6/2012 | Lowery et al. |
| 8,205,103 B2 | 6/2012 | Kazama et al. |
| 8,205,210 B2 | 6/2012 | Cleary et al. |
| 8,244,671 B2 | 8/2012 | Chen et al. |
| 8,260,893 B1 | 9/2012 | Bandhole et al. |
| 8,261,349 B2 | 9/2012 | Peng |
| 8,266,321 B2 | 9/2012 | Johnston-Watt et al. |
| 8,271,628 B2 | 9/2012 | Lowery et al. |
| 8,271,980 B2 | 9/2012 | Jackson |
| 8,275,881 B2 | 9/2012 | Fellenstein et al. |
| 8,302,100 B2 | 10/2012 | Deng et al. |
| 8,321,048 B1 | 11/2012 | Coss et al. |
| 8,346,591 B2 | 1/2013 | Fellenstein et al. |
| 8,346,908 B1 | 1/2013 | Vanyukhin et al. |
| 8,359,397 B2 | 1/2013 | Traversal et al. |
| 8,370,898 B1 | 2/2013 | Jackson |
| 8,379,425 B2 | 2/2013 | Fukuoka et al. |
| 8,380,846 B1 | 2/2013 | Abu-Ghazaleh et al. |
| 8,386,622 B2 | 2/2013 | Jacobson |
| 8,392,515 B2 | 3/2013 | Kakivaya et al. |
| 8,396,757 B2 | 3/2013 | Fellenstein et al. |
| 8,397,092 B2 | 3/2013 | Karnowski |
| 8,402,540 B2 | 3/2013 | Kapoor et al. |
| 8,407,428 B2 | 3/2013 | Cheriton et al. |
| 8,413,155 B2 | 4/2013 | Jackson |
| 8,417,715 B1 | 4/2013 | Bruckhaus et al. |
| 8,417,813 B2 | 4/2013 | Kakivaya et al. |
| 8,429,396 B1 | 4/2013 | Trivedi |
| 8,458,333 B1 | 6/2013 | Stoica et al. |
| 8,463,867 B2 | 6/2013 | Robertson et al. |
| 8,464,250 B1 | 6/2013 | Ansel |
| 8,484,382 B2 | 7/2013 | Das et al. |
| 8,495,201 B2 | 7/2013 | Klincewicz |
| 8,504,663 B2 | 8/2013 | Lowery et al. |
| 8,504,791 B2 | 8/2013 | Cheriton et al. |
| 8,516,470 B1 | 8/2013 | van Rietschote |
| 8,544,017 B1 | 9/2013 | Prael et al. |
| 8,554,920 B2 | 10/2013 | Chen et al. |
| 8,560,639 B2 | 10/2013 | Murphy et al. |
| 8,572,326 B2 | 10/2013 | Lowery et al. |
| RE44,610 E | 11/2013 | Krakirian et al. |
| 8,578,130 B2 | 11/2013 | DeSota et al. |
| 8,584,129 B1 | 11/2013 | Czajkowski |
| 8,589,517 B2 | 11/2013 | Hoefelmeyer et al. |
| 8,599,863 B2 | 12/2013 | Davis |
| 8,601,595 B2 | 12/2013 | Gelvin et al. |
| 8,606,800 B2 | 12/2013 | Lagad et al. |
| 8,615,602 B2 | 12/2013 | Li et al. |
| 8,626,820 B1 | 1/2014 | Levy |
| 8,631,130 B2 | 1/2014 | Jackson |
| 8,684,802 B1 | 4/2014 | Gross et al. |
| 8,701,121 B2 | 4/2014 | Saffre |
| 8,726,278 B1 | 5/2014 | Shawver et al. |
| 8,737,410 B2 | 5/2014 | Davis |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,120 B2 | 7/2014 | Jackson |

(56) References Cited

U.S. PATENT DOCUMENTS

| | | |
|---|---|---|
| 8,782,231 B2 | 7/2014 | Jackson |
| 8,782,321 B2 | 7/2014 | Harriman et al. |
| 8,782,654 B2 | 7/2014 | Jackson |
| 8,812,400 B2 | 8/2014 | Faraboschi et al. |
| 8,824,485 B2 | 9/2014 | Biswas et al. |
| 8,826,270 B1 | 9/2014 | Lewis |
| 8,854,831 B2 | 10/2014 | Arnouse |
| 8,863,143 B2 | 10/2014 | Jackson |
| 8,903,964 B2 | 12/2014 | Breslin |
| 8,924,560 B2 | 12/2014 | Pang |
| 8,930,536 B2 | 1/2015 | Jackson |
| 8,954,584 B1 | 2/2015 | Subbarayan et al. |
| 9,008,079 B2 | 4/2015 | Davis et al. |
| 9,038,078 B2 | 5/2015 | Jackson |
| 9,054,990 B2 | 6/2015 | Davis |
| 9,060,060 B2 | 6/2015 | Lobig |
| 9,069,611 B2 | 6/2015 | Jackson |
| 9,069,929 B2 | 6/2015 | Borland |
| 9,075,655 B2 | 7/2015 | Davis et al. |
| 9,075,657 B2 | 7/2015 | Jackson |
| 9,077,654 B2 | 7/2015 | Davis |
| 9,092,594 B2 | 7/2015 | Borland |
| 9,112,813 B2 | 8/2015 | Jackson |
| 9,116,755 B2 | 8/2015 | Jackson |
| 9,128,767 B2 | 9/2015 | Jackson |
| 9,152,455 B2 | 10/2015 | Jackson |
| 9,176,785 B2 | 11/2015 | Jackson |
| 9,231,886 B2 | 1/2016 | Jackson |
| 9,258,276 B2 | 2/2016 | Dalal et al. |
| 9,262,225 B2 | 2/2016 | Davis |
| 9,268,607 B2 | 2/2016 | Jackson |
| 9,288,147 B2 | 3/2016 | Kern |
| 9,304,896 B2 | 4/2016 | Chandra et al. |
| 9,311,269 B2 | 4/2016 | Davis |
| 9,367,802 B2 | 6/2016 | Arndt et al. |
| 9,405,584 B2 | 8/2016 | Davis |
| 9,413,687 B2 | 8/2016 | Jackson |
| 9,438,515 B2 | 9/2016 | McCormick |
| 9,450,875 B1 | 9/2016 | Tong |
| 9,454,403 B2 | 9/2016 | Davis |
| 9,465,771 B2 | 10/2016 | Davis et al. |
| 9,479,463 B2 | 10/2016 | Davis |
| 9,491,064 B2 | 11/2016 | Jackson |
| 9,509,552 B2 | 11/2016 | Davis |
| 9,575,805 B2 | 2/2017 | Jackson |
| 9,585,281 B2 | 2/2017 | Schnell |
| 9,602,573 B1 | 3/2017 | Abu-Ghazaleh et al. |
| 9,619,296 B2 | 4/2017 | Jackson |
| 9,648,102 B1 | 5/2017 | Davis et al. |
| 9,680,770 B2 | 6/2017 | Davis |
| 9,749,326 B2 | 8/2017 | Davis |
| 9,778,959 B2 | 10/2017 | Jackson |
| 9,785,479 B2 | 10/2017 | Jackson |
| 9,792,249 B2 | 10/2017 | Borland |
| 9,825,860 B2 | 11/2017 | Hu |
| 9,866,477 B2 | 1/2018 | Davis |
| 9,876,735 B2 | 1/2018 | Davis |
| 9,886,322 B2 | 2/2018 | Jackson |
| 9,929,976 B2 | 3/2018 | Davis |
| 9,959,140 B2 | 5/2018 | Jackson |
| 9,959,141 B2 | 5/2018 | Jackson |
| 9,961,013 B2 | 5/2018 | Jackson |
| 9,965,442 B2 | 5/2018 | Borland |
| 9,977,763 B2 | 5/2018 | Davis |
| 9,979,672 B2 | 5/2018 | Jackson |
| 10,021,806 B2 | 7/2018 | Schnell |
| 10,050,970 B2 | 8/2018 | Davis |
| 10,135,731 B2 | 11/2018 | Davis |
| 10,140,245 B2 | 11/2018 | Davis et al. |
| 10,212,092 B2 | 2/2019 | Dalal et al. |
| 10,277,531 B2 | 4/2019 | Jackson |
| 10,311,014 B2 | 6/2019 | Dalton |
| 10,333,862 B2 | 6/2019 | Jackson |
| 10,379,909 B2 | 8/2019 | Jackson |
| 10,445,146 B2 | 10/2019 | Jackson |
| 10,445,148 B2 | 10/2019 | Jackson |
| 10,585,704 B2 | 3/2020 | Jackson |
| 10,608,949 B2 | 3/2020 | Jackson |
| 10,733,028 B2 | 8/2020 | Jackson |
| 10,735,505 B2 | 8/2020 | Abu-Ghazaleh et al. |
| 10,871,999 B2 | 12/2020 | Jackson |
| 10,951,487 B2 | 3/2021 | Jackson |
| 10,977,090 B2 | 4/2021 | Jackson |
| 11,132,277 B2 | 9/2021 | Dalton |
| 11,134,022 B2 | 9/2021 | Jackson |
| 11,144,355 B2 | 10/2021 | Jackson |
| 11,356,385 B2 | 6/2022 | Jackson |
| 11,467,883 B2 | 10/2022 | Jackson |
| 11,494,235 B2 | 11/2022 | Jackson |
| 11,496,415 B2 | 11/2022 | Jackson |
| 11,522,811 B2 | 12/2022 | Jackson |
| 11,522,952 B2 | 12/2022 | Abu-Ghazaleh |
| 11,526,304 B2 | 12/2022 | Davis et al. |
| 11,533,274 B2 | 12/2022 | Jackson |
| 11,537,434 B2 | 12/2022 | Jackson |
| 11,537,435 B2 | 12/2022 | Jackson |
| 11,630,704 B2 | 4/2023 | Jackson |
| 11,650,857 B2 | 5/2023 | Jackson |
| 11,652,706 B2 | 5/2023 | Jackson |
| 11,656,907 B2 | 5/2023 | Jackson |
| 11,658,916 B2 | 5/2023 | Jackson |
| 11,709,709 B2 | 7/2023 | Jackson |
| 11,720,290 B2 | 8/2023 | Davis |
| 11,762,694 B2 | 9/2023 | Jackson |
| 11,765,101 B2 | 9/2023 | Jackson |
| 11,831,564 B2 | 11/2023 | Jackson |
| 11,861,404 B2 | 1/2024 | Jackson |
| 11,886,915 B2 | 1/2024 | Jackson |
| 11,960,937 B2 | 4/2024 | Jackson |
| 12,008,405 B2 | 6/2024 | Jackson |
| 12,009,996 B2 | 6/2024 | Jackson |
| 2001/0010605 A1 | 8/2001 | Aoki |
| 2001/0015733 A1 | 8/2001 | Sklar |
| 2001/0023431 A1 | 9/2001 | Horiguchi |
| 2001/0032109 A1 | 10/2001 | Gonyea |
| 2001/0034752 A1 | 10/2001 | Kremien |
| 2001/0037311 A1 | 11/2001 | McCoy et al. |
| 2001/0044667 A1 | 11/2001 | Nakano |
| 2001/0044759 A1 | 11/2001 | Kutsumi |
| 2001/0046227 A1 | 11/2001 | Matsuhira et al. |
| 2001/0051929 A1 | 12/2001 | Suzuki |
| 2001/0052016 A1 | 12/2001 | Skene et al. |
| 2001/0052108 A1 | 12/2001 | Bowman-Amuah |
| 2002/0002578 A1 | 1/2002 | Yamashita |
| 2002/0002636 A1 | 1/2002 | Vange et al. |
| 2002/0004833 A1 | 1/2002 | Tonouchi |
| 2002/0004912 A1 | 1/2002 | Fung |
| 2002/0007389 A1 | 1/2002 | Jones et al. |
| 2002/0010783 A1 | 1/2002 | Primak et al. |
| 2002/0016809 A1 | 2/2002 | Foulger |
| 2002/0018481 A1 | 2/2002 | Mor et al. |
| 2002/0031364 A1 | 3/2002 | Suzuki et al. |
| 2002/0032716 A1 | 3/2002 | Nagato |
| 2002/0035605 A1 | 3/2002 | Kenton |
| 2002/0040391 A1 | 4/2002 | Chaiken et al. |
| 2002/0049608 A1 | 4/2002 | Hartsell et al. |
| 2002/0052909 A1 | 5/2002 | Seeds |
| 2002/0052961 A1 | 5/2002 | Yoshimine et al. |
| 2002/0053006 A1 | 5/2002 | Kawamoto |
| 2002/0059094 A1 | 5/2002 | Hosea et al. |
| 2002/0059274 A1 | 5/2002 | Hartsell et al. |
| 2002/0062377 A1 | 5/2002 | Hillman et al. |
| 2002/0062451 A1 | 5/2002 | Scheidt et al. |
| 2002/0062465 A1 | 5/2002 | Goto |
| 2002/0065864 A1 | 5/2002 | Hartsell et al. |
| 2002/0083299 A1 | 6/2002 | Van Huben et al. |
| 2002/0083352 A1 | 6/2002 | Fujimoto et al. |
| 2002/0087611 A1 | 7/2002 | Tanaka et al. |
| 2002/0087699 A1 | 7/2002 | Karagiannis et al. |
| 2002/0090075 A1 | 7/2002 | Gabriel |
| 2002/0091786 A1 | 7/2002 | Yamaguchi et al. |
| 2002/0093915 A1 | 7/2002 | Larson |
| 2002/0097732 A1 | 7/2002 | Worster et al. |
| 2002/0099842 A1 | 7/2002 | Jennings et al. |

(56) References Cited

U.S. PATENT DOCUMENTS

| | | |
|---|---|---|
| 2002/0103681 A1 | 8/2002 | Tolis |
| 2002/0103886 A1 | 8/2002 | Rawson, III |
| 2002/0107903 A1 | 8/2002 | Richter et al. |
| 2002/0107962 A1 | 8/2002 | Richter et al. |
| 2002/0116234 A1 | 8/2002 | Nagasawa |
| 2002/0116721 A1 | 8/2002 | Dobes et al. |
| 2002/0120741 A1 | 8/2002 | Webb et al. |
| 2002/0124128 A1 | 9/2002 | Qiu |
| 2002/0129160 A1 | 9/2002 | Habetha |
| 2002/0129274 A1 | 9/2002 | Baskey et al. |
| 2002/0133537 A1 | 9/2002 | Lau et al. |
| 2002/0133821 A1 | 9/2002 | Shteyn |
| 2002/0137565 A1 | 9/2002 | Blanco |
| 2002/0138459 A1 | 9/2002 | Mandal |
| 2002/0138635 A1 | 9/2002 | Redlich et al. |
| 2002/0138679 A1 | 9/2002 | Koning |
| 2002/0143855 A1 | 10/2002 | Traversat |
| 2002/0143944 A1 | 10/2002 | Traversal et al. |
| 2002/0147663 A1 | 10/2002 | Walker et al. |
| 2002/0147771 A1 | 10/2002 | Traversal et al. |
| 2002/0147810 A1 | 10/2002 | Traversal et al. |
| 2002/0151271 A1 | 10/2002 | Tatsuji |
| 2002/0152299 A1 | 10/2002 | Traversal et al. |
| 2002/0152305 A1 | 10/2002 | Jackson et al. |
| 2002/0156675 A1 | 10/2002 | Pedone |
| 2002/0156699 A1 | 10/2002 | Gray et al. |
| 2002/0156891 A1 | 10/2002 | Ulrich et al. |
| 2002/0156893 A1 | 10/2002 | Pouyoul et al. |
| 2002/0156904 A1 | 10/2002 | Gullotta et al. |
| 2002/0156984 A1 | 10/2002 | Padovano |
| 2002/0159452 A1 | 10/2002 | Foster et al. |
| 2002/0161869 A1 | 10/2002 | Griffin et al. |
| 2002/0161917 A1 | 10/2002 | Shapiro et al. |
| 2002/0166110 A1 | 11/2002 | Powell |
| 2002/0166117 A1 | 11/2002 | Abrams et al. |
| 2002/0172205 A1 | 11/2002 | Tagore-Brage et al. |
| 2002/0173984 A1 | 11/2002 | Robertson et al. |
| 2002/0174165 A1 | 11/2002 | Kawaguchi |
| 2002/0174227 A1 | 11/2002 | Hartsell et al. |
| 2002/0184129 A1 | 12/2002 | Arena |
| 2002/0184310 A1 | 12/2002 | Traversal et al. |
| 2002/0184311 A1 | 12/2002 | Traversal et al. |
| 2002/0184357 A1 | 12/2002 | Traversal et al. |
| 2002/0184358 A1 | 12/2002 | Traversal et al. |
| 2002/0186656 A1 | 12/2002 | Vu |
| 2002/0188657 A1 | 12/2002 | Traversal et al. |
| 2002/0194242 A1 | 12/2002 | Chandrasekaran |
| 2002/0194384 A1 | 12/2002 | Habetha |
| 2002/0194412 A1 | 12/2002 | Bottom |
| 2002/0196611 A1 | 12/2002 | Ho et al. |
| 2002/0196734 A1 | 12/2002 | Tanaka et al. |
| 2002/0198734 A1 | 12/2002 | Greene et al. |
| 2002/0198923 A1 | 12/2002 | Hayes |
| 2003/0004772 A1 | 1/2003 | Dutta et al. |
| 2003/0005130 A1 | 1/2003 | Cheng |
| 2003/0005162 A1 | 1/2003 | Habetha |
| 2003/0007493 A1 | 1/2003 | Oi et al. |
| 2003/0009506 A1 | 1/2003 | Bril et al. |
| 2003/0014503 A1 | 1/2003 | Legout et al. |
| 2003/0014524 A1 | 1/2003 | Tormasov |
| 2003/0014539 A1 | 1/2003 | Reznick |
| 2003/0014613 A1 | 1/2003 | Soni |
| 2003/0018573 A1 | 1/2003 | Comas |
| 2003/0018766 A1 | 1/2003 | Duvvuru |
| 2003/0018803 A1 | 1/2003 | El Batt et al. |
| 2003/0028443 A1 | 2/2003 | Ellis |
| 2003/0028585 A1 | 2/2003 | Yeager et al. |
| 2003/0028642 A1* | 2/2003 | Agarwal ............... H04L 69/329 709/224 |
| 2003/0028645 A1 | 2/2003 | Romagnoli |
| 2003/0028656 A1 | 2/2003 | Babka |
| 2003/0033547 A1 | 2/2003 | Larson et al. |
| 2003/0036820 A1 | 2/2003 | Yellepeddy et al. |
| 2003/0039213 A1 | 2/2003 | Holtzman |
| 2003/0039246 A1 | 2/2003 | Guo et al. |
| 2003/0041141 A1 | 2/2003 | Abdelaziz et al. |
| 2003/0041238 A1 | 2/2003 | French |
| 2003/0041266 A1 | 2/2003 | Ke et al. |
| 2003/0041308 A1 | 2/2003 | Ganesan et al. |
| 2003/0046330 A1 | 3/2003 | Hayes |
| 2003/0050924 A1 | 3/2003 | Faybishenko et al. |
| 2003/0050959 A1 | 3/2003 | Faybishenko et al. |
| 2003/0050989 A1 | 3/2003 | Marinescu et al. |
| 2003/0051127 A1 | 3/2003 | Miwa |
| 2003/0055894 A1 | 3/2003 | Yeager et al. |
| 2003/0055898 A1 | 3/2003 | Yeager et al. |
| 2003/0058277 A1 | 3/2003 | Bowman-Amuah |
| 2003/0061260 A1 | 3/2003 | Rajkumar |
| 2003/0061261 A1 | 3/2003 | Greene |
| 2003/0061262 A1* | 3/2003 | Hahn .................. G06F 9/468 718/104 |
| 2003/0065703 A1 | 4/2003 | Aborn |
| 2003/0065784 A1 | 4/2003 | Herrod |
| 2003/0069828 A1 | 4/2003 | Blazey |
| 2003/0069918 A1 | 4/2003 | Lu et al. |
| 2003/0069949 A1 | 4/2003 | Chan et al. |
| 2003/0072263 A1 | 4/2003 | Peterson |
| 2003/0074090 A1 | 4/2003 | Becka |
| 2003/0076832 A1 | 4/2003 | Ni |
| 2003/0081938 A1 | 5/2003 | Nishimura |
| 2003/0084435 A1 | 5/2003 | Messer |
| 2003/0088457 A1 | 5/2003 | Keil et al. |
| 2003/0093255 A1 | 5/2003 | Freyensee et al. |
| 2003/0093624 A1 | 5/2003 | Arimilli et al. |
| 2003/0093647 A1 | 5/2003 | Mogi |
| 2003/0097284 A1 | 5/2003 | Shinozaki |
| 2003/0097429 A1 | 5/2003 | Wu et al. |
| 2003/0097439 A1 | 5/2003 | Strayer et al. |
| 2003/0101084 A1 | 5/2003 | Perez |
| 2003/0103413 A1 | 6/2003 | Jacobi et al. |
| 2003/0105655 A1 | 6/2003 | Kimbrel et al. |
| 2003/0105721 A1 | 6/2003 | Ginter et al. |
| 2003/0110262 A1 | 6/2003 | Hasan et al. |
| 2003/0112792 A1 | 6/2003 | Cranor et al. |
| 2003/0115562 A1 | 6/2003 | Martin |
| 2003/0120472 A1 | 6/2003 | Lind |
| 2003/0120701 A1 | 6/2003 | Pulsipher et al. |
| 2003/0120704 A1 | 6/2003 | Tran et al. |
| 2003/0120710 A1 | 6/2003 | Pulsipher et al. |
| 2003/0120780 A1 | 6/2003 | Zhu |
| 2003/0126013 A1 | 7/2003 | Shand |
| 2003/0126200 A1 | 7/2003 | Wolff |
| 2003/0126202 A1 | 7/2003 | Watt |
| 2003/0126265 A1 | 7/2003 | Aziz et al. |
| 2003/0126283 A1 | 7/2003 | Prakash et al. |
| 2003/0131043 A1 | 7/2003 | Berg et al. |
| 2003/0131209 A1 | 7/2003 | Lee |
| 2003/0135509 A1 | 7/2003 | Davis |
| 2003/0135615 A1 | 7/2003 | Wyatt |
| 2003/0135621 A1 | 7/2003 | Romagnoli |
| 2003/0140190 A1 | 7/2003 | Mahony et al. |
| 2003/0144894 A1 | 7/2003 | Robertson et al. |
| 2003/0149685 A1 | 8/2003 | Trossman et al. |
| 2003/0154112 A1 | 8/2003 | Neiman et al. |
| 2003/0158884 A1 | 8/2003 | Alford |
| 2003/0158940 A1 | 8/2003 | Leigh |
| 2003/0159083 A1 | 8/2003 | Fukuhara et al. |
| 2003/0169269 A1 | 9/2003 | Sasaki et al. |
| 2003/0172191 A1 | 9/2003 | Williams |
| 2003/0177050 A1 | 9/2003 | Crampton |
| 2003/0177121 A1 | 9/2003 | Moona et al. |
| 2003/0177239 A1 | 9/2003 | Shinohara |
| 2003/0177334 A1 | 9/2003 | King et al. |
| 2003/0182421 A1 | 9/2003 | Faybishenko et al. |
| 2003/0182425 A1 | 9/2003 | Kurakake |
| 2003/0182429 A1 | 9/2003 | Jagels |
| 2003/0182496 A1 | 9/2003 | Yoo |
| 2003/0185229 A1 | 10/2003 | Shachar et al. |
| 2003/0187907 A1 | 10/2003 | Ito |
| 2003/0188083 A1 | 10/2003 | Kumar et al. |
| 2003/0191795 A1 | 10/2003 | Bernardin et al. |
| 2003/0191857 A1 | 10/2003 | Terrell et al. |
| 2003/0193402 A1 | 10/2003 | Post et al. |
| 2003/0195931 A1 | 10/2003 | Dauger |

(56) References Cited

U.S. PATENT DOCUMENTS

| | | |
|---|---|---|
| 2003/0200109 A1 | 10/2003 | Honda et al. |
| 2003/0200258 A1 | 10/2003 | Hayashi |
| 2003/0202520 A1 | 10/2003 | Witkowski et al. |
| 2003/0202709 A1 | 10/2003 | Simard et al. |
| 2003/0204709 A1 | 10/2003 | Rich |
| 2003/0204773 A1 | 10/2003 | Petersen et al. |
| 2003/0204786 A1 | 10/2003 | Dinker |
| 2003/0210694 A1 | 11/2003 | Jayaraman et al. |
| 2003/0212738 A1 | 11/2003 | Wookey et al. |
| 2003/0212792 A1 | 11/2003 | Raymond |
| 2003/0216927 A1 | 11/2003 | Sridhar |
| 2003/0216951 A1 | 11/2003 | Ginis et al. |
| 2003/0217129 A1 | 11/2003 | Knittel et al. |
| 2003/0218627 A1 | 11/2003 | Gusler |
| 2003/0227934 A1 | 12/2003 | White |
| 2003/0231624 A1 | 12/2003 | Alappat et al. |
| 2003/0231647 A1 | 12/2003 | Petrovykh |
| 2003/0233378 A1 | 12/2003 | Butler et al. |
| 2003/0233446 A1 | 12/2003 | Earl |
| 2003/0236745 A1 | 12/2003 | Hartsell et al. |
| 2003/0236854 A1 | 12/2003 | Rom |
| 2003/0236880 A1 | 12/2003 | Srivastava |
| 2004/0003077 A1 | 1/2004 | Bantz et al. |
| 2004/0003086 A1 | 1/2004 | Parham et al. |
| 2004/0009751 A1 | 1/2004 | Michaelis |
| 2004/0010544 A1 | 1/2004 | Slater et al. |
| 2004/0010550 A1 | 1/2004 | Gopinath |
| 2004/0010592 A1 | 1/2004 | Carver et al. |
| 2004/0011761 A1 | 1/2004 | Hensley |
| 2004/0013113 A1 | 1/2004 | Singh et al. |
| 2004/0015579 A1 | 1/2004 | Cooper et al. |
| 2004/0015973 A1 | 1/2004 | Skovira |
| 2004/0017806 A1 | 1/2004 | Yazdy et al. |
| 2004/0017808 A1 | 1/2004 | Forbes et al. |
| 2004/0021678 A1 | 2/2004 | Ullah |
| 2004/0024853 A1 | 2/2004 | Cates |
| 2004/0030741 A1 | 2/2004 | Wolton et al. |
| 2004/0030743 A1 | 2/2004 | Hugly et al. |
| 2004/0030794 A1 | 2/2004 | Hugly et al. |
| 2004/0030938 A1 | 2/2004 | Barr et al. |
| 2004/0034873 A1 | 2/2004 | Zenoni |
| 2004/0039815 A1 | 2/2004 | Evans et al. |
| 2004/0042487 A1 | 3/2004 | Ossman |
| 2004/0043755 A1 | 3/2004 | Shimooka |
| 2004/0044718 A1 | 3/2004 | Ferstl et al. |
| 2004/0044727 A1 | 3/2004 | Abdelaziz et al. |
| 2004/0054630 A1 | 3/2004 | Ginter et al. |
| 2004/0054777 A1 | 3/2004 | Ackaouy et al. |
| 2004/0054780 A1 | 3/2004 | Romero |
| 2004/0054807 A1 | 3/2004 | Harvey et al. |
| 2004/0054999 A1 | 3/2004 | Willen |
| 2004/0064511 A1 | 4/2004 | Abdel-Aziz et al. |
| 2004/0064512 A1 | 4/2004 | Arora et al. |
| 2004/0064568 A1 | 4/2004 | Arora et al. |
| 2004/0064817 A1 | 4/2004 | Shibayama et al. |
| 2004/0066782 A1 | 4/2004 | Nassar |
| 2004/0068411 A1 | 4/2004 | Scanlan |
| 2004/0068676 A1 | 4/2004 | Larson et al. |
| 2004/0068730 A1 | 4/2004 | Miller et al. |
| 2004/0071147 A1 | 4/2004 | Roadknight et al. |
| 2004/0073650 A1 | 4/2004 | Nakamura |
| 2004/0073854 A1 | 4/2004 | Windl |
| 2004/0073908 A1 | 4/2004 | Benejam et al. |
| 2004/0081148 A1 | 4/2004 | Yamada |
| 2004/0083287 A1 | 4/2004 | Gao et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0098391 A1 | 5/2004 | Robertson et al. |
| 2004/0098424 A1 | 5/2004 | Seidenberg |
| 2004/0098447 A1 | 5/2004 | Verbeke et al. |
| 2004/0103078 A1 | 5/2004 | Smedberg et al. |
| 2004/0103305 A1 | 5/2004 | Ginter et al. |
| 2004/0103339 A1 | 5/2004 | Chalasani et al. |
| 2004/0103413 A1 | 5/2004 | Mandava et al. |
| 2004/0107123 A1 | 6/2004 | Haffner |
| 2004/0107273 A1 | 6/2004 | Biran et al. |
| 2004/0107281 A1 | 6/2004 | Bose et al. |
| 2004/0109428 A1 | 6/2004 | Krishnamurthy |
| 2004/0111307 A1 | 6/2004 | Demsky et al. |
| 2004/0111612 A1 | 6/2004 | Choi et al. |
| 2004/0117610 A1 | 6/2004 | Hensley |
| 2004/0117768 A1 | 6/2004 | Chang et al. |
| 2004/0121777 A1 | 6/2004 | Schwarz et al. |
| 2004/0122970 A1 | 6/2004 | Kawaguchi et al. |
| 2004/0128495 A1 | 7/2004 | Hensley |
| 2004/0128670 A1 | 7/2004 | Robinson et al. |
| 2004/0133620 A1 | 7/2004 | Habelha |
| 2004/0133640 A1 | 7/2004 | Yeager et al. |
| 2004/0133665 A1 | 7/2004 | Deboer et al. |
| 2004/0133703 A1 | 7/2004 | Habelha |
| 2004/0135780 A1 | 7/2004 | Nims |
| 2004/0139202 A1 | 7/2004 | Talwar et al. |
| 2004/0139464 A1 | 7/2004 | Ellis et al. |
| 2004/0141521 A1 | 7/2004 | George |
| 2004/0143664 A1 | 7/2004 | Usa et al. |
| 2004/0148326 A1 | 7/2004 | Nadgir |
| 2004/0148390 A1 | 7/2004 | Cleary et al. |
| 2004/0150664 A1 | 8/2004 | Baudisch |
| 2004/0151181 A1 | 8/2004 | Chu |
| 2004/0153563 A1 | 8/2004 | Shay et al. |
| 2004/0158637 A1 | 8/2004 | Lee |
| 2004/0162871 A1 | 8/2004 | Pabla et al. |
| 2004/0165588 A1 | 8/2004 | Pandya |
| 2004/0172464 A1 | 9/2004 | Nag |
| 2004/0179528 A1 | 9/2004 | Powers et al. |
| 2004/0181370 A1 | 9/2004 | Froehlich et al. |
| 2004/0181476 A1 | 9/2004 | Smith et al. |
| 2004/0189677 A1 | 9/2004 | Amann et al. |
| 2004/0193674 A1 | 9/2004 | Kurosawa et al. |
| 2004/0194061 A1 | 9/2004 | Fujino |
| 2004/0194098 A1 | 9/2004 | Chung et al. |
| 2004/0196308 A1 | 10/2004 | Blomquist |
| 2004/0199566 A1 | 10/2004 | Carlson |
| 2004/0199621 A1 | 10/2004 | Lau |
| 2004/0199646 A1 | 10/2004 | Susai et al. |
| 2004/0199918 A1 | 10/2004 | Skovira |
| 2004/0203670 A1 | 10/2004 | King et al. |
| 2004/0204978 A1 | 10/2004 | Rayrole |
| 2004/0205101 A1 | 10/2004 | Radhakrishnan |
| 2004/0205206 A1 | 10/2004 | Naik et al. |
| 2004/0210624 A1 | 10/2004 | Andrzejak et al. |
| 2004/0210632 A1 | 10/2004 | Carlson |
| 2004/0210663 A1 | 10/2004 | Phillips |
| 2004/0210693 A1 | 10/2004 | Zeitler et al. |
| 2004/0213395 A1 | 10/2004 | Ishii et al. |
| 2004/0215780 A1 | 10/2004 | Kawato |
| 2004/0215858 A1 | 10/2004 | Armstrong |
| 2004/0215864 A1 | 10/2004 | Arimilli et al. |
| 2004/0215991 A1 | 10/2004 | McAfee et al. |
| 2004/0216121 A1 | 10/2004 | Jones et al. |
| 2004/0218615 A1 | 11/2004 | Griffin et al. |
| 2004/0221038 A1 | 11/2004 | Clarke et al. |
| 2004/0236852 A1 | 11/2004 | Birkestrand et al. |
| 2004/0243378 A1 | 12/2004 | Schnatterly et al. |
| 2004/0243466 A1 | 12/2004 | Trzybinski et al. |
| 2004/0244006 A1 | 12/2004 | Kaufman et al. |
| 2004/0246900 A1 | 12/2004 | Zhang et al. |
| 2004/0248576 A1 | 12/2004 | Ghiglino |
| 2004/0260701 A1 | 12/2004 | Lehikoinen |
| 2004/0260746 A1 | 12/2004 | Brown et al. |
| 2004/0267486 A1 | 12/2004 | Percer et al. |
| 2004/0267897 A1* | 12/2004 | Hill .................. G06F 9/505 709/217 |
| 2004/0267901 A1 | 12/2004 | Gomez |
| 2004/0268035 A1 | 12/2004 | Ueno |
| 2004/0268315 A1 | 12/2004 | Gouriou |
| 2005/0005200 A1 | 1/2005 | Matena |
| 2005/0010465 A1 | 1/2005 | Drew et al. |
| 2005/0010608 A1 | 1/2005 | Horikawa |
| 2005/0015378 A1 | 1/2005 | Gammel et al. |
| 2005/0015621 A1 | 1/2005 | Ashley et al. |
| 2005/0018604 A1 | 1/2005 | Dropps et al. |
| 2005/0018606 A1 | 1/2005 | Dropps et al. |

(56) References Cited

U.S. PATENT DOCUMENTS

| | | |
|---|---|---|
| 2005/0018663 A1 | 1/2005 | Dropps et al. |
| 2005/0021291 A1 | 1/2005 | Retlich |
| 2005/0021371 A1 | 1/2005 | Basone et al. |
| 2005/0021606 A1 | 1/2005 | Davies et al. |
| 2005/0021728 A1 | 1/2005 | Sugimoto |
| 2005/0021759 A1 | 1/2005 | Gupta et al. |
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027864 A1 | 2/2005 | Bozak et al. |
| 2005/0027865 A1 | 2/2005 | Bozak et al. |
| 2005/0027870 A1 | 2/2005 | Trebes et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0034070 A1 | 2/2005 | Meir et al. |
| 2005/0038808 A1 | 2/2005 | Kutch |
| 2005/0038835 A1 | 2/2005 | Chidambaran et al. |
| 2005/0039171 A1 | 2/2005 | Avakian |
| 2005/0044167 A1 | 2/2005 | Kobayashi |
| 2005/0044195 A1 | 2/2005 | Westfall |
| 2005/0044205 A1 | 2/2005 | Sankaranarayan et al. |
| 2005/0044226 A1 | 2/2005 | McDermott et al. |
| 2005/0044228 A1 | 2/2005 | Birkestrand et al. |
| 2005/0049884 A1 | 3/2005 | Hunt et al. |
| 2005/0050057 A1 | 3/2005 | Mital et al. |
| 2005/0050200 A1 | 3/2005 | Mizoguchi |
| 2005/0050270 A1 | 3/2005 | Horn et al. |
| 2005/0054354 A1 | 3/2005 | Roman et al. |
| 2005/0055322 A1 | 3/2005 | Masters et al. |
| 2005/0055442 A1 | 3/2005 | Reeves |
| 2005/0055694 A1 | 3/2005 | Lee |
| 2005/0055697 A1 | 3/2005 | Buco |
| 2005/0055698 A1 | 3/2005 | Sasaki et al. |
| 2005/0060360 A1 | 3/2005 | Doyle et al. |
| 2005/0060608 A1 | 3/2005 | Marchand |
| 2005/0065826 A1 | 3/2005 | Baker et al. |
| 2005/0066302 A1 | 3/2005 | Kanade |
| 2005/0066358 A1 | 3/2005 | Anderson et al. |
| 2005/0068922 A1 | 3/2005 | Jalali |
| 2005/0071843 A1 | 3/2005 | Guo et al. |
| 2005/0076145 A1 | 4/2005 | Ben-Zvi et al. |
| 2005/0077921 A1 | 4/2005 | Percer et al. |
| 2005/0080845 A1 | 4/2005 | Gopinath |
| 2005/0080891 A1 | 4/2005 | Cauthron |
| 2005/0080930 A1 | 4/2005 | Joseph |
| 2005/0081210 A1 | 4/2005 | Day |
| 2005/0086300 A1 | 4/2005 | Yeager et al. |
| 2005/0086356 A1 | 4/2005 | Shah |
| 2005/0091505 A1 | 4/2005 | Riley et al. |
| 2005/0097560 A1 | 5/2005 | Rolia et al. |
| 2005/0102396 A1 | 5/2005 | Hipp |
| 2005/0102400 A1 | 5/2005 | Nakahara |
| 2005/0102683 A1 | 5/2005 | Branson |
| 2005/0105538 A1 | 5/2005 | Perera et al. |
| 2005/0108407 A1 | 5/2005 | Johnson et al. |
| 2005/0108703 A1 | 5/2005 | Hellier |
| 2005/0113203 A1 | 5/2005 | Mueller et al. |
| 2005/0114460 A1 | 5/2005 | Chen |
| 2005/0114478 A1 | 5/2005 | Popescu et al. |
| 2005/0114551 A1 | 5/2005 | Basu et al. |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0125537 A1 | 6/2005 | Martins et al. |
| 2005/0125538 A1 | 6/2005 | Tawil |
| 2005/0131898 A1 | 6/2005 | Fatula, Jr. |
| 2005/0132378 A1 | 6/2005 | Horvitz et al. |
| 2005/0132379 A1 | 6/2005 | Sankaran et al. |
| 2005/0138618 A1 | 6/2005 | Gebhart |
| 2005/0141424 A1 | 6/2005 | Lim et al. |
| 2005/0144315 A1 | 6/2005 | George et al. |
| 2005/0144619 A1 | 6/2005 | Newman |
| 2005/0149940 A1* | 7/2005 | Calinescu ............ G06F 9/5061 718/104 |
| 2005/0154861 A1 | 7/2005 | Arimilli et al. |
| 2005/0155033 A1 | 7/2005 | Luoffo et al. |
| 2005/0156732 A1 | 7/2005 | Matsumura |
| 2005/0160137 A1 | 7/2005 | Ishikawa et al. |
| 2005/0160413 A1 | 7/2005 | Broussard |
| 2005/0160424 A1 | 7/2005 | Broussard |
| 2005/0163143 A1 | 7/2005 | Kalantar et al. |
| 2005/0165925 A1 | 7/2005 | Dan et al. |
| 2005/0169179 A1 | 8/2005 | Antal |
| 2005/0172291 A1 | 8/2005 | Das et al. |
| 2005/0177600 A1 | 8/2005 | Eilam et al. |
| 2005/0187866 A1 | 8/2005 | Lee |
| 2005/0188088 A1 | 8/2005 | Fellenstein et al. |
| 2005/0188089 A1 | 8/2005 | Lichtenstein et al. |
| 2005/0188091 A1 | 8/2005 | Szabo et al. |
| 2005/0190236 A1 | 9/2005 | Ishimoto |
| 2005/0192771 A1 | 9/2005 | Fischer et al. |
| 2005/0193103 A1 | 9/2005 | Drabik |
| 2005/0193225 A1 | 9/2005 | Macbeth |
| 2005/0193231 A1 | 9/2005 | Scheuren |
| 2005/0195075 A1 | 9/2005 | McGraw |
| 2005/0197877 A1 | 9/2005 | Kaiinoski |
| 2005/0198200 A1 | 9/2005 | Subramanian et al. |
| 2005/0198516 A1 | 9/2005 | Marr |
| 2005/0202922 A1 | 9/2005 | Thomas |
| 2005/0203761 A1 | 9/2005 | Barr |
| 2005/0204040 A1 | 9/2005 | Ferri et al. |
| 2005/0206917 A1 | 9/2005 | Ferlitsch |
| 2005/0209892 A1 | 9/2005 | Miller |
| 2005/0210470 A1 | 9/2005 | Chung et al. |
| 2005/0213507 A1 | 9/2005 | Banerjee et al. |
| 2005/0213560 A1 | 9/2005 | Duvvury |
| 2005/0222885 A1 | 10/2005 | Chen et al. |
| 2005/0228852 A1 | 10/2005 | Santos et al. |
| 2005/0228856 A1 | 10/2005 | Swildens |
| 2005/0228892 A1 | 10/2005 | Riley et al. |
| 2005/0234846 A1 | 10/2005 | Davidson et al. |
| 2005/0235137 A1 | 10/2005 | Barr et al. |
| 2005/0235150 A1 | 10/2005 | Kaler et al. |
| 2005/0240688 A1 | 10/2005 | Moerman et al. |
| 2005/0243867 A1 | 11/2005 | Petite |
| 2005/0246705 A1 | 11/2005 | Etelson et al. |
| 2005/0249341 A1 | 11/2005 | Mahone et al. |
| 2005/0256942 A1 | 11/2005 | McCardle et al. |
| 2005/0256946 A1 | 11/2005 | Childress et al. |
| 2005/0259397 A1 | 11/2005 | Bash et al. |
| 2005/0259683 A1* | 11/2005 | Bishop ............... H04L 41/0896 370/468 |
| 2005/0262495 A1 | 11/2005 | Fung et al. |
| 2005/0262508 A1 | 11/2005 | Asano et al. |
| 2005/0267948 A1 | 12/2005 | Mckinley et al. |
| 2005/0268063 A1 | 12/2005 | Diao et al. |
| 2005/0278392 A1 | 12/2005 | Hansen et al. |
| 2005/0278760 A1 | 12/2005 | Dewar et al. |
| 2005/0283481 A1* | 12/2005 | Rosenbach ........... G06F 9/5044 |
| 2005/0283534 A1 | 12/2005 | Bigagli et al. |
| 2005/0283782 A1* | 12/2005 | Lu ........................ G06F 9/5072 718/100 |
| 2005/0283822 A1 | 12/2005 | Appleby et al. |
| 2005/0288961 A1 | 12/2005 | Tabrizi |
| 2005/0289540 A1 | 12/2005 | Nguyen et al. |
| 2006/0002311 A1 | 1/2006 | Iwanaga et al. |
| 2006/0008256 A1 | 1/2006 | Khedouri et al. |
| 2006/0010445 A1 | 1/2006 | Petersen et al. |
| 2006/0013132 A1 | 1/2006 | Garnett et al. |
| 2006/0013218 A1 | 1/2006 | Shore et al. |
| 2006/0015555 A1 | 1/2006 | Douglass et al. |
| 2006/0015637 A1 | 1/2006 | Chung |
| 2006/0015651 A1 | 1/2006 | Freimuth |
| 2006/0015773 A1 | 1/2006 | Singh et al. |
| 2006/0023245 A1 | 2/2006 | Sato et al. |
| 2006/0028991 A1 | 2/2006 | Tan et al. |
| 2006/0029053 A1 | 2/2006 | Roberts et al. |
| 2006/0031379 A1 | 2/2006 | Kasriel et al. |
| 2006/0031547 A1 | 2/2006 | Tsui et al. |
| 2006/0031813 A1 | 2/2006 | Bishop et al. |
| 2006/0036743 A1 | 2/2006 | Deng et al. |
| 2006/0037016 A1 | 2/2006 | Saha et al. |
| 2006/0039246 A1 | 2/2006 | King et al. |

(56) References Cited

U.S. PATENT DOCUMENTS

| | | |
|---|---|---|
| 2006/0041444 A1 | 2/2006 | Flores et al. |
| 2006/0047920 A1 | 3/2006 | Moore et al. |
| 2006/0048157 A1 | 3/2006 | Dawson et al. |
| 2006/0053215 A1 | 3/2006 | Sharma |
| 2006/0053216 A1 | 3/2006 | Deokar et al. |
| 2006/0056291 A1 | 3/2006 | Baker et al. |
| 2006/0056373 A1 | 3/2006 | Legg |
| 2006/0059253 A1 | 3/2006 | Goodman et al. |
| 2006/0063690 A1 | 3/2006 | Billiauw et al. |
| 2006/0069261 A1 | 3/2006 | Bonneau |
| 2006/0069621 A1* | 3/2006 | Chang ............... G06Q 30/0601 705/26.1 |
| 2006/0069671 A1 | 3/2006 | Conley et al. |
| 2006/0069774 A1 | 3/2006 | Chen et al. |
| 2006/0069926 A1 | 3/2006 | Ginter et al. |
| 2006/0074925 A1 | 4/2006 | Bixby |
| 2006/0074940 A1 | 4/2006 | Craft et al. |
| 2006/0088015 A1 | 4/2006 | Kakivaya et al. |
| 2006/0089894 A1 | 4/2006 | Balk et al. |
| 2006/0090003 A1 | 4/2006 | Kakivaya et al. |
| 2006/0090025 A1 | 4/2006 | Tufford et al. |
| 2006/0090136 A1 | 4/2006 | Miller et al. |
| 2006/0092942 A1 | 5/2006 | Newson |
| 2006/0095917 A1 | 5/2006 | Black-Ziegelbein et al. |
| 2006/0097863 A1 | 5/2006 | Horowitz et al. |
| 2006/0112184 A1 | 5/2006 | Kuo |
| 2006/0112308 A1 | 5/2006 | Crawford |
| 2006/0117064 A1 | 5/2006 | Wilson |
| 2006/0117208 A1 | 6/2006 | Davidson |
| 2006/0117317 A1 | 6/2006 | Crawford et al. |
| 2006/0120322 A1 | 6/2006 | Lindskog |
| 2006/0120411 A1 | 6/2006 | Basu |
| 2006/0126619 A1 | 6/2006 | Teisberg et al. |
| 2006/0126667 A1 | 6/2006 | Smith et al. |
| 2006/0129667 A1 | 6/2006 | Anderson |
| 2006/0129687 A1 | 6/2006 | Goldszmidt et al. |
| 2006/0136235 A1 | 6/2006 | Keohane et al. |
| 2006/0136570 A1 | 6/2006 | Pandya |
| 2006/0136908 A1 | 6/2006 | Gebhart et al. |
| 2006/0136928 A1 | 6/2006 | Crawford et al. |
| 2006/0136929 A1 | 6/2006 | Miller et al. |
| 2006/0140211 A1 | 6/2006 | Huang et al. |
| 2006/0143350 A1 | 6/2006 | Miloushev et al. |
| 2006/0149695 A1 | 7/2006 | Bossman et al. |
| 2006/0153191 A1 | 7/2006 | Rajsic et al. |
| 2006/0155740 A1 | 7/2006 | Chen et al. |
| 2006/0155912 A1 | 7/2006 | Singh et al. |
| 2006/0156273 A1 | 7/2006 | Narayan et al. |
| 2006/0159088 A1 | 7/2006 | Aghvami et al. |
| 2006/0161466 A1 | 7/2006 | Trinon et al. |
| 2006/0161585 A1 | 7/2006 | Clarke et al. |
| 2006/0165040 A1 | 7/2006 | Rathod |
| 2006/0165074 A1* | 7/2006 | Modi ............... H04L 61/35 370/389 |
| 2006/0168107 A1 | 7/2006 | Balan et al. |
| 2006/0168224 A1 | 7/2006 | Midgley |
| 2006/0173730 A1 | 8/2006 | Birkestrand |
| 2006/0174342 A1 | 8/2006 | Zaheer et al. |
| 2006/0179241 A1 | 8/2006 | Clark et al. |
| 2006/0182119 A1 | 8/2006 | Li |
| 2006/0184939 A1 | 8/2006 | Sahoo |
| 2006/0189349 A1 | 8/2006 | Montulli et al. |
| 2006/0190775 A1 | 8/2006 | Aggarwal et al. |
| 2006/0190975 A1 | 8/2006 | Gonzalez |
| 2006/0200773 A1 | 9/2006 | Nocera et al. |
| 2006/0206621 A1 | 9/2006 | Toebes |
| 2006/0208870 A1 | 9/2006 | Dousson |
| 2006/0212332 A1 | 9/2006 | Jackson |
| 2006/0212333 A1 | 9/2006 | Jackson |
| 2006/0212334 A1 | 9/2006 | Jackson |
| 2006/0212740 A1 | 9/2006 | Jackson |
| 2006/0218301 A1 | 9/2006 | O'Toole et al. |
| 2006/0224725 A1 | 10/2006 | Bali et al. |
| 2006/0224740 A1 | 10/2006 | Sievers-Tostes |
| 2006/0224741 A1 | 10/2006 | Jackson |
| 2006/0227810 A1 | 10/2006 | Childress et al. |
| 2006/0229920 A1 | 10/2006 | Favorel et al. |
| 2006/0230140 A1 | 10/2006 | Aoyama et al. |
| 2006/0230149 A1 | 10/2006 | Jackson |
| 2006/0236368 A1 | 10/2006 | Raja et al. |
| 2006/0236371 A1 | 10/2006 | Fish |
| 2006/0248141 A1 | 11/2006 | Mukherjee |
| 2006/0248197 A1 | 11/2006 | Evans et al. |
| 2006/0248359 A1 | 11/2006 | Fung |
| 2006/0250971 A1 | 11/2006 | Gammenthaler et al. |
| 2006/0251419 A1 | 11/2006 | Zadikian et al. |
| 2006/0253570 A1 | 11/2006 | Biswas et al. |
| 2006/0259734 A1 | 11/2006 | Sheu et al. |
| 2006/0265508 A1 | 11/2006 | Angel et al. |
| 2006/0265609 A1 | 11/2006 | Fung |
| 2006/0268742 A1 | 11/2006 | Chu |
| 2006/0271552 A1 | 11/2006 | McChesney et al. |
| 2006/0271928 A1 | 11/2006 | Gao et al. |
| 2006/0277278 A1 | 12/2006 | Hegde |
| 2006/0282505 A1 | 12/2006 | Hasha et al. |
| 2006/0282547 A1 | 12/2006 | Hasha et al. |
| 2006/0294219 A1 | 12/2006 | Ogawa |
| 2006/0294238 A1 | 12/2006 | Naik et al. |
| 2007/0003051 A1 | 1/2007 | Kiss et al. |
| 2007/0006001 A1 | 1/2007 | Isobe et al. |
| 2007/0011224 A1 | 1/2007 | Mena et al. |
| 2007/0011302 A1 | 1/2007 | Groner et al. |
| 2007/0022425 A1 | 1/2007 | Jackson |
| 2007/0028244 A1 | 2/2007 | Landis et al. |
| 2007/0033292 A1 | 2/2007 | Sull et al. |
| 2007/0033533 A1 | 2/2007 | Sull et al. |
| 2007/0041335 A1 | 2/2007 | Znamova et al. |
| 2007/0043591 A1 | 2/2007 | Meretei |
| 2007/0044010 A1 | 2/2007 | Sull et al. |
| 2007/0047195 A1 | 3/2007 | Merkin et al. |
| 2007/0050777 A1 | 3/2007 | Hutchinson et al. |
| 2007/0061441 A1* | 3/2007 | Landis ............... G06F 9/45558 709/224 |
| 2007/0067366 A1 | 3/2007 | Landis |
| 2007/0067435 A1 | 3/2007 | Landis et al. |
| 2007/0067766 A1 | 3/2007 | Tal |
| 2007/0076653 A1 | 4/2007 | Park et al. |
| 2007/0081315 A1 | 4/2007 | Mondor et al. |
| 2007/0083899 A1 | 4/2007 | Compton et al. |
| 2007/0088822 A1 | 4/2007 | Coile et al. |
| 2007/0094002 A1 | 4/2007 | Berstis |
| 2007/0094486 A1 | 4/2007 | Moore et al. |
| 2007/0094665 A1 | 4/2007 | Jackson |
| 2007/0094691 A1 | 4/2007 | Gazdzinski |
| 2007/0109968 A1 | 5/2007 | Hussain et al. |
| 2007/0118496 A1 | 5/2007 | Bornhoevd |
| 2007/0124344 A1 | 5/2007 | Rajakannimariyan et al. |
| 2007/0130397 A1 | 6/2007 | Tsu |
| 2007/0143824 A1 | 6/2007 | Shahbazi |
| 2007/0150426 A1 | 6/2007 | Asher et al. |
| 2007/0150444 A1 | 6/2007 | Chesnais et al. |
| 2007/0155406 A1 | 7/2007 | Dowling et al. |
| 2007/0174390 A1 | 7/2007 | Silvain et al. |
| 2007/0180310 A1 | 8/2007 | Johnson et al. |
| 2007/0180380 A1 | 8/2007 | Khavari et al. |
| 2007/0204036 A1 | 8/2007 | Mohaban et al. |
| 2007/0209072 A1 | 9/2007 | Chen |
| 2007/0220520 A1 | 9/2007 | Tajima |
| 2007/0226313 A1 | 9/2007 | Li et al. |
| 2007/0226795 A1 | 9/2007 | Conti et al. |
| 2007/0233828 A1 | 10/2007 | Gilbert et al. |
| 2007/0237115 A1 | 10/2007 | Bae |
| 2007/0240162 A1 | 10/2007 | Coleman et al. |
| 2007/0253017 A1 | 11/2007 | Czyszczewski et al. |
| 2007/0260716 A1 | 11/2007 | Gnanasambandam et al. |
| 2007/0264986 A1 | 11/2007 | Warrillow et al. |
| 2007/0266136 A1 | 11/2007 | Esfahany et al. |
| 2007/0268909 A1 | 11/2007 | Chen |
| 2007/0271375 A1 | 11/2007 | Hwang |
| 2007/0280230 A1 | 12/2007 | Park |
| 2007/0286009 A1 | 12/2007 | Norman |
| 2007/0288585 A1 | 12/2007 | Sekiguchi et al. |
| 2007/0297350 A1 | 12/2007 | Eilam et al. |
| 2007/0299946 A1 | 12/2007 | El-Damhougy et al. |

(56) References Cited

U.S. PATENT DOCUMENTS

| | | |
|---|---|---|
| 2007/0299947 A1 | 12/2007 | El-Damhougy et al. |
| 2007/0299950 A1 | 12/2007 | Kulkarni et al. |
| 2008/0013453 A1 | 1/2008 | Chiang et al. |
| 2008/0016198 A1 | 1/2008 | Johnston-Watt et al. |
| 2008/0034082 A1 | 2/2008 | McKinney |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0065835 A1 | 3/2008 | Iacobovici |
| 2008/0075089 A1 | 3/2008 | Evans et al. |
| 2008/0082663 A1 | 4/2008 | Mouli et al. |
| 2008/0089358 A1 | 4/2008 | Basso et al. |
| 2008/0104231 A1 | 5/2008 | Dey et al. |
| 2008/0104264 A1 | 5/2008 | Duerk et al. |
| 2008/0126523 A1 | 5/2008 | Tantrum |
| 2008/0140771 A1 | 6/2008 | Vass et al. |
| 2008/0140930 A1 | 6/2008 | Hotchkiss |
| 2008/0155070 A1 | 6/2008 | El-Damhougy et al. |
| 2008/0155100 A1 | 6/2008 | Ahmed et al. |
| 2008/0159745 A1 | 7/2008 | Segal |
| 2008/0162691 A1 | 7/2008 | Zhang et al. |
| 2008/0168451 A1 | 7/2008 | Challenger et al. |
| 2008/0183865 A1 | 7/2008 | Appleby et al. |
| 2008/0183882 A1 | 7/2008 | Flynn et al. |
| 2008/0184248 A1 | 7/2008 | Barua et al. |
| 2008/0186965 A1 | 8/2008 | Zheng et al. |
| 2008/0196043 A1 | 8/2008 | Feinleib |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0215730 A1 | 9/2008 | Sundaram et al. |
| 2008/0216082 A1 | 9/2008 | Eilam et al. |
| 2008/0217021 A1 | 9/2008 | Lembcke et al. |
| 2008/0222434 A1 | 9/2008 | Shimizu et al. |
| 2008/0232378 A1 | 9/2008 | Moorthy |
| 2008/0235443 A1 | 9/2008 | Chow et al. |
| 2008/0235702 A1 | 9/2008 | Eilam et al. |
| 2008/0239649 A1 | 10/2008 | Bradicich |
| 2008/0243634 A1 | 10/2008 | Dworkin et al. |
| 2008/0250181 A1 | 10/2008 | Li et al. |
| 2008/0255953 A1 | 10/2008 | Chang et al. |
| 2008/0259555 A1 | 10/2008 | Bechtolsheim et al. |
| 2008/0259788 A1 | 10/2008 | Wang et al. |
| 2008/0263131 A1 | 10/2008 | Hinni et al. |
| 2008/0263558 A1 | 10/2008 | Lin et al. |
| 2008/0266793 A1 | 10/2008 | Lee |
| 2008/0270599 A1 | 10/2008 | Tamir et al. |
| 2008/0270731 A1 | 10/2008 | Bryant et al. |
| 2008/0279167 A1 | 11/2008 | Cardei et al. |
| 2008/0288646 A1 | 11/2008 | Hasha et al. |
| 2008/0288659 A1 | 11/2008 | Hasha et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0288873 A1 | 11/2008 | McCardle et al. |
| 2008/0289029 A1 | 11/2008 | Kim et al. |
| 2008/0301226 A1 | 12/2008 | Cleary et al. |
| 2008/0301379 A1 | 12/2008 | Pong |
| 2008/0301794 A1 | 12/2008 | Lee |
| 2008/0304481 A1 | 12/2008 | Gurney |
| 2008/0310848 A1 | 12/2008 | Yasuda et al. |
| 2008/0313293 A1 | 12/2008 | Jacobs |
| 2008/0313369 A1 | 12/2008 | Verdoorn et al. |
| 2008/0313482 A1 | 12/2008 | Karlapalem et al. |
| 2008/0320121 A1 | 12/2008 | Altaf et al. |
| 2008/0320161 A1 | 12/2008 | Maruccia et al. |
| 2008/0320482 A1 | 12/2008 | Dawson |
| 2009/0010153 A1 | 1/2009 | Filsfils et al. |
| 2009/0021907 A1 | 1/2009 | Mann et al. |
| 2009/0043809 A1 | 2/2009 | Fakhouri et al. |
| 2009/0043888 A1 | 2/2009 | Jackson |
| 2009/0044036 A1 | 2/2009 | Merkin |
| 2009/0049443 A1 | 2/2009 | Powers et al. |
| 2009/0055542 A1 | 2/2009 | Zhoa et al. |
| 2009/0055691 A1 | 2/2009 | Ouksel et al. |
| 2009/0063443 A1 | 3/2009 | Arimilli et al. |
| 2009/0063690 A1 | 3/2009 | Verthein et al. |
| 2009/0064287 A1 | 3/2009 | Bagepalli et al. |
| 2009/0070771 A1 | 3/2009 | Yuyitung et al. |
| 2009/0080428 A1 | 3/2009 | Witkowski et al. |
| 2009/0083390 A1 | 3/2009 | Abu-Ghazaleh et al. |
| 2009/0089410 A1 | 4/2009 | Vicente et al. |
| 2009/0094380 A1 | 4/2009 | Qiu et al. |
| 2009/0097200 A1 | 4/2009 | Sharma et al. |
| 2009/0100133 A1 | 4/2009 | Giulio et al. |
| 2009/0103501 A1 | 4/2009 | Farrag et al. |
| 2009/0105059 A1 | 4/2009 | Dorry et al. |
| 2009/0113056 A1 | 4/2009 | Tameshige et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0138594 A1 | 5/2009 | Fellenstein et al. |
| 2009/0150566 A1 | 6/2009 | Malkhi |
| 2009/0158070 A1 | 6/2009 | Gruendler |
| 2009/0172423 A1 | 7/2009 | Song et al. |
| 2009/0178132 A1 | 7/2009 | Hudis et al. |
| 2009/0182836 A1 | 7/2009 | Aviles |
| 2009/0187425 A1 | 7/2009 | Thompson et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0210356 A1 | 8/2009 | Abrams et al. |
| 2009/0210495 A1 | 8/2009 | Wolfson et al. |
| 2009/0216881 A1 | 8/2009 | Lovy et al. |
| 2009/0216910 A1 | 8/2009 | Duchesneau |
| 2009/0216920 A1 | 8/2009 | Lauterbach et al. |
| 2009/0217329 A1 | 8/2009 | Riedl et al. |
| 2009/0219827 A1 | 9/2009 | Chen et al. |
| 2009/0222884 A1 | 9/2009 | Shaji et al. |
| 2009/0225360 A1 | 9/2009 | Shirai |
| 2009/0225751 A1 | 9/2009 | Koenck et al. |
| 2009/0234917 A1 | 9/2009 | Despotovic et al. |
| 2009/0234962 A1 | 9/2009 | Strong et al. |
| 2009/0234974 A1 | 9/2009 | Arndt et al. |
| 2009/0235104 A1 | 9/2009 | Fung |
| 2009/0238349 A1 | 9/2009 | Pezzutti |
| 2009/0240547 A1 | 9/2009 | Fellenstein et al. |
| 2009/0248943 A1 | 10/2009 | Jiang et al. |
| 2009/0251867 A1 | 10/2009 | Sharma |
| 2009/0257440 A1 | 10/2009 | Yan |
| 2009/0259606 A1 | 10/2009 | Seah et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0285136 A1 | 11/2009 | Sun et al. |
| 2009/0287835 A1 | 11/2009 | Jacobson et al. |
| 2009/0292824 A1 | 11/2009 | Marashi et al. |
| 2009/0300608 A1 | 12/2009 | Ferris et al. |
| 2009/0313390 A1 | 12/2009 | Ahuja et al. |
| 2009/0316687 A1 | 12/2009 | Kruppa et al. |
| 2009/0319684 A1 | 12/2009 | Kakivaya et al. |
| 2009/0323691 A1 | 12/2009 | Johnson |
| 2009/0327079 A1 | 12/2009 | Parker et al. |
| 2009/0327489 A1 | 12/2009 | Swildens et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0036945 A1 | 2/2010 | Allibhoy et al. |
| 2010/0040053 A1 | 2/2010 | Gottumukkula et al. |
| 2010/0049822 A1 | 2/2010 | Davies et al. |
| 2010/0049931 A1 | 2/2010 | Jacobson et al. |
| 2010/0051391 A1 | 3/2010 | Jahkonen |
| 2010/0070675 A1 | 3/2010 | Pong |
| 2010/0082788 A1 | 4/2010 | Mundy |
| 2010/0088205 A1 | 4/2010 | Robertson |
| 2010/0088490 A1 | 4/2010 | Chakradhar |
| 2010/0091676 A1 | 4/2010 | Moran et al. |

(56) References Cited

U.S. PATENT DOCUMENTS

| | | |
|---|---|---|
| 2010/0103837 A1 | 4/2010 | Jungck et al. |
| 2010/0106987 A1 | 4/2010 | Lambert et al. |
| 2010/0114531 A1 | 5/2010 | Korn et al. |
| 2010/0118880 A1 | 5/2010 | Kunz et al. |
| 2010/0121932 A1 | 5/2010 | Joshi et al. |
| 2010/0121947 A1 | 5/2010 | Pirzada et al. |
| 2010/0122251 A1 | 5/2010 | Karc |
| 2010/0125742 A1 | 5/2010 | Ohtani |
| 2010/0125915 A1 | 5/2010 | Hall et al. |
| 2010/0131324 A1 | 5/2010 | Ferris et al. |
| 2010/0131624 A1 | 5/2010 | Ferris |
| 2010/0138481 A1 | 6/2010 | Behrens |
| 2010/0153546 A1 | 6/2010 | Clubb et al. |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169477 A1 | 7/2010 | Stienhans et al. |
| 2010/0169479 A1 | 7/2010 | Jeong et al. |
| 2010/0169888 A1 | 7/2010 | Hare et al. |
| 2010/0174604 A1 | 7/2010 | Mattingly et al. |
| 2010/0174813 A1 | 7/2010 | Hildreth et al. |
| 2010/0198972 A1 | 8/2010 | Umbehocker |
| 2010/0198985 A1 | 8/2010 | Kanevsky |
| 2010/0217801 A1 | 8/2010 | Leighton et al. |
| 2010/0218194 A1 | 8/2010 | Dallman et al. |
| 2010/0220732 A1 | 9/2010 | Hussain et al. |
| 2010/0223332 A1 | 9/2010 | Maxemchuk et al. |
| 2010/0228848 A1 | 9/2010 | Kis et al. |
| 2010/0235234 A1 | 9/2010 | Shuster |
| 2010/0250914 A1 | 9/2010 | Abdul et al. |
| 2010/0262650 A1 | 10/2010 | Chauhan |
| 2010/0265650 A1 | 10/2010 | Chen et al. |
| 2010/0281166 A1 | 11/2010 | Buyya et al. |
| 2010/0281246 A1 | 11/2010 | Bristow et al. |
| 2010/0299548 A1 | 11/2010 | Chadirchi et al. |
| 2010/0302129 A1 | 12/2010 | Kastrup et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318665 A1 | 12/2010 | Demmer et al. |
| 2010/0318812 A1 | 12/2010 | Auradkar et al. |
| 2010/0325371 A1 | 12/2010 | Jagadish et al. |
| 2010/0332262 A1 | 12/2010 | Horvitz et al. |
| 2010/0333116 A1 | 12/2010 | Prahlad |
| 2011/0023104 A1 | 1/2011 | Franklin |
| 2011/0026397 A1 | 2/2011 | Saltsidis et al. |
| 2011/0029644 A1 | 2/2011 | Gelvin et al. |
| 2011/0029652 A1 | 2/2011 | Chhuor et al. |
| 2011/0035491 A1 | 2/2011 | Gelvin et al. |
| 2011/0055627 A1 | 3/2011 | Zawacki et al. |
| 2011/0058573 A1 | 3/2011 | Balakavi et al. |
| 2011/0075369 A1 | 3/2011 | Sun et al. |
| 2011/0082928 A1 | 4/2011 | Hasha et al. |
| 2011/0090633 A1 | 4/2011 | Rabinovitz |
| 2011/0103391 A1 | 5/2011 | Davis |
| 2011/0113083 A1 | 5/2011 | Shahar |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0145393 A1 | 6/2011 | Ben-Zvi et al. |
| 2011/0153953 A1 | 6/2011 | Khemani et al. |
| 2011/0154318 A1 | 6/2011 | Oshins et al. |
| 2011/0154371 A1 | 6/2011 | Beale |
| 2011/0167110 A1 | 7/2011 | Hoffberg et al. |
| 2011/0173295 A1 | 7/2011 | Bakke et al. |
| 2011/0173612 A1 | 7/2011 | El Zur et al. |
| 2011/0179134 A1 | 7/2011 | Mayo et al. |
| 2011/0185370 A1 | 7/2011 | Tamir et al. |
| 2011/0188378 A1 | 8/2011 | Collins |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0213869 A1 | 9/2011 | Korsunsky et al. |
| 2011/0231510 A1 | 9/2011 | Korsunsky et al. |
| 2011/0231564 A1 | 9/2011 | Korsunsky et al. |
| 2011/0238841 A1 | 9/2011 | Kakivaya et al. |
| 2011/0238855 A1 | 9/2011 | Korsunsky et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0274108 A1 | 11/2011 | Fan |
| 2011/0295991 A1 | 12/2011 | Aida |
| 2011/0296141 A1 | 12/2011 | Daffron |
| 2011/0307887 A1 | 12/2011 | Huang et al. |
| 2011/0314465 A1 | 12/2011 | Smith et al. |
| 2011/0320540 A1 | 12/2011 | Oostlander et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0036237 A1 | 2/2012 | Hasha et al. |
| 2012/0042196 A1 | 2/2012 | Aron |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0072997 A1 | 3/2012 | Carlson et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0102457 A1 | 4/2012 | Tal |
| 2012/0110055 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110651 A1 | 5/2012 | Van Biljon et al. |
| 2012/0117229 A1 | 5/2012 | Van Biljon et al. |
| 2012/0131201 A1 | 5/2012 | Matthews et al. |
| 2012/0137004 A1 | 5/2012 | Smith |
| 2012/0151476 A1 | 6/2012 | Vincent |
| 2012/0155168 A1 | 6/2012 | Kim et al. |
| 2012/0158925 A1 | 6/2012 | Shen |
| 2012/0159116 A1 | 6/2012 | Lim et al. |
| 2012/0167083 A1 | 6/2012 | Suit |
| 2012/0167084 A1 | 6/2012 | Suit |
| 2012/0167094 A1 | 6/2012 | Suit |
| 2012/0185334 A1 | 7/2012 | Sarkar et al. |
| 2012/0191860 A1 | 7/2012 | Traversat et al. |
| 2012/0198075 A1 | 8/2012 | Crowe |
| 2012/0198252 A1 | 8/2012 | Kirschtein et al. |
| 2012/0207165 A1 | 8/2012 | Davis |
| 2012/0209989 A1 | 8/2012 | Stewart |
| 2012/0218901 A1 | 8/2012 | Jungck et al. |
| 2012/0222033 A1 | 8/2012 | Byrum |
| 2012/0226788 A1 | 9/2012 | Jackson |
| 2012/0239479 A1 | 9/2012 | Amaro et al. |
| 2012/0278378 A1 | 11/2012 | Lehane et al. |
| 2012/0278430 A1 | 11/2012 | Lehane et al. |
| 2012/0278464 A1 | 11/2012 | Lehane et al. |
| 2012/0296974 A1 | 11/2012 | Tabe et al. |
| 2012/0297042 A1 | 11/2012 | Davis et al. |
| 2012/0324005 A1 | 12/2012 | Nalawade |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0036236 A1 | 2/2013 | Morales et al. |
| 2013/0058250 A1 | 3/2013 | Casado et al. |
| 2013/0060839 A1 | 3/2013 | Van Biljon et al. |
| 2013/0066940 A1 | 3/2013 | Shao |
| 2013/0073602 A1 | 3/2013 | Meadway et al. |
| 2013/0073724 A1 | 3/2013 | Parashar et al. |
| 2013/0086298 A1 | 4/2013 | Alanis |
| 2013/0094499 A1 | 4/2013 | Davis et al. |
| 2013/0097351 A1 | 4/2013 | Davis |
| 2013/0097448 A1 | 4/2013 | Davis et al. |
| 2013/0107444 A1 | 5/2013 | Schnell |
| 2013/0111107 A1 | 5/2013 | Chang et al. |
| 2013/0124417 A1 | 5/2013 | Spears et al. |
| 2013/0145375 A1 | 6/2013 | Kang |
| 2013/0148667 A1 | 6/2013 | Hama et al. |
| 2013/0163605 A1 | 6/2013 | Chandra et al. |
| 2013/0191612 A1 | 7/2013 | Li |
| 2013/0247064 A1 | 9/2013 | Jackson |
| 2013/0268653 A1 | 10/2013 | Deng et al. |
| 2013/0275703 A1 | 10/2013 | Schenfeld et al. |

(56) References Cited

U.S. PATENT DOCUMENTS

| | | |
|---|---|---|
| 2013/0286840 A1 | 10/2013 | Fan |
| 2013/0290643 A1 | 10/2013 | Lim |
| 2013/0290650 A1 | 10/2013 | Chang et al. |
| 2013/0298134 A1 | 11/2013 | Jackson |
| 2013/0305093 A1 | 11/2013 | Jayachandran et al. |
| 2013/0312006 A1 | 11/2013 | Hardman |
| 2013/0318255 A1 | 11/2013 | Karino |
| 2013/0318269 A1 | 11/2013 | Dalal et al. |
| 2014/0052866 A1 | 2/2014 | Jackson |
| 2014/0082614 A1 | 3/2014 | Klein et al. |
| 2014/0104778 A1 | 4/2014 | Schnell |
| 2014/0122833 A1 | 5/2014 | Davis et al. |
| 2014/0135105 A1 | 5/2014 | Quan et al. |
| 2014/0143773 A1 | 5/2014 | Ciano et al. |
| 2014/0143781 A1 | 5/2014 | Yao |
| 2014/0189039 A1 | 7/2014 | Dalton |
| 2014/0201761 A1 | 7/2014 | Dalal et al. |
| 2014/0317292 A1 | 10/2014 | Odom |
| 2014/0348182 A1 | 11/2014 | Chandra |
| 2014/0359044 A1 | 12/2014 | Davis et al. |
| 2014/0359323 A1 | 12/2014 | Fullerton et al. |
| 2014/0365596 A1 | 12/2014 | Kanevsky |
| 2014/0379836 A1 | 12/2014 | Zilberboim |
| 2015/0012679 A1 | 1/2015 | Davis et al. |
| 2015/0039840 A1 | 2/2015 | Chandra et al. |
| 2015/0103826 A1 | 4/2015 | Davis |
| 2015/0229586 A1 | 8/2015 | Jackson |
| 2015/0236972 A1* | 8/2015 | Jackson ............. G06F 9/5077 709/226 |
| 2015/0263913 A1 | 9/2015 | De Temmerman |
| 2015/0293789 A1 | 10/2015 | Jackson |
| 2015/0301880 A1 | 10/2015 | Allu |
| 2015/0381521 A1 | 12/2015 | Jackson |
| 2016/0154539 A1 | 6/2016 | Buddhiraja |
| 2016/0161909 A1 | 6/2016 | Wada |
| 2016/0306586 A1 | 10/2016 | Dornemann |
| 2016/0378570 A1 | 12/2016 | Ljubuncic |
| 2017/0111274 A1 | 4/2017 | Bays |
| 2017/0115712 A1 | 4/2017 | Davis |
| 2017/0127577 A1 | 5/2017 | Rodriguez et al. |
| 2018/0018149 A1 | 1/2018 | Cook |
| 2018/0054364 A1 | 2/2018 | Jackson |
| 2019/0260689 A1 | 8/2019 | Jackson |
| 2019/0286610 A1 | 9/2019 | Dalton |
| 2020/0073722 A1 | 3/2020 | Jackson |
| 2020/0159449 A1 | 5/2020 | Davis et al. |
| 2020/0379819 A1 | 12/2020 | Jackson |
| 2020/0382585 A1 | 12/2020 | Abu-Ghazaleh et al. |
| 2021/0117130 A1 | 4/2021 | Davis |
| 2021/0141671 A1 | 5/2021 | Jackson |
| 2021/0250249 A1 | 8/2021 | Jackson |
| 2021/0306284 A1 | 9/2021 | Jackson |
| 2021/0311804 A1 | 10/2021 | Jackson |
| 2022/0121545 A1 | 4/2022 | Dalton |
| 2022/0206859 A1 | 6/2022 | Jackson |
| 2022/0206861 A1 | 6/2022 | Jackson |
| 2022/0214920 A1 | 7/2022 | Jackson |
| 2022/0214921 A1 | 7/2022 | Jackson |
| 2022/0214922 A1 | 7/2022 | Jackson |
| 2022/0222119 A1 | 7/2022 | Jackson |
| 2022/0222120 A1 | 7/2022 | Jackson |
| 2022/0239606 A1 | 7/2022 | Jackson |
| 2022/0239607 A1 | 7/2022 | Jackson |
| 2022/0247694 A1 | 8/2022 | Jackson |
| 2022/0300334 A1 | 9/2022 | Jackson |
| 2022/0317692 A1 | 10/2022 | Guim Bernat |

FOREIGN PATENT DOCUMENTS

| | | |
|---|---|---|
| DE | 112008001875 | 8/2013 |
| EP | 0268435 | 5/1988 |
| EP | 0605106 A1 | 7/1994 |
| EP | 0859314 A2 | 8/1998 |
| EP | 1331564 | 7/2003 |
| EP | 1365545 | 11/2003 |
| EP | 1492309 | 12/2004 |
| EP | 1865684 | 12/2007 |
| GB | 2391744 | 2/2004 |
| GB | 2392265 | 2/2004 |
| JP | 8-212084 | 8/1996 |
| JP | 2002-207712 | 7/2002 |
| JP | 2005-165568 | 6/2005 |
| JP | 2005-223753 | 8/2005 |
| JP | 2005-536960 | 12/2005 |
| JP | 2006-309439 | 11/2006 |
| KR | 2004/0107934 | 12/2004 |
| TW | M377621 | 4/2010 |
| TW | 201017430 | 5/2010 |
| WO | WO1998/011702 | 3/1998 |
| WO | WO1998/058518 | 12/1998 |
| WO | WO1999/015999 | 4/1999 |
| WO | WO1999/057660 | 11/1999 |
| WO | WO2000/014938 | 3/2000 |
| WO | WO2000/025485 A1 | 5/2000 |
| WO | WO2000/060825 | 10/2000 |
| WO | WO2001/009791 | 2/2001 |
| WO | WO2001/014987 | 3/2001 |
| WO | WO2001/015397 | 3/2001 |
| WO | WO2001/039470 | 5/2001 |
| WO | WO2001/044271 | 6/2001 |
| WO | WO2003/046751 | 6/2003 |
| WO | WO2003/060798 | 9/2003 |
| WO | WO2004/021109 | 3/2004 |
| WO | WO2004/021641 | 3/2004 |
| WO | WO2004/046919 | 6/2004 |
| WO | WO2004/070547 | 8/2004 |
| WO | WO2004/092884 | 10/2004 |
| WO | WO2005/013143 | 2/2005 |
| WO | WO2005/017763 A2 | 2/2005 |
| WO | WO2005/017783 | 2/2005 |
| WO | WO2005/089245 A2 | 9/2005 |
| WO | WO2005/091136 | 9/2005 |
| WO | WO2006/036277 | 4/2006 |
| WO | WO2006/107531 | 10/2006 |
| WO | WO2006/108187 | 10/2006 |
| WO | WO2006/112981 | 10/2006 |
| WO | WO2008/000193 | 1/2008 |
| WO | WO2011/044271 | 4/2011 |
| WO | WO2012/037494 | 3/2012 |

OTHER PUBLICATIONS

J. S. Chase, D. E. Irwin, L. E. Grit, J. D. Moore and S. E. Sprenkle, "Dynamic virtual clusters in a grid site manager," High Performance Distributed Computing, 2003. Proceedings. 12th IEEE International Symposium on, 2003, pp. 90-100 (Year: 2003).*
Liu, Simon: "Securing the Clouds: Methodologies and Practices." Encyclopedia of Cloud Computing (2016): 220. (Year: 2016).
Notice of Allowance on U.S. Appl. No. 14/827,927 dated Apr. 25, 2022.
Notice of Allowance on U.S. Appl. No. 16/913,745, dated Jun. 9, 2022.
Notice of Allowance on U.S. Appl. No. 17/700,808, dated May 26, 2022 and Jun. 6, 2022.
Office Action on U.S. Appl. No. 16/913,745 dated Jan. 13, 2022.
Office Action on U.S. Appl. No. 17/089,207 dated Jan. 28, 2022.
Office Action on U.S. Appl. No. 17/201,245 dated Mar. 18, 2022.
Office Action on U.S. Appl. No. 17/697,235 dated May 25, 2022.
Office Action on U.S. Appl. No. 17/697,368 dated Jun. 7, 2022.
Office Action on U.S. Appl. No. 17/697,403 dated Jun. 7, 2022.
Office Action on U.S. Appl. No. 16/537,256 dated Dec. 23, 2021.
Office Action on U.S. Appl. No. 16/913,708 dated Jun. 7, 2022.
Office Action on U.S. Appl. No. 17/722,037 dated Jun. 13, 2022.
U.S. Appl. No. 11/279,007, filed Apr. 2006, Jackson.
U.S. Appl. No. 13/705,340, filed Apr. 2012, Davis et al.
U.S. Appl. No. 13/899,751, filed May 2013, Chandra.
U.S. Appl. No. 13/935,108, filed Jul. 2013, Davis.
U.S. Appl. No. 13/959,428, filed Aug. 2013, Chandra.
U.S. Appl. No. 60/662,240, filed Mar. 2005, Jackson.
U.S. Appl. No. 60/552,653, filed Apr. 2005, Jackson.

(56) References Cited

OTHER PUBLICATIONS

"Microsoft Computer Dictionary, 5th Ed."; Microsoft Press; 3 pages; 2002.
"Random House Concise Dictionary of Science & Computers"; 3 pages; Helicon Publishing; 2004.
A Language Modeling Framework for Resource Selection and Results Merging Si et al. CIKM 2002, Proceedings of the eleventh international conference on Iformation and Knowledge Management.
Alhusaini et al. "A framework for mapping with resource co-allocation in heterogeneous computing systems," Proceedings 9th Heterogeneous Computing Workshop (HCW 2000) (Cat. No. PR00556), Cancun, Mexico, 2000, pp. 273-286. (Year: 2000).
Ali et al., "Task Execution Time Modeling for Heterogeneous Computing System", IEEE, 2000, pp. 1-15.
Amiri et al., "Dynamic Function Placement for Data-Intensive Cluster Computing," Jun. 2000.
Bader et al.; "Applications"; The International Journal of High Performance Computing Applications, vol. 15, No. ; pp. 181-185; Summer 2001.
Banicescu et al., "Competitive Resource management in Distributed Computing Environments with Hectiling", 1999, High Performance Computing Symposium, p. 1-7 (Year: 1999).
Banicescu et al., "Efficient Resource Management for Scientific Applications in Distributed Computing Environment" 1998, Mississippi State Univ. Dept. of Comp. Science, p. 45-54. (Year: 1998).
Buyya et al., "An Evaluation of Economy-based Resource Trading and Scheduling on Computational Power Grids for Parameter Sweep Applications," Active Middleware Services, 2000, 10 pages.
Caesar et al., "Design and Implementation of a Routing Control Platform," Usenix, NSDI '05 Paper, Technical Program , obtained from the Internet, on Apr. 13, 2021, at URL <https://www.usenix.org/legacy/event/nsdi05/tech/full_papers/caesar/ca-esar_html/>, 23 pages.
Chase et al., "Dynamic Virtual Clusters in a Grid Site Manager", Proceedings of the 12.sup.th IEEE International Symposium on High Performance Distributed Computing (HPDC'03), 2003.
Chen et al., "A flexible service model for advance reservation", Computer Networks, Elsevier science publishers, vol. 37, No. 3-4, pp. 251-262. Nov. 5, 2001.
Coomer et al.; "Introduction to the Cluster Grid—Part 1"; Sun Microsystems White Paper; 19 pages; Aug. 2002.
Exhibit 1002, Declaration of Dr. Andrew Wolfe, Ph.D., document filed on behalf of Unified Patents, LLC, in Case No. IPR2022-00136, 110 pages, Declaration dated Nov. 29, 2021.
Exhibit 1008, Declaration of Kevin Jakel, document filed on behalf of Unified Patents, LLC, in Case No. IPR2022-00136, 7 pages, Declaration dated Nov. 4, 2021.
Foster et al., "A Distributed Resource Management Architecture that Supports Advance Reservations and Co-Allocation," Seventh International Workshop on Quality of Service (IWQoS '99), 1999, pp. 27-36.
Furmento et al. "An Integrated Grid Environment for Component Applications", Proceedings of the Second International Workshop on Grid Computing table of contents, 2001, pp. 26-37.
He XiaoShan; QoS Guided Min-Min Heuristic for Grid Task Scheduling; Jul. 2003, vol. 18, No. 4, pp. 442-451 J. Comput. Sci. & Technol.
Huy Tuong LE, "The Data-AWare Resource Broker" Research Project Thesis, University of Adelaide, Nov. 2003, pp. 1-63.
IBM Tivoli "IBM Directory Integrator and Tivoli Identity Manager Integration" Apr. 2, 2003, pp. 1-13 online link "http:publib.boulder.ibm.com/tividd/td/ITIM/SC32-1683-00/en_US/HTML/idi_integration/index.html" (Year: 2003).
Intel, Architecture Guide: Intel® Active Management Technology, Intel.com, Oct. 10, 2008, pp. 1-23, (Year 2008).
Joseph et al.; "Evolution of grid computing architecture and grid adoption models"; IBM Systems Journal, vol. 43, No. 4; 22 pages; 2004.
Kafil et al., "Optimal Task Assignment in Herterogenous Computing Systems," IEEE, 1997, pp. 135-146.
Kuan-Wei Cheng, Chao-Tung Yang, Chuan-Lin Lai and Shun-Chyi Change, "A parallel loop self-scheduling on grid computing environments," 7th International Symposium on Parallel Architectures, Algorithms and Networks, 2004. Proceedings. 2004, pp. 409-414 (Year: 2004).
Luo Si et al. "A Language Modeling Framework for Resource Selection and Results Merging", Conference on Information and Knowledge Management. 2002 ACM pp. 391-397.
Maheswaran et al., "Dynamic Matching and Scheduling of a Class of Independent Tasks onto Heterogeneous Computing Systems," IEEE, 2000, pp. 1-15.
Mateescu et al., "Quality of service on the grid via metascheduling with resource co-scheduling and co-reservation," The International Journal of High Performance Computing Applications, 2003, 10 pages.
Notice of Allowance on U.S. Appl. No. 10/530,577, dated Oct. 15, 2015.
Notice of Allowance on U.S. Appl. No. 11/207,438 dated Jan. 3, 2012.
Notice of Allowance on U.S. Appl. No. 11/276,852 dated Nov. 26, 2014.
Notice of Allowance on U.S. Appl. No. 11/276,853, dated Apr. 5, 2016.
Notice of Allowance on U.S. Appl. No. 11/276,854, dated Mar. 6, 2014.
Notice of Allowance on U.S. Appl. No. 11/276,855, dated Sep. 13, 2013.
Notice of Allowance on U.S. Appl. No. 11/616,156, dated Mar. 25, 2014.
Notice of Allowance on U.S. Appl. No. 11/718,867 dated May 25, 2012.
Notice of Allowance on U.S. Appl. No. 12/573,967, dated Jul. 20, 2015.
Notice of Allowance on U.S. Appl. No. 13/234,054, dated Sep. 19, 2017.
Notice of Allowance on U.S. Appl. No. 13/284,855, dated Jul. 14, 2014.
Notice of Allowance on U.S. Appl. No. 13/453,086, dated Jul. 18, 2013.
Notice of Allowance on U.S. Appl. No. 13/475,713, dated Feb. 5, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/621,987 dated Jun. 4, 2015.
Notice of Allowance on U.S. Appl. No. 13/624,725, dated Mar. 30, 2016.
Notice of Allowance on U.S. Appl. No. 13/624,731, dated Mar. 5, 2015.
Notice of Allowance on U.S. Appl. No. 13/662,759 dated May 10, 2016.
Notice of Allowance on U.S. Appl. No. 13/692,741 dated Dec. 4, 2015.
Notice of Allowance on U.S. Appl. No. 13/705,286 dated Feb. 24, 2016.
Notice of Allowance on U.S. Appl. No. 13/705,340, dated Dec. 3, 2014.
Notice of Allowance on U.S. Appl. No. 13/705,340, dated Mar. 16, 2015.
Notice of Allowance on U.S. Appl. No. 13/705,386, dated Jan. 24, 2014.
Notice of Allowance on U.S. Appl. No. 13/705,414, dated Nov. 4, 2013.
Notice of Allowance on U.S. Appl. No. 13/728,308 dated Oct. 7, 2015.
Notice of Allowance on U.S. Appl. No. 13/728,428 dated Jul. 18, 2016.

(56) References Cited

OTHER PUBLICATIONS

Notice of Allowance on U.S. Appl. No. 13/758,164, dated Apr. 15, 2015.
Notice of Allowance on U.S. Appl. No. 13/760,600 dated Feb. 26, 2018.
Notice of Allowance on U.S. Appl. No. 13/760,600 dated Jan. 9, 2018.
Notice of Allowance on U.S. Appl. No. 13/855,241, dated Oct. 27, 2020.
Notice of Allowance on U.S. Appl. No. 13/855,241, dated Sep. 14, 2020.
Notice of Allowance on U.S. Appl. No. 14/052,723 dated Feb. 8, 2017.
Notice of Allowance on U.S. Appl. No. 14/106,254 dated May 25, 2017.
Notice of Allowance on U.S. Appl. No. 14/106,697 dated Oct. 24, 2016.
Notice of Allowance on U.S. Appl. No. 14/137,921 dated Aug. 12, 2021 and Jul. 16, 2021.
Notice of Allowance on U.S. Appl. No. 14/137,940 dated Jan. 30, 2019.
Notice of Allowance on U.S. Appl. No. 14/154,912 dated Apr. 25, 2019.
Notice of Allowance on U.S. Appl. No. 14/154,912, dated Apr. 3, 2019.
Notice of Allowance on U.S. Appl. No. 14/154,912, dated Feb. 7, 2019.
Notice of Allowance on U.S. Appl. No. 14/331,718 dated Jun. 7, 2017.
Notice of Allowance on U.S. Appl. No. 14/331,772, dated Jan. 10, 2018.
Notice of Allowance on U.S. Appl. No. 14/334,178 dated Aug. 19, 2016.
Notice of Allowance on U.S. Appl. No. 14/334,178 dated Jun. 8, 2016.
Notice of Allowance on U.S. Appl. No. 14/334,931 dated May 20, 2016.
Notice of Allowance on U.S. Appl. No. 14/454,049, dated Jan. 20, 2015.
Notice of Allowance on U.S. Appl. No. 14/590,102, dated Jan. 22, 2018.
Notice of Allowance on U.S. Appl. No. 14/704,231, dated Sep. 2, 2015.
Notice of Allowance on U.S. Appl. No. 14/709,642 dated Mar. 19, 2019.
Notice of Allowance on U.S. Appl. No. 14/709,642, dated May 9, 2019.
Notice of Allowance on U.S. Appl. No. 14/725,543 dated Jul. 21, 2016.
Notice of Allowance on U.S. Appl. No. 14/753,948 dated Jun. 14, 2017.
Notice of Allowance on U.S. Appl. No. 14/791,873 dated Dec. 20, 2018.
Notice of Allowance on U.S. Appl. No. 14/809,723 dated Jan. 11, 2018.
Notice of Allowance on U.S. Appl. No. 14/827,927 dated Jan. 21, 2022 and Dec. 9, 2021.
Notice of Allowance on U.S. Appl. No. 14/833,673, dated Dec. 2, 2016.
Notice of Allowance on U.S. Appl. No. 14/842,916 dated Oct. 2, 2017.
Notice of Allowance on U.S. Appl. No. 14/872,645 dated Oct. 13, 2016.
Notice of Allowance on U.S. Appl. No. 14/987,059, dated Feb. 14, 2020.
Notice of Allowance on U.S. Appl. No. 14/987,059, dated Jul. 8, 2019.
Notice of Allowance on U.S. Appl. No. 14/987,059, dated Nov. 7, 2019.
Notice of Allowance on U.S. Appl. No. 15/042,489 dated Jul. 16, 2018.
Notice of Allowance on U.S. Appl. No. 15/049,542 dated Feb. 28, 2018.
Notice of Allowance on U.S. Appl. No. 15/049,542 dated Jan. 4, 2018.
Notice of Allowance on U.S. Appl. No. 15/078,115 dated Jan. 8, 2018.
Notice of Allowance on U.S. Appl. No. 15/254,111 dated Nov. 13, 2017.
Notice of Allowance on U.S. Appl. No. 15/254,111 dated Sep. 1, 2017.
Notice of Allowance on U.S. Appl. No. 15/270,418 dated Nov. 2, 2017.
Notice of Allowance on U.S. Appl. No. 15/345,017 dated Feb. 2, 2021.
Notice of Allowance on U.S. Appl. No. 15/357,332 dated Jul. 12, 2018.
Notice of Allowance on U.S. Appl. No. 15/360,668, dated May 5, 2017.
Notice of Allowance on U.S. Appl. No. 15/430,959 dated Mar. 15, 2018.
Notice of Allowance on U.S. Appl. No. 15/478,467 dated May 30, 2019
Notice of Allowance on U.S. Appl. No. 15/672,418 dated Apr. 4, 2018.
Notice of Allowance on U.S. Appl. No. 15/717,392 dated Mar. 22, 2019.
Notice of Allowance on U.S. Appl. No. 15/726,509, dated Sep. 25, 2019.
Office Action issued on U.S. Appl. No. 11/276,855, dated Jul. 22, 2010.
Office Action on U.S. Appl. No. 10/530,577, dated May 29, 2015.
Office Action on U.S. Appl. No. 11/207,438 dated Aug. 31, 2010.
Office Action on U.S. Appl. No. 11/207,438 dated Mar. 15, 2010.
Office Action on U.S. Appl. No. 11/276,852, dated Feb. 10, 2009.
Office Action on U.S. Appl. No. 11/276,852, dated Jan. 16, 2014.
Office Action on U.S. Appl. No. 11/276,852, dated Jun. 26, 2012.
Office Action on U.S. Appl. No. 11/276,852, dated Mar. 17, 2011.
Office Action on U.S. Appl. No. 11/276,852, dated Mar. 4, 2010.
Office Action on U.S. Appl. No. 11/276,852, dated Mar. 5, 2013.
Office Action on U.S. Appl. No. 11/276,852, dated Oct. 4, 2010.
Office Action on U.S. Appl. No. 11/276,852, dated Oct. 5, 2011.
Office Action on U.S. Appl. No. 11/276,852, dated Oct. 16, 2009.
Office Action on U.S. Appl. No. 11/276,853, dated Apr. 4, 2014.
Office Action on U.S. Appl. No. 11/276,853, dated Aug. 7, 2009.
Office Action on U.S. Appl. No. 11/276,853, dated Dec. 28, 2009.
Office Action on U.S. Appl. No. 11/276,853, dated Dec. 8, 2008.
Office Action on U.S. Appl. No. 11/276,853, dated Jul. 12, 2010.
Office Action on U.S. Appl. No. 11/276,853, dated May 26, 2011.
Office Action on U.S. Appl. No. 11/276,853, dated Nov. 23, 2010.
Office Action on U.S. Appl. No. 11/276,853, dated Oct. 16, 2009.
Office Action on U.S. Appl. No. 11/276,854, dated Apr. 18, 2011.
Office Action on U.S. Appl. No. 11/276,854, dated Aug. 1, 2012.
Office Action on U.S. Appl. No. 11/276,854, dated Jun. 10, 2009.
Office Action on U.S. Appl. No. 11/276,854, dated Jun. 5, 2013.
Office Action on U.S. Appl. No. 11/276,854, dated Jun. 8, 2010.
Office Action on U.S. Appl. No. 11/276,854, dated Nov. 26, 2008.
Office Action on U.S. Appl. No. 11/276,854, dated Oct. 27, 2010.
Office Action on U.S. Appl. No. 11/276,855, dated Aug. 13, 2009.
Office Action on U.S. Appl. No. 11/276,855, dated Dec. 30, 2008.
Office Action on U.S. Appl. No. 11/276,855, dated Dec. 31, 2009.
Office Action on U.S. Appl. No. 11/276,855, dated Dec. 7, 2010.
Office Action on U.S. Appl. No. 11/276,855, dated Jan. 26, 2012.
Office Action on U.S. Appl. No. 11/276,855, dated Jul. 22, 2010
Office Action on U.S. Appl. No. 11/276,855, dated Jun. 27, 2011.
Office Action on U.S. Appl. No. 11/616,156, dated Jan. 18, 2011.
Office Action on U.S. Appl. No. 11/616,156, dated Oct. 13, 2011.
Office Action on U.S. Appl. No. 11/616,156, dated Sep. 17, 2013.
Office Action on U.S. Appl. No. 11/718,867 dated Dec. 29, 2009.
Office Action on U.S. Appl. No. 11/718,867 dated Jan. 8, 2009.
Office Action on U.S. Appl. No. 11/718,867 dated Jul. 11, 2008.
Office Action on U.S. Appl. No. 11/718,867 dated Jun. 15, 2009.

(56) References Cited

OTHER PUBLICATIONS

Office Action on U.S. Appl. No. 12/573,967, dated Apr. 1, 2014.
Office Action on U.S. Appl. No. 12/573,967, dated Aug. 13, 2012.
Office Action on U.S. Appl. No. 12/573,967, dated Mar. 1, 2012.
Office Action on U.S. Appl. No. 12/573,967, dated Nov. 21, 2014.
Office Action on U.S. Appl. No. 12/573,967, dated Oct. 10, 2013.
Office Action on U.S. Appl. No. 12/794,996, dated Jun. 19, 2013.
Office Action on U.S. Appl. No. 12/794,996, dated Sep. 17, 2012.
Office Action on U.S. Appl. No. 12/889,721 dated Aug. 2, 2016.
Office Action on U.S. Appl. No. 12/889,721, dated Apr. 17, 2014.
Office Action on U.S. Appl. No. 12/889,721, dated Feb. 24, 2016.
Office Action on U.S. Appl. No. 12/889,721, dated Jul. 2, 2013.
Office Action on U.S. Appl. No. 12/889,721, dated May 22, 2015.
Office Action on U.S. Appl. No. 12/889,721, dated Oct. 11, 2012.
Office Action on U.S. Appl. No. 12/889,721, dated Sep. 29, 2014.
Office Action on U.S. Appl. No. 13/234,054 dated May 31, 2017.
Office Action on U.S. Appl. No. 13/234,054 dated Oct. 20, 2016.
Office Action on U.S. Appl. No. 13/234,054, dated Apr. 16, 2015.
Office Action on U.S. Appl. No. 13/234,054, dated Aug. 6, 2015.
Office Action on U.S. Appl. No. 13/234,054, dated Jan. 26, 2016.
Office Action on U.S. Appl. No. 13/234,054, dated Oct. 23, 2014.
Office Action on U.S. Appl. No. 13/284,855, dated Dec. 19, 2013.
Office Action on U.S. Appl. No. 13/453,086, dated Mar. 12, 2013.
Office Action on U.S. Appl. No. 13/475,713, dated Apr. 1, 2014.
Office Action on U.S. Appl. No. 13/475,713, dated Oct. 17, 2014.
Office Action on U.S. Appl. No. 13/475,722, dated Jan. 17, 2014.
Office Action on U.S. Appl. No. 13/475,722, dated Oct. 20, 2014.
Office Action on U.S. Appl. No. 13/527,498, dated May 8, 2014.
Office Action on U.S. Appl. No. 13/527,498, dated Nov. 17, 2014.
Office Action on U.S. Appl. No. 13/527,505, dated Dec. 5, 2014.
Office Action on U.S. Appl. No. 13/527,505, dated May 8, 2014.
Office Action on U.S. Appl. No. 13/621,987 dated Feb. 27, 2015.
Office Action on U.S. Appl. No. 13/621,987 dated Oct. 8, 2014.
Office Action on U.S. Appl. No. 13/624,725 dated Mar. 10, 2016.
Office Action on U.S. Appl. No. 13/624,725, dated Apr. 23, 2015.
Office Action on U.S. Appl. No. 13/624,725, dated Jan. 10, 2013.
Office Action on U.S. Appl. No. 13/624,725, dated Nov. 4, 2015.
Office Action on U.S. Appl. No. 13/624,725, dated Nov. 13, 2013.
Office action on U.S. Appl. No. 13/624,731 dated Jan. 29, 2013.
Office Action on U.S. Appl. No. 13/624,731, dated Jul. 25, 2014.
Office Action on U.S. Appl. No. 13/662,759, dated Feb. 22, 2016.
Office Action on U.S. Appl. No. 13/662,759, dated Nov. 6, 2014.
Office Action on U.S. Appl. No. 13/692,741, dated Jul. 1, 2015.
Office Action on U.S. Appl. No. 13/692,741, dated Mar. 11, 2015.
Office Action on U.S. Appl. No. 13/692,741, dated Sep. 4, 2014.
Office Action on U.S. Appl. No. 13/705,286, dated May 13, 2013.
Office Action on U.S. Appl. No. 13/705,340, dated Aug. 2, 2013.
Office Action on U.S. Appl. No. 13/705,340, dated Mar. 12, 2014.
Office Action on U.S. Appl. No. 13/705,340, dated Mar. 29, 2013.
Office Action on U.S. Appl. No. 13/705,386, dated May 13, 2013.
Office Action on U.S. Appl. No. 13/705,414, dated Apr. 9, 2013.
Office Action on U.S. Appl. No. 13/705,414, dated Aug. 9, 2013.
Office Action on U.S. Appl. No. 13/705,428, dated Jul. 10, 2013.
Office Action on U.S. Appl. No. 13/728,308, dated May 14, 2015.
Office Action on U.S. Appl. No. 13/728,428 dated May 6, 2016.
Office Action on U.S. Appl. No. 13/728,428, dated Jun. 12, 2015.
Office Action on U.S. Appl. No. 13/760,600 dated Aug. 30, 2016.
Office Action on U.S. Appl. No. 13/760,600 dated Jan. 23, 2017.
Office Action on U.S. Appl. No. 13/760,600 dated Jun. 15, 2017.
Office Action on U.S. Appl. No. 13/760,600 dated Mar. 15, 2016.
Office Action on U.S. Appl. No. 13/760,600 dated Oct. 19, 2015.
Office Action on U.S. Appl. No. 13/760,600, dated Apr. 10, 2015.
Office Action on U.S. Appl. No. 13/855,241, dated Jan. 13, 2016.
Office Action on U.S. Appl. No. 13/855,241, dated Jul. 6, 2015.
Office Action on U.S. Appl. No. 13/855,241, dated Jun. 27, 2019.
Office Action on U.S. Appl. No. 13/855,241, dated Mar. 30, 2020.
Office Action on U.S. Appl. No. 13/855,241, dated Sep. 15, 2016.
Office Action on U.S. Appl. No. 14/052,723, dated Dec. 3, 2015.
Office Action on U.S. Appl. No. 14/052,723, dated May 1, 2015.
Office Action on U.S. Appl. No. 14/106,254 dated Aug. 12, 2016.
Office Action on U.S. Appl. No. 14/106,254 dated Feb. 15, 2017.
Office Action on U.S. Appl. No. 14/106,254, dated May 2, 2016.
Office Action on U.S. Appl. No. 14/106,697 dated Feb. 2, 2016.
Office Action on U.S. Appl. No. 14/106,697, dated Aug. 17, 2015.
Office Action on U.S. Appl. No. 14/106,698, dated Aug. 19, 2015.
Office Action on U.S. Appl. No. 14/106,698, dated Feb. 12, 2015.
Office Action on U.S. Appl. No. 14/137,921 dated Feb. 4, 2021.
Office Action on U.S. Appl. No. 14/137,921 dated Jun. 25, 2020.
Office Action on U.S. Appl. No. 14/137,921 dated May 31, 2017.
Office Action on U.S. Appl. No. 14/137,921 dated May 6, 2016.
Office Action on U.S. Appl. No. 14/137,921 dated Oct. 6, 2016.
Office Action on U.S. Appl. No. 14/137,921 dated Oct. 8, 2015.
Office Action on U.S. Appl. No. 14/137,940 dated Aug. 10, 2018.
Office Action on U.S. Appl. No. 14/137,940 dated Jan. 25, 2018.
Office Action on U.S. Appl. No. 14/137,940 dated Jun. 3, 2016.
Office Action on U.S. Appl. No. 14/137,940 dated Jun. 9, 2017.
Office Action on U.S. Appl. No. 14/137,940 dated Nov. 3, 2016.
Office Action on U.S. Appl. No. 14/154,912, dated Dec. 7, 2017.
Office Action on U.S. Appl. No. 14/154,912, dated Jul. 20, 2017.
Office Action on U.S. Appl. No. 14/154,912, dated May 8, 2018.
Office Action on U.S. Appl. No. 14/154,912, dated Oct. 11, 2018.
Office Action on U.S. Appl. No. 14/331,718 dated Feb. 28, 2017.
Office Action on U.S. Appl. No. 14/331,772, dated Aug. 11, 2017.
Office Action on U.S. Appl. No. 14/334,178 dated Dec. 18, 2015.
Office Action on U.S. Appl. No. 14/334,178, dated Nov. 4, 2015.
Office Action on U.S. Appl. No. 14/334,931 dated Dec. 11, 2015.
Office Action on U.S. Appl. No. 14/334,931, dated Jan. 5, 2015.
Office Action on U.S. Appl. No. 14/334,931, dated Jul. 9, 2015.
Office Action on U.S. Appl. No. 14/590,102, dated Aug. 15, 2017.
Office Action on U.S. Appl. No. 14/691,120 dated Mar. 10, 2022.
Office Action on U.S. Appl. No. 14/691,120 dated Mar. 30, 2020.
Office Action on U.S. Appl. No. 14/691,120 dated Oct. 3, 2019.
Office Action on U.S. Appl. No. 14/691,120 dated Oct. 20, 2020.
Office Action on U.S. Appl. No. 14/691,120 dated Sep. 29, 2021.
Office Action on U.S. Appl. No. 14/691,120, dated Aug. 27, 2018.
Office Action on U.S. Appl. No. 14/691,120, dated Feb. 12, 2018.
Office Action on U.S. Appl. No. 14/691,120, dated Mar. 2, 2017.
Office Action on U.S. Appl. No. 14/691,120, dated Mar. 22, 2019.
Office Action on U.S. Appl. No. 14/691,120, dated Sep. 13, 2017.
Office Action on U.S. Appl. No. 14/709,642 dated Feb. 7, 2018.
Office Action on U.S. Appl. No. 14/709,642 dated Feb. 17, 2016.
Office Action on U.S. Appl. No. 14/709,642 dated Jul. 12, 2017.
Office Action on U.S. Appl. No. 14/709,642 dated Sep. 12, 2016.
Office Action on U.S. Appl. No. 14/725,543 dated Apr. 7, 2016.
Office Action on U.S. Appl. No. 14/751,529 dated Aug. 9, 2017.
Office Action on U.S. Appl. No. 14/751,529 dated Oct. 3, 2018.
Office Action on U.S. Appl. No. 14/751,529, dated Jun. 6, 2016.
Office Action on U.S. Appl. No. 14/751,529, dated Nov. 14, 2016.
Office Action on U.S. Appl. No. 14/753,948 dated Nov. 4, 2016.
Office Action on U.S. Appl. No. 14/791,873 dated May 14, 2018.
Office Action on U.S. Appl. No. 14/809,723 dated Aug. 25, 2017.
Office Action on U.S. Appl. No. 14/809,723 dated Dec. 30, 2016.
Office Action on U.S. Appl. No. 14/827,927 dated Jan. 19, 2021.
Office Action on U.S. Appl. No. 14/827,927 dated Jan. 31, 2020.
Office Action on U.S. Appl. No. 14/827,927 dated May 16, 2018.
Office Action on U.S. Appl. No. 14/827,927 dated May 16, 2019.
Office Action on U.S. Appl. No. 14/827,927 dated Sep. 9, 2019.
Office Action on U.S. Appl. No. 14/827,927, dated Aug. 28, 2018.
Office Action on U.S. Appl. No. 14/827,927, dated Jan. 31, 2019.
Office Action on U.S. Appl. No. 14/833,673 dated Aug. 11, 2017.
Office Action on U.S. Appl. No. 14/833,673, dated Feb. 11, 2016.
Office Action on U.S. Appl. No. 14/833,673, dated Jun. 10, 2016.
Office Action on U.S. Appl. No. 14/833,673, dated Sep. 24, 2015.
Office Action on U.S. Appl. No. 14/842,916 dated May 5, 2017.
Office Action on U.S. Appl. No. 14/872,645 dated Feb. 16, 2016.
Office Action on U.S. Appl. No. 14/872,645 dated Jun. 29, 2016.
Office Action on U.S. Appl. No. 14/987,059 dated Jan. 31, 2019.
Office Action on U.S. Appl. No. 14/987,059 dated May 11, 2018.
Office Action on U.S. Appl. No. 14/987,059 dated Oct. 11, 2018.
Office Action on U.S. Appl. No. 15/042,489 dated Jan. 9, 2018.
Office Action on U.S. Appl. No. 15/078,115 dated Sep. 5, 2017.
Office Action on U.S. Appl. No. 15/254,111 dated Jun. 20, 2017.
Office Action on U.S. Appl. No. 15/281,462 dated Apr. 6, 2018.

(56) References Cited

OTHER PUBLICATIONS

Office Action on U.S. Appl. No. 15/281,462 dated Dec. 15, 2017.
Office Action on U.S. Appl. No. 15/281,462 dated Feb. 10, 2017.
Office Action on U.S. Appl. No. 15/281,462 dated Jun. 13, 2017.
Office Action on U.S. Appl. No. 15/345,017 dated Aug. 24, 2020.
Office Action on U.S. Appl. No. 15/345,017 dated Aug. 9, 2019.
Office Action on U.S. Appl. No. 15/345,017 dated Jan. 31, 2019.
Office Action on U.S. Appl. No. 15/345,017 dated Jul. 11, 2018.
Office Action on U.S. Appl. No. 15/345,017 dated Mar. 20, 2020.
Office Action on U.S. Appl. No. 15/345,017 dated Nov. 29, 2019.
Office Action on U.S. Appl. No. 15/357,332 dated May 9, 2018.
Office Action on U.S. Appl. No. 15/357,332 dated Nov. 9, 2017.
Office Action on U.S. Appl. No. 15/478,467, dated Jan. 11, 2019.
Office Action on U.S. Appl. No. 15/478,467, dated Jul. 13, 2018.
Office Action on U.S. Appl. No. 15/717,392 dated Dec. 3, 2018.
Office Action on U.S. Appl. No. 15/717,392 dated Jul. 5, 2018.
Office Action on U.S. Appl. No. 15/726,509, dated Jun. 3, 2019.
Office Action on U.S. Appl. No. 13/624,731, dated Nov. 12, 2013.
Office Action on U.S. Appl. No. 15/270,418 dated Apr. 21, 2017.
PCT/US2005/008296—International Search Report dated Aug. 3, 2005 for PCT Application No. PCT/US2005/008296, 1 page.
PCT/US2005/008297—International Search Report for Application No. PCT/US2005/008297, dated Sep. 29, 2005.
PCT/US2005/040669—International Preliminary Examination Report for PCT/US2005/040669, dated Apr. 29, 2008.
PCT/US2005/040669—Written Opinion for PCT/US2005/040669, dated Sep. 13, 2006.
PCT/US2009/044200—International Preliminary Report on Patentability for PCT/US2009/044200, dated Nov. 17, 2010.
PCT/US2009/044200—International Search Report and Written Opinion on PCT/US2009/044200, dated Jul. 1, 2009.
PCT/US2010/053227—International Preliminary Report on Patentability for PCT/US2010/053227, dated May 10, 2012.
PCT/US2010/053227—International Search Report and Written Opinion for PCT/US2010/053227, dated Dec 16, 2010.
PCT/US2011/051996—International Search Report and Written Opinion for PCT/US2011/051996, dated Jan. 19, 2012.
PCT/US2012/038986—International Preliminary Report on Patentability for PCT/US2012/038986 dated Nov. 26, 2013.
PCT/US2012/038986—International Search Report and Written Opinion on PCT/US2012/038986, dated Mar. 14, 2013.
PCT/US2012/038987—International Search Report and Written Opinion for PCT/US2012/038987, dated Aug. 16, 2012.
PCT/US2012/061747—International Preliminary Report on Patentability for PCT/US2012/061747, dated Apr. 29, 2014.
PCT/US2012/061747—International Search Report and Written Opinion for PCT/US2012/061747, dated Mar. 1, 2013.
PCT/US2012/062608—International Preliminary Report on Patentability issued on PCT/US2012/062608, dated May 6, 2014.
PCT/US2012/062608—International Search Report and Written Opinion for PCT/US2012/062608, dated Jan. 18, 2013.
Petition for Inter Partes Review of U.S. Pat. No. 8,271,980, Challenging Claims 1-5 and 14-15, document filed on behalf of Unified Patents, LLC, in Case No. IPR2022-00136, 92 pages, Petition document dated Nov. 29, 2021.
Roblitz et al., "Resource Reservations with Fuzzy Requests", Concurrency and computation: Practice and Experience, 2005.
Smith et al.; "Grid computing"; MIT Sloan Management Review, vol. 46, Iss. 1.; 5 pages; Fall 2004.
Snell et al., "The Performance Impact of Advance Reservation Meta-Scheduling", Springer-Verlag, Berlin, 2000, pp. 137-153.
Stankovic et al., "The Case for Feedback Control Real-Time Scheduling" 1999, IEEE pp. 1-13.
Takahashi et al. "A Programming Interface for Network Resource Management," 1999 IEEE, pp. 34-44.
Tanaka et al. "Resource Manager for Globus-Based Wide-Area Cluster Computing," 1999 IEEE, 8 pages.
U.S. Appl. No. 60/552,653, filed Apr. 19, 2005.
U.S. Appl. No. 60/662,240, filed Mar. 16, 2005, Jackson.

Abdelwahed, Sherif et al., "A Control-Based Framework for Self-Managing Distributed Computing Systems", WOSS'04 Oct. 31-Nov. 1, 2004 Newport Beach, CA, USA. Copyright 2004 ACM 1-58113-989-6/04/0010.
Abdelzaher, Tarek, et al., "Performance Guarantees for Web Server End-Systems: A Control-Theoretical Approach", IEEE Transactions on Parallel and Distributed Systems, vol. 13, No. 1, Jan. 2002.
Appleby, K., et al., "Oceano-SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001.
Aweya, James et al., "An adaptive load balancing scheme for web servers", International Journal of Network Management 2002; 12: 3-39 (DOI: 10.1002/nem.421), Copyright 2002 John Wiley & Sons, Ltd.
Baentsch, Michael et al., "World Wide Web Caching: The Application-Level View of the Internet", Communications Magazine, IEEE, vol. 35, Issue 6, pp. 170-178, Jun. 1997.
Banga, Gaurav et al., "Resource Containers: A New Facility for Resource Management in Server Systems", Rice University, originally published in the Proceedings of the 3.sup.rd Symposium on Operating Systems Design and Implementation, New Orleans, Louisiana, Feb. 1999.
Belloum, A. et al., "A Scalable Web Server Architecture", World Wide Web: Internet and Web Information Systems, 5, 5-23, 2002 Kluwer Academic Publishers. Manufactured in The Netherlands. 2000.
Benkner, Siegfried, et al., "VGE—A Service-Oriented Grid Environment for On-Demand Supercomputing", Institute for Software Science, University of Vienna, Nordbergstrasse 15/C/3, A-1090 Vienna, Austria. Proceedings of the 5th IEEE/ACM International Workshop on Grid Computing. pp. 11-18. 2004.
Bent, Leeann et al., "Characterization of a Large Web Site Population with Implications for Content Delivery", WWW2004, May 17-22, 2004, New York, New York, USA ACM 1-58113-844-X/04/0005, pp. 522-533.
Bian, Qiyong, et al., "Dynamic Flow Switching, A New Communication Service for ATM Networks", 1997.
Braumandl, R. et al., "ObjectGlobe: Ubiquitous query processing on the Internet", Universitat Passau, Lehrstuhl fur Informatik, 94030 Passau, Germany. Technische Universitaat Muunchen, Institut fur Informatik, 81667 Munchen, Germany. Edited by F. Casati, M.-C. Shan, D. Georgakopoulos. Published online Jun. 7, 2001--.sub.--cSpringer-Verlag 2001.
C. Huang, S. Sebastine and T. Abdelzaher, "An Architecture for Real-Time Active Content Distribution", In Proceedings of the 16.sup.th Euromicro Conference on Real-Time Systems (ECRTS 04), pp. 271-280, 2004.
Cardellini, Valeria et al., "Geographic Load Balancing for Scalable Distributed Web Systems", Proceedings of the 8th International Symposium on Modeling, Analysis and Simulation of Computer and Telecommunication Systems, pp. 20-27. 2000.
Cardellini, Valeria et al., "The State of the Art in Locally Distributed Web-Server Systems", ACM Computing Surveys, vol. 34, No. 2, Jun. 2002, pp. 263-311.
Casalicchio, Emiliano, et al., "Static and Dynamic Scheduling Algorithms for Scalable Web Server Farm", University of Roma Tor Vergata, Roma, Italy, 00133.2001.
Chandra, Abhishek et al., "Dynamic Resource Allocation for Shared Data Centers Using Online Measurements" Proceedings of the 11th international conference on Quality of service, Berkeley, CA, USA pp. 381-398. 2003.
Chandra, Abhishek et al., "Quantifying the Benefits of Resource Multiplexing in On-Demand Data Centers", Department of Computer Science, University of Massachusetts Amherst, 2003.
Chawla, Hamesh et al., "HydraNet: Network Support for Scaling of Large-Scale Services", Proceedings of 7th International Conference on Computer Communications and Networks, 1998. Oct. 1998.
Chellappa, Ramnath et al., "Managing Computing Resources in Active Intranets", International Journal of Network Management, 2002, 12:117-128 (DOI:10.1002/nem.427).
Chen, Thomas, "Increasing the Observability of Internet Behavior", Communications of the ACM, vol. 44, No. 1, pp. 93-98, Jan. 2001.

(56) References Cited

OTHER PUBLICATIONS

Chen, Xiangping et al., "Performance Evaluation of Service Differentiating Internet Servers", IEEE Transactions on Computers, vol. 51, No. 11, pp. 1368-1375, Nov. 2002.

Chu, Wesley et al., "Taks Allocation and Precedence Relations for Distributed Real-Time Systems", IEEE Transactions on Computers, vol. C-36, No. 6, pp. 667-679. Jun. 1987.

Colajanni, Michele et al., "Analysis of Task Assignment Policies in Scalable Distributed Web-server Systems", IEEE Transactions on Parallel and Distributed Systes, vol. 9, No. 6, Jun. 1998.

Conti, Marco et al., "Quality of Service Issues in Internet Web Services", IEEE Transactions on Computers, vol. 51, No. 6, pp. 593-594, Jun. 2002.

Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004.

D. Villela, P. Pradhan, and D. Rubenstein, "Provisioning Servers in the Application Tier for E-commerce Systems", In Proceedings of the 12.sup.th IEEE International Workshop on Quality of Service (IWQoS '04), pp. 57-66, Jun. 2004.

D.P. Vidyarthi, A. K. Tripathi, B. K. Sarker, A. Dhawan, and L. T. Yang, "Cluster-Based Multiple Task Allocation in Distributed Computing System", In Proceedings of the 18.sup.th International Parallel and Distributed Processing Symposium (IPDPS'04), p. 239, Santa Fe, New Mexico, Apr. 2004.

Dilley, John, et al., "Globally Distributed Content Delivery", IEEE Internet Computing, 1089-7801/02/$17.00 .COPYRGT. 2002 IEEE, pp. 50-58, Sep.-Oct. 2002.

Ercetin, Ozgur et al., "Market-Based Resource Allocation for Content Delivery in the Internet", IEEE Transactions on Computers, vol. 52, No. 12, pp. 1573-1585, Dec. 2003.

Fan, Li, et al., "Summary Cache: A Scalable Wide-Area Web Cache Sharing Protocol", IEEE/ACM Transactions on networking, vol. 8, No. 3, Jun. 2000.

Feldmann, Anja, et al., "Efficient Policies for Carrying Web Traffic Over Flow-Switched Networks", IEEE/ACM Transactions on Networking, vol. 6, No. 6, Dec. 1998.

Feldmann, Anja, et al., "Reducing Overhead in Flow-Switched Networks: An Empirical Study of Web Traffic", AT&T Labs-Research, Florham Park, NJ, 1998.

Feng, Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000.

Fong, L.L. et al., "Dynamic Resource Management in an eUtility", IBM T. J. Watson Research Center, 0-7803-7382-0/02/$17.00 .COPYRGT. 2002 IEEE.

Foster, Ian et al., "The Anatomy of the Grid—Enabling Scalable Virtual Organizations", To appear: Intl J. Supercomputer Applications, 2001.

Fox, Armando et al., "Cluster-Based Scalable Network Services", University of California at Berkeley, SOSP—Oct. 16, 1997 Saint-Malo, France, ACM 1997.

Garg, Rahul, et al., "A SLA Framework for QoS Provisioning and Dynamic Capacity Allocation", 2002.

Gayek, P., et al., "A Web Content Serving Utility", IBM Systems Journal, vol. 43, No. 1, pp. 43-63. 2004.

Genova, Zornitza et al., "Challenges in URL Switching for Implementing Globally Distributed Web Sites", Department of Computer Science and Engineering, University of South Florida, Tampa, Florida 33620. 0-7695-077 I-9/00 $10.00-IEEE. 2000.

Grajcar, Martin, "Genetic List Scheduling Algorithm for Scheduling and Allocation on a Loosely Coupled Heterogeneous Multiprocessor System", Proceedings of the 36.sup.th annual ACM/IEEE Design Automation Conference, New Orleans, Louisiana, pp. 280-285. 1999.

Grimm, Robert et al., "System Support for Pervasive Applications", ACM Transactions on Computer Systems, vol. 22, No. 4, Nov. 2004, pp. 421-486.

Gupta, A., Kleinberg, J., Kumar, A., Rastogi, R. & Yener, B. "Provisioning a virtual private network: a network design problem for multicommodity flow," Proceedings of the thirty-third annual ACM symposium on Theory of computing [online], Jul. 2001, pp. 389-398, abstract [retrieved on Jun. 14, 2007].Retrieved from the Internet:<URL:http://portal.acm.org/citation.cfm?id=380830&dl=ACM&coll- -=GUIDE>.

Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, Ilisia, Athens, 15784, Greece. WWW10, May 1-5, 2001, Hong Kong.

Hu, E.C. et al., "Adaptive Fast Path Architecture", Copyright 2001 by International Business Machines Corporation, pp. 191-206, IBM J. Res. & Dev. vol. 45 No. 2 Mar. 2001.

I. Haddad and E. Paquin, "MOSIX: A Cluster Load-Balancing Solution for Linux", In Linux Journal, vol. 2001 Issue 85es, Article No. 6, May 2001.

J. Guo, L. Bhuyan, R. Kumar and S. Basu, "QoS Aware Job Scheduling in a Cluster-Based Web Server for Multimedia Applications", In Proceedings of the 19.sup.th IEEE International Parallel and Distributed Processing Symposium (IPDPS'05), Apr. 2005.

J. Rolia, S. Singhal, and R. Friedrich, "Adaptive Internet data centers", In Proceedings of the International Conference on Advances in Infrastructure for Electronic Business, Science, and Education on the Internet (SSGRR '00), Jul. 2000.

J. Rolia, X. Zhu, and M. Arlitt, "Resource Access Management for a Utility Hosting Enterprise Applications", In Proceedings of the 8th IFIP/IEEE International Symposium on Integrated Network Management (IM), pp. 549-562, Colorado Springs, Colorado, USA, Mar. 2003.

Jann, Joefon et al., "Web Applications and Dynamic Reconfiguration in UNIX Servers", IBM, Thomos J. Watson Research Center, Yorktown' Heights, New York 10598, 0-7803-7756-7/03/$17.00. 2003 IEEE. pp. 186-194.

Jeffrey S. Chase, David E. Irwin, Laura E. Grit, Justin D. Moore, Sara E. Sprenkle, "Dynamic Virtual Clusters in a Grid Site Manager", In Proceedings of the 12.sup.th IEEE International Symposium on High Performance Distributed Computing (HPDC'03), p. 90, Jun. 2003.

Jiang, Xuxian et al., "SODA: a Service-On-Demand Architecture for Application Service Hosting Utility Platforms", Proceedings of the 12th IEEE International Symposium on High Performance Distributed Computing (HPDC'03) 1082-8907/03 $17.00 .COPYRGT. 2003 IEEE.

K. Azuma, T. Okamoto, G. Hasegawa, and M. Murata, "Design, Implementation and Evaluation of Resource Management System for Internet Servers", IOS Press, Journal of High Speed Networks, vol. 14 Issue 4, pp. 301-316, Oct. 2005.

K. Shen, H. Tang, T. Yang, and L. Chu, "Integrated Resource Management for Cluster-based Internet Services", In Proceedings of the 5.sup.th Symposium on Operating Systems Design and Implementation (OSDI '02), pp. 225-238, Dec. 2002.

K. Shen, L. Chu, and T. Yang, "Supporting Cluster-based Network Services on Functionally Symmetric Software Architecture", In Proceedings of the ACM/IEEE SC2004 Conference, Nov. 2004.

Kant, Krishna et al., "Server Capacity Planning for Web Traffic Workload", IEEE Transactions on Knowledge and Data Engineering, vol. 11, No. 5, Sep./Oct. 1999, pp. 731-474.

Koulopoulos, D. et al., "PLEIADES: An Internet-based parallel/distributed system", Software-Practice and Experience 2002; 32:1035-1049 (DOI:10.1002/spe.468).

Kuz, Ihor et al., Delft University of Technology Vrije Universiteit Vrije Universiteit Delft, The Netherlands, 0-7695-0819-7/00 $10.00 0 2000 IEEE.

L. Amini, A. Shaikh, and H. Schulzrinne, "Effective Peering for Multi-provider Content Delivery Services", In Proceedings of 23.sup.rd Annual IEEE Conference on Computer Communications (INFOCOM'04), pp. 850-861, 2004.

(56) References Cited

OTHER PUBLICATIONS

L. Bradford, S. Milliner, and M. Dumas, "Experience Using a Coordination-based Architecture for Adaptive Web Content Provision", In Coordination, pp. 140-156. Springer, 2005.
Liao, Raymond, et al., "Dynamic Core Provisioning for Quantitative Differentiated Services", IEEE/ACM Transactions on Networking, vol. 12, No. 3, pp. 429-442, Jun. 2004.
Lowell, David et al., "Devirtualizable Virtual Machines Enabling General, Single-Node, Online Maintenance", ASPLOS'04, Oct. 9-13, 2004, Boston, Massachusetts, USA. pp. 211-223, Copyright 2004 ACM.
Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00.2001 IEEE.
M. Clarke and G. Coulson, "An Architecture for Dynamically Extensible Operating Systems", In Proceedings of the 4th International Conference on Configurable Distributed Systems (ICCDS'98), Annapolis, MD, May 1998.
M. Colajanni, P. Yu, V. Cardellini, M. Papazoglou, M. Takizawa, B. Cramer and S. Chanson, "Dynamic Load Balancing in Geographically Distributed Heterogeneous Web Servers", In Proceedings of the 18.sup.th International Conference on Distributed Computing Systems, pp. 295-302, May 1998.
M. Devarakonda, V.K. Naik, N. Rajamanim, "Policy-based multi-datacenter resource management", In 6.sup.th IEEE International Workshop on Policies for Distributed Systems and Networks, pp. 247-250, Jun. 2005.
Mahon, Rob et al., "Cooperative Design in Grid Services", The 8th International Conference on Computer Supported Cooperative Work in Design Proceedings. pp. 406-412. IEEE 2003.
McCann, Julie, et al., "Patia: Adaptive Distributed Webserver (A Position Paper)", Department of Computing, Imperial College London, SW1 2BZ, UK. 2003.
Montez, Carlos et al., "Implementing Quality of Service in Web Servers", LCMI—Depto de Automacao e Sistemas—Univ. Fed. de Santa Catarina, Caixa Postal 476-88040-900—Florianopolis—SC—Brasil, 1060-9857/02 $17.00. 2002 IEEE.
Pacifici, Giovanni et al., "Performance Management for Cluster Based Web Services", IBM TJ Watson Research Center, May 13, 2003.
R. Doyle, J. Chase, O. Asad, W. Jin, and A. Vahdat, "Model-Based Resource Provisioning in a Web Service Utility", In Proceedings of the Fourth USENIX Symposium on Internet Technologies and Systems (USITS), Mar. 2003.
R. Kapitza, F. J. Hauck, and H. P. Reiser, "Decentralized, Adaptive Services: The AspectIX Approach for a Flexible and Secure Grid Environment", In Proceedings of the Grid Services Engineering and Management Conferences (GSEM, Erfurt, Germany, Nov. 2004), pp. 107-118, LNCS 3270, Springer, 2004.
Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005.
Raunak, Mohammad et al., "Implications of Proxy Caching for Provisioning Networks and Servers", IEEE Journal on Selected Areas in Communications, vol. 20, No. 7, pp. 1276-1289, Sep. 2002.
Reed, Daniel et al., "The Next Frontier: Interactive and Closed Loop Performance Steering", Department of Computer Science, University of Illinois, Urbana, Illinois 61801, International Conference on Parallel Processing Workshop, 1996.
Reumann, John et al., "Virtual Services: A New Abstraction for Server Consolidation", Proceedings of 2000 USENIX Annual Technical Conference, San Diego, California, Jun. 18-23, 2000.
Russell, Clark, et al., "Providing Scalable Web Service Using Multicast Delivery", College of Computing, Georgia Institute of Technology, Atlanta, GA 30332-0280, 1995.
Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004.
S. Nakrani and C. Tovey, "On Honey Bees and Dynamic Server Allocation in Internet Hosting Centers", Adaptive Behavior, vol. 12, No. 3-4, pp. 223-240, Dec. 2004.
S. Ranjan, J. Rolia, H. Fu, and E. Knightly, "QoS-driven Server Migration for Internet Data Centers", In Proceedings of the Tenth International Workshop on Quality of Service (IWQoS 2002), May 2002.
S. Taylor, M. Surridge, and D. Marvin, "Grid Resources for Industrial Applications", In Proceedings of the IEEE International Conference on Web Services (ICWS 04), pp. 402-409, San Diego, California, Jul. 2004.
Sacks, Lionel et al., "Active Robust Resource Management in Cluster Computing Using Policies", Journal of Network and Systems Management, vol. 11, No. 3, pp. 329-350, Sep. 2003.
Shaikh, Anees et al., "Implementation of a Service Platform for Online Games", Network Software and Services, IBM T.J. Watson Research Center, Hawthorne, NY 10532, SIGCOMM'04 Workshops, Aug. 30 & Sep. 3, 2004, Portland, Oregon, USA. Copyright 2004 ACM.
Sit, Yiu-Fai et al., "Cyclone: A High-Performance Cluster-Based Web Server with Socket Cloning", Department of Computer Science and Information Systems, The University of Hong Kong, Cluster Computing 7, 21-37, 2004, Kluwer Academic Publishers.
Sit, Yiu-Fai et al., "Socket Cloning for Cluster-BasedWeb Servers", Department of Computer Science and Information Systems, The University of Hong Kong, Proceedings of the IEEE International Conference on Cluster Computing, IEEE 2002.
Snell, Quinn et al., "An Enterprise-Based Grid Resource Management System", Brigham Young University, Provo, Utah 84602, Proceedings of the 11th IEEE International Symposium on High Performance Distributed Computing, 2002.
Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005.
Tang, Wenting et al., "Load Distribution via Static Scheduling and Client Redirection for Replicated Web Servers", Department of Computer Science and Engineering, 3115 Engineering Building, Michigan State University, East Lansing, MI 48824-1226, Proceedings of the 2000 International Workshop on Parallel Processing, pp. 127-133, IEEE 2000.
Urgaonkar, Bhuvan, et al., "Sharc: Managing CPU and Network Bandwidth in Shared Clusters", IEEE Transactions on Parallel and Distributed Systems, vol. 15, No. 1, pp. 2-17, Jan. 2004.
V. K. Naik, S. Sivasubramanian and S. Krishnan, "Adaptive Resource Sharing in a Web Services Environment", In Proceedings of the 5.sup.th ACM/IFIP/USENIX International Conference on Middleware (Middleware '04), pp. 311-330, Springer-Verlag New York, Inc. New York, NY, USA, 2004.
Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170. Apr. 2000.
Workshop on Performance and Architecture of Web Servers (PAWS-2000) Jun. 17-18, 2000, Santa Clara, CA (Held in conjunction with SIGMETRICS-2000).
Xu, Jun, et al., "Sustaining Availability of Web Services under Distributed Denial of Service Attacks", IEEE Transactions on Computers, vol. 52, No. 2, pp. 195-208, Feb. 2003.
Xu, Zhiwei et al., "Cluster and Grid Superservers: The Dawning Experiences in China", Institute of Computing Technology, Chinese Academy of Sciences, PO. Box 2704, Beijing 100080, China. Proceedings of the 2001 IEEE International Conference on Cluster Computing. IEEE 2002.
Y. Amir and D. Shaw, "WALRUS—A Low Latency, High Throughput Web Service Using Internet-wide Replication", In Proceedings of the 19.sup.th International Conference on Distributed Computing Systems Workshop, 1998.

(56) References Cited

OTHER PUBLICATIONS

Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C.. 2000.
Zeng, Daniel et al., "Efficient Web Content Delivery Using Proxy Caching Techniques", IEEE Transactions on Systems, Man, and Cybernetics—Part C: Applications and Reviews, vol. 34, No. 3, pp. 270-280, Aug. 2004.
Zhang, Qian et al., "Resource Allocation for Multimedia Streaming Over the Internet", IEEE Transactions on Multimedia, vol. 3, No. 3, pp. 339-355, Sep. 2001.
Notice of Allowance on U.S. Appl. No. 16/913,708 dated Aug. 24, 2022.
Notice of Allowance on U.S. Appl. No. 17/089,207, dated Oct. 31, 2022.
Notice of Allowance on U.S. Appl. No. 17/700,847, dated Oct. 26, 2022.
Notice of Allowance on U.S. Appl. No. 17/722,037, dated Oct. 27, 2022.
Advanced Switching Technology Tech Brief, published 2005, 2 pages.
Chapter 1 Overview of the Origin Family Architecture from Origin and Onyx2 Theory of Operations Manual, published 1997, 18 pages.
Chen and G. Agrawal, "Resource Allocation in a Middleware for Streaming Data", In Proceedings of the 2.sup.nd Workshop on Middleware for Grid Computing (MGC '04), pp. 5-10, Toronto, Canada, Oct. 2004.
Cisco MDS 9000 Family Multiprotocol Services Module, published 2006, 13 pages.
Comparing the I2C BUS to the SMBUS, Maxim Integrated, Dec. 1, 2000, p. 1.
Das et al., "Unifying Packet and Circuit Switched Networks," IEEE Globecom Workshops 2009, Nov. 30, 2009, pp. 1-6.
Deering, "IP Multicast Extensions for 4.3BSD UNIX and related Systems," Jun. 1999, 5 pages.
Elghany et al., "High Throughput High Performance NoC Switch," NORCHIP 2008, Nov. 2008, pp. 237-240.
fpga4fun.com, "What is JTAG?", 2 pages, Jan. 31, 2010.
From AT to BTX: Motherboard Form Factor, Webopedia, Apr. 29, 2005, p. 1.
Furmento et al., "Building computational communities from federated resources." European Conference on Parallel, Springer, Berlin, Heidelberg, pp. 855-863. (Year: 2001).
Grecu et al., "A Scalable Communication-Centric SoC Interconnect Architecture" Proceedings 5th International Symposium on Quality Electronic Design, 2005, pp. 343, 348 (full article included).
He XiaoShan; QoS Guided Min-Min Heuristic for Grud Task Scheduling; Jul. 2003, vol. 18, No. 4, pp. 442-451 J. Comput. Sci. & Technol.
Hossain et al., "Extended Butterfly Fat Tree Interconnection (EFTI) Architecture for Network on CHIP," 2005 IEEE Pacific Rim Conference on Communicatinos, Computers and Signal Processing, Aug. 2005, pp. 613-616.
HP "OpenView OS Manager using Radia software", 5982-7478EN, Rev 1, Nov. 2005; (HP_Nov_2005.pdf; pp. 1-4).
HP ProLiant SL6500 Scalable System, Family data sheet, HP Technical sheet, Sep. 2010 4 pages.
HP Virtual Connect Traffic Flow—Technology brief, Jan. 2012, 22 pages.
IBM Tivoli Workload Scheduler job Scheduling Console User's Guide Feature Level 1.2 (Maintenance Release Oct. 2003). Oct. 2003, IBM Corporation, http://publib.boulder.ibm.com/tividd/td/TWS/SH19-4552-01/en.sub.--US/PDF/-jsc.sub.--user.pdf.
J. Chase, D. Irwin, L. Grit, J. Moore and S. Sprenkle, "Dynamic Virtual Clusters in a Grid Site Manager", In Proceedings of the 12.sup.th IEEE International Symposium on High Performance Distributed Computing, pp. 90-100, 2003.
Jansen et al., "SATA-IO to Develop Specification for Mini Interface Connector" Press Release Sep. 21, 2009, Serial ATA3 pages.
Kavas et al., "Comparing Windows NT, Linux, and QNX as the Basis for Cluster Systems", Concurrency and Computation Practice & Experience Wiley UK, vol. 13, No. 15, pp. 1303-1332, Dec. 25, 2001.
Lars C. Wolf et al. "Concepts for Resource Reservation in Advance" Multimedia Tools and Applications. [Online] 1997, pp. 255-278, XP009102070 The Netherlands Retreived from the Internet: URL: http://www.springerlink.com/content/h25481221mu22451/fulltext.pdf [retrieved on Jun. 23, 2008].
Leinberger, W. et al., "Gang Scheduling for Distributed Memory Systems", University of Minnesota—Computer Science and Engineering—Technical Report, Feb. 16, 2000, vol. TR 00-014.
Liu et al. "Design and Evaluation of a Resouce Selection Framework for Grid Applicaitons" High Performance Distributed Computing. 2002. HPDC-11 2002. Proceeding S. 11.sup.th IEEE International Symposium on Jul. 23-26, 2002, Piscataway, NJ, USA IEEE, Jul. 23, 2002, pp. 63-72, XP010601162 ISBN: 978-0-7695-1686-8.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Notice of Allowance on U.S. Appl. No. 17/089,207, dated Jul. 7, 2022.
Notice of Allowance on U.S. Appl. No. 17/700,847, dated Jul. 7, 2022.
Office Action on U.S. Appl. No. 13/728,362, dated Feb. 21, 2014.
Office Action on U.S. Appl. No. 16/537,256 dated Jul. 7, 2022.
Pande et al., "Design of a Switch for Network on Chip Applications," May 25-28, 2003 Proceedings of the 2003 International Symposium on Circuits and Systems, vol. 5, pp. V217-V220.
Roy, Alain, "Advance Reservation API", University of Wisconsin-Madison, GFD-E.5, Scheduling Working Group, May 23, 2002.
Si et al., "Language Modeling Framework for Resource Selection and Results Merging", SIKM 2002, Proceedings of the eleventh international conference on Information and Knowledge Management.
Stone et al., UNIX Fault Management: A Guide for System Administration, Dec. 1, 1999, ISBN 0-13-026525-X, http://www.informit.com/content/images/013026525X/samplechapter/013026525-.pdf.
Supercluster Research and Development Group, "Maui Administrator's Guide", Internet citation, 2002.
Venaas, "IPv4 Multicast Address Space Registry," 2013, http://www.iana.org/assignments/multicast-addresses/multicast-addresses.x-html.
Wolf et al. "Concepts for Resource Reservation in Advance" Multimedia Tools and Applications, 1997.
Office Action on U.S. Appl. No. 17/412,832, dated Oct. 14, 2022.
Office Action on U.S. Appl. No. 17/697,368 dated Oct. 18, 2022.
Office Action on U.S. Appl. No. 17/697,403 dated Oct. 18, 2022.
Notice of Allowance on U.S. Appl. No. 17/700,767 dated Jul. 11 2022.
Notice of Allowance on U.S. Appl. No. 17/700,767 dated Oct. 14 2022.
Notice of Allowance on U.S. Appl. No. 17/722,062 dated Jun. 15, 2022.
IQSearchText-202206090108.txt, publication dated Apr. 6, 2005, 2 pages.
Office Action on U.S. Appl. No. 17/711,242, dated Jul. 28, 2022.
Office Action on U.S. Appl. No. 17/171,152 dated Aug. 16, 2022.
Office Action on U.S. Appl. No. 17/711,214, dated Nov. 16, 2022.
Notice of Allowance on U.S. Appl. No. 16/913,745, dated Sep. 27, 2022.
Notice of Allowance on U.S. Appl. No. 17/201,245, dated Sep. 22, 2022.
Notice of Allowance on U.S. Appl. No. 17/700,808, dated Sep. 26, 2022.
Office Action on U.S. Appl. No. 17/835,159 dated Aug. 31, 2022.
Office Action on U.S. Appl. No. 17/088,954, dated Sep. 13, 2022.
Notice of Allowance on U.S. Appl. No. 17/201,245 dated Sep. 14, 2022.
Office Action on U.S. Appl. No. 17/697,235 dated Sep. 20, 2022.

(56) References Cited

OTHER PUBLICATIONS

Notice of Allowance on U.S. Appl. No. 17/700,808, dated Sep. 14, 2022.
Notice of Allowance on U.S. Appl. No. 17/700,767 dated Jun. 27, 2022.
Office Action on U.S. Appl. No. 17/722,076 dated Jun. 22, 2022.
Edited by William Gropp, Ewing Lusk and Thomas Sterling, "Beowulf Cluster Computing with Linux," Massachusetts Institute of Technology, 2003.
Jarek Nabrzyski, Jennifer M. Schopf and Jan Weglarz, "Grid Resources Management, State of the Art and Future Trends," Kluwer Academic Publishers, 2004.
Notice of Allowance on U.S. Appl. No. 17/722,037, dated Jul. 18, 2022.
Office Action on U.S. Appl. No. 17/201,231 dated Oct. 5, 2022.
Notice of Allowance on U.S. Appl. No. 17/722,062 dated Oct. 7, 2022.
Chen, Liang et al., "Resource Allocation in a Middleware for Streaming Data", 2nd Workshop on Middleware for Grid Computing Toronto, Canada, pp. 5-10, Copyright 2004 ACM.
Extended European Search Report for EP 10827330.1, dated Jun. 5, 2013.
Jackson et al., "Grid Computing: Beyond Enablement",; Cluster Resource, Inc., Jan. 21, 2005.
Office Action on Taiwan Application 101139729, dated May 25, 2015 (English translation not available).
Office Action on U.S. Appl. No. 17/711,214, dated Jul. 8, 2022.
Reexamination Report on Japanese Application 2012-536877, dated Jan. 22, 2015, including English Translation.
Search Report on EP Application 10827330.1, dated Feb. 12, 2015.
Office Action on U.S. Appl. No. 14/691,120, dated Sep. 8, 2022.
Office Action on U.S. Appl. No. 17/088,954, dated Mar. 15, 2023.
Office Action, Advisory Action, on U.S. Appl. No. 17/711,242, dated Mar. 3, 2023.
Office Action on U.S. Appl. No. 14/691,120, dated Nov. 18, 2022.
Office Action on U.S. Appl. No. 14/691,120, dated Feb. 9, 2023.
Notice of Allowance on U.S. Appl. No. 16/537,256 dated Jan. 12, 2023.
Office Action on U.S. Appl. No. 17/171,152 dated Dec. 21, 2022.
Notice of Allowance on U.S. Appl. No. 17/171,152 dated Feb. 6, 2023.
Notice of Allowance on U.S. Appl. No. 17/171,152 dated Feb. 27, 2023.
Notice of Allowance on U.S. Appl. No. 17/201,231 dated Feb. 6, 2023.
Office Action on U.S. Appl. No. 17/508,661 dated Feb. 27, 2023.
Advisory Action on U.S. Appl. No. 17/697,235 dated Dec. 5, 2022.
Office Action on U.S. Appl. No. 17/697,235 dated Feb. 28, 2023.
Advisory Action on U.S. Appl. No. 17/697,368 dated Jan. 13, 2023.
Advisory Action on U.S. Appl. No. 17/697,403 dated Jan. 13, 2023.
Office Action on U.S. Appl. No. 17/697,403 dated Feb. 28, 2023.
Office Action, Advisory Action, on U.S. Appl. No. 17/711,214, dated Feb. 14, 2023.
Office Action on U.S. Appl. No. 17/711,242, dated Dec. 12, 2022.
Office Action on U.S. Appl. No. 17/722,076, dated Nov. 28, 2022.
Office Action, Advisory Action, on U.S. Appl. No. 17/722,076, dated Feb. 17, 2023.
Office Action on U.S. Appl. No. 17/835,159 dated Jan. 13, 2023.
Office Action in U.S. Appl. No. 17/508,661 dated Jul. 27, 2023.
Office Action in U.S. Appl. No. 17/960,251 dated Aug. 2, 2023.
Notice of Allowance in U.S. Appl. No. 17/985,252 dated Jul. 31, 2023.
Office Action in U.S. Appl. No. 17/697,368 dated Dec. 19, 2023.
Notice of Allowance in U.S. Appl. No. 17/697,403 dated Dec. 18, 2023.
Office Action in U.S. Appl. No. 18/133,048 dated Dec. 18, 2023.
Office Action in U.S. Appl. No. 17/088,954, dated Sep. 19, 2023.
Office Action, Advisory Action, in U.S. Appl. No. 17/697,235 dated Sep. 26, 2023.
Office Action, Advisory Action, in U.S. Appl. No. 17/697,403 dated Sep. 26, 2023.
Office Action in U.S. Appl. No. 18/120,123 dated Sep. 27, 2023.
Office Action on U.S. Appl. No. 17/697,368 dated Aug. 8, 2023.
Office Action on U.S. Appl. No. 17/697,368 dated Mar. 29, 2023.
Office Action on U.S. Appl. No. 17/697,235 dated Jul. 14, 2023.
Office Action on U.S. Appl. No. 17/697,403 dated Jul. 14, 2023.
Notice of Allowance in U.S. Appl. No. 17/980,865, dated Jul. 18, 2023.
Notice of Allowance in U.S. Appl. No. 17/532,667, dated Apr. 26, 2023.
Office Action in U.S. Appl. No. 18/194,783 dated Nov. 14, 2023.
Notice of Allowance on U.S. Appl. No. 17/470,209, dated Mar. 21, 2023.
Office Action on U.S. Appl. No. 17/722,076, dated Mar. 21, 2023.
Office Action, Advisory Action, on U.S. Appl. No. 17/835,159 dated Mar. 22, 2023.
Notice of Allowance in U.S. Appl. No. 17/411,616, dated Mar. 29, 2023.
Notice of Allowance in U.S. Appl. No. 17/985,241, dated Apr. 3, 2023.
Office Action in U.S. Appl. No. 17/508,661 dated Jan. 26, 2024.
Office Action, Advisory Action, on U.S. Appl. No. 17/711,242, dated Dec. 20, 2023.
Office Action in U.S. Appl. No. 17/835,159 dated Jan. 12, 2024.
Notice of Allowance (Corrected) in U.S. Appl. No. 18/132,507, dated Feb. 27, 2024.
Notice of Allowance in U.S. Appl. No. 18/132,507, dated Feb. 12, 2024.
Office Action in U.S. Appl. No. 18/295,344 dated Feb. 12, 2024.
Office Action in U.S. Appl. No. 17/960,244 dated Oct. 23, 2023.
Office Action in U.S. Appl. No. 18/295,344 dated Oct. 23, 2023.
Notice of Allowance in U.S. Appl. No. 17/960,228, dated Sep. 12, 2023.
Notice of Allowance (Corrected NOA) in U.S. Appl. No. 17/411,616, dated Apr. 6, 2023.
Office Action on U.S. Appl. No. 17/412,832, dated Apr. 20, 2023.
Office Action in U.S. Appl. No. 17/697,235 dated Nov. 7, 2023.
Notice of Allowance in U.S. Appl. No. 17/980,844, dated Jul. 5, 2023.
Office Action on U.S. Appl. No. 17/412,832, dated Dec. 5, 2023.
Office Action on U.S. Appl. No. 17/711,214, dated Dec. 4, 2023.
Office Action on U.S. Appl. No. 17/960,251 dated Dec. 11, 2023.
Office Action on U.S. Appl. No. 17/711,214, dated Apr. 25, 2023.
Notice of Allowance, Corrected NOA, in U.S. Appl. No. 17/532,667, dated May 9, 2023.
Office Action on U.S. Appl. No. 17/711,242, dated Jun. 7, 2023.
Office Action in U.S. Appl. No. 14/691,120 dated Aug. 18, 2023.
Office Action in U.S. Appl. No. 17/835,159 dated Aug. 22, 2023.
Notice of Allowance in U.S. Appl. No. 17/985,267 dated Aug. 18, 2023.
Advisory Action on U.S. Appl. No. 17/697,368 dated Oct. 12, 2023.
Office Action on U.S. Appl. No. 17/711,242, dated Oct. 12, 2023.
Notice of Allowance in U.S. Appl. No. 18/194,783 dated Mar. 15, 2024.
Notice of Allowance in U.S. Appl. No. 18/232,512 dated Mar. 15, 2024.
Office Action in U.S. Appl. No. 14/691,120, dated Mar. 27, 2024.
Office Action in U.S. Appl. No. 17/088,954, dated Apr. 9, 2024.
Office Action in U.S. Appl. No. 17/697,235 dated Mar. 18, 2024.
Office Action in U.S. Appl. No. 17/711,242 dated Feb. 27, 2024.
Office Action in U.S. Appl. No. 17/902,525 dated Mar. 26, 2024.
Office Action in U.S. Appl. No. 17/960,244 dated May 20, 2024.
Office Action in U.S. Appl. No. 18/120,123 dated Apr. 9, 2024.
Office Action in U.S. Appl. No. 18/234,021 dated Apr. 19, 2024.
Office Action in U.S. Appl. No. 18/234,045 dated Apr. 19, 2024.

* cited by examiner

ON-DEMAND COMPUTE ENVIRONMENT

PRIORITY CLAIM

The present application is a continuation of U.S. patent application Ser. No. 14/827,927, filed Aug. 17, 2015, which is a continuation of U.S. patent application Ser. No. 13/758,164, filed Feb. 4, 2013, (now U.S. Pat. No. 9,112,813 issued Aug. 18, 2015), which is a continuation of U.S. patent application Ser. No. 12/752,622, filed Apr. 1, 2010, now U.S. Pat. No. 8,370,495, issued Feb. 5, 2013, which is a continuation of U.S. patent application Ser. No. 11/276,856, filed Mar. 16, 2006, now U.S. Pat. No. 7,698,430, issued Apr. 13, 2010, which claims priority to U.S. Provisional Application No. 60/662,240 filed Mar. 16, 2005, the contents of which are incorporated herein by reference.

RELATED APPLICATION

The present application is related to U.S. application Ser. No. 11/276,852 incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND OF THE INVENTION

1. Field of Invention

The present invention relates to a resource management system and more specifically to a system and method of providing access to on-demand compute resources.

2. Introduction

Managers of clusters desire maximum return on investment often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data. to move between nodes. A cluster is one example of a compute environment. Other examples include a grid, which is loosely defined as a group of clusters, and a computer farm which is another organization of computer for processing.

Often a set of resources organized in a cluster or a grid may have jobs to be submitted to the resources that require more capability than the set of resource has available. in this regard, there is a need in the art for being able to easily, efficiently and on-demand be able to utilize new resources or different resources to handle a job. The concept of "on-demand" compute resources has been developing in the high performance computing community recently. An on-demand computing environment enables companies to procure compute power for average demand and then contract remote processing power to help in peak loads or to offload all their compute needs to a remote facility. Several reference books having background material related to on-demand computing or utility computing include Mike Ault, Madhu Tumma, *Oracle 10g Grid & Real Application Clusters,* Rampant TechPress, 2004 and Guy Bunker, Darren Thomson, *Delivering Utility Computing Business-driven IT Optimization,* John Wiley & Sons Ltd. 2006.

In Bunker and Thompson, section 3.3 on page 32 is entitled "Connectivity: The Great Enabler" wherein they discuss how the interconnecting of computers will dramatically increase their usefillness. This disclosure addresses that issue. There exists in the art a need for improved solutions to enable communication and connectivity with an on-demand high performance computing center.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention include, but are not limited to, methods, systems, computing devices, clusters, grids and computer-readable media that perform the processes and steps described herein.

An on-demand compute environment comprises a plurality of nodes within an on-demand compute environment available for provisioning and a slave management module operating on a dedicated node within the on-demand compute environment, wherein upon instructions from a master management module at a local compute environment, the slave management module modifies at least one node of the plurality of nodes. Methods and computer readable media are also disclosed for managing an on-demand compute environment.

A benefit of the approaches disclosed herein is a reduction in unnecessary costs of building infrastructure to accommodate peak demand. Thus, customers only pay for the extra processing power they need only during those times when they need it.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended documents and drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Various embodiments are discussed in detail below. While specific implementations are discussed, it should be understood that this is done for illustration purposes only. A person skilled in the relevant art will recognize that other components and configurations may be used without parting from the spirit and scope of the invention.

Figure 1:
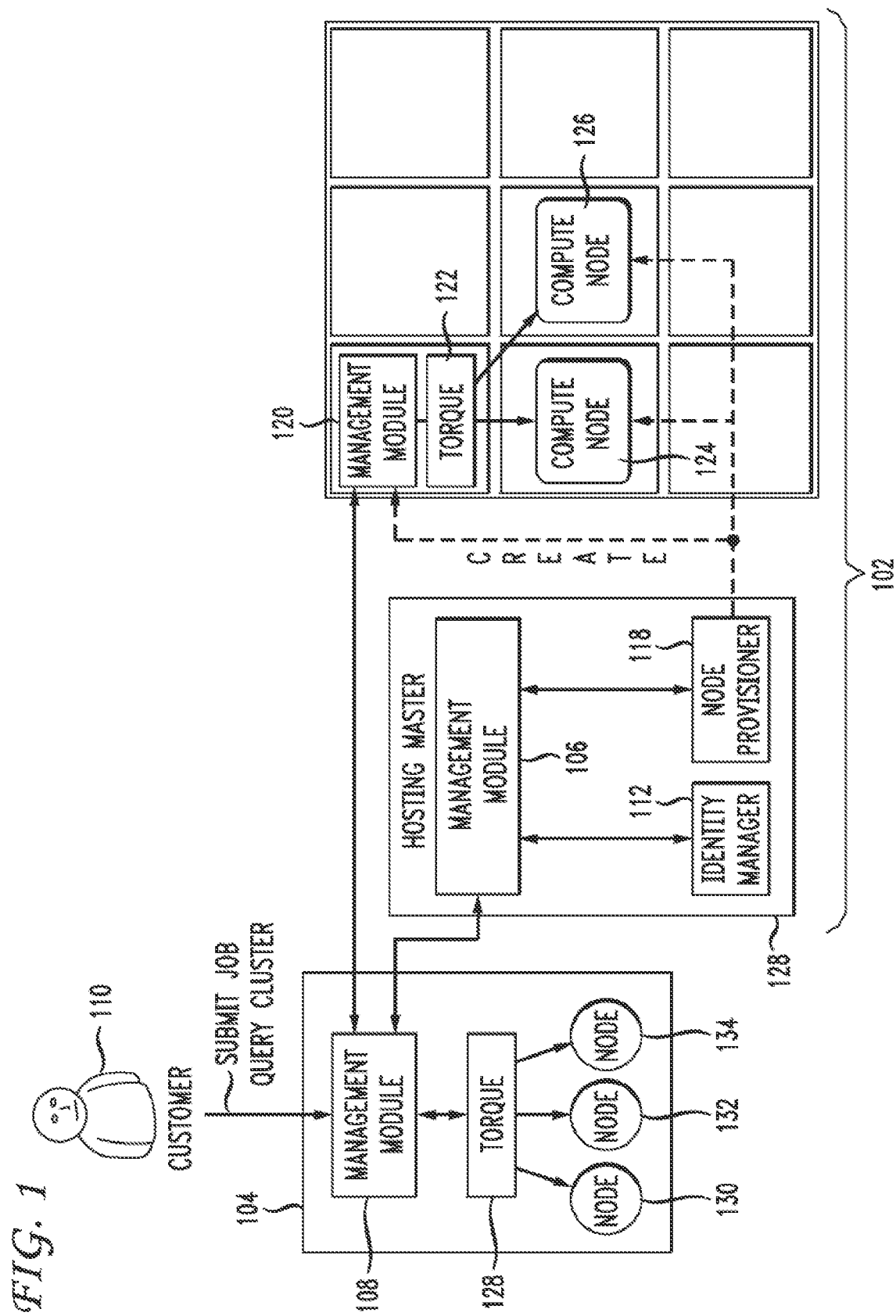
FIG. 1. illustrates the basic arrangement of the present disclosure.

This disclosure relates to the access and management of on-demand or utility computing resources at a hosting center. FIG. 1 illustrates the basic arrangement and interaction between a local compute environment 104 and an on-demand hosting center 102. The local compute environment may comprise a cluster, a grid, or any other variation on these types of multiple node and commonly managed environments. The on-demand hosting center or on-demand computing environment 102 comprises a plurality of nodes that are available for provisioning and preferably has a dedicated node containing a hosting master 128 which may comprise a slave management module 106 and/or at least one other module such as the entity manager 128 and node provisioner 118.

Products such as Moab provide an essential service for optimization of a local compute environment. It provides an analysis into how & when local resources, such as software and hardware devices, are being used for the purposes of charge-back, planning, auditing, troubleshooting and reporting internally or externally. Such optimization enables the local environment to be tuned to get the most out of the resources in the local compute environment. However, there are times where more resources are needed.

Typically a hosting center 102 will have the following attributes. It allows an organization to provide resources or services to customers where the resources or services are custom-tailored to the needs of the customer. Supporting true utility computing usually requires creating a hosting center 102 with one or more capabilities as follows: secure remote access, guaranteed resource availability at a fixed time or series of times, integrated auditing/accounting/billing services, tiered service level (QoS/SLA) based resource access, dynamic compute node provisioning, full environment management over compute, network, storage, and application/service based resources, intelligent workload optimization, high availability, failure recovery, and automated re-allocation.

A management module 108 such as, by way of example, Moab™ (which may also refer to any Moab product such as the Moab Workload Manager®, Moab Grid Monitor®, etc. from Cluster Resources, Inc.) enables utility computing by allowing compute resources to be reserved, allocated, and dynamically provisioned to meet the needs of internal or external workload. Thus, at peak workload times, the local compute environment does not need to be built out with peak usage in mind. As periodic peak resources are required, triggers can cause overflow to the on-demand environment and thus save money for the customer. The module 108 is able to respond to either manual or automatically generated requests and can guarantee resource availability subject to existing service level agreement (SLA) or quality of service (QOS) based arrangements, As an example, FIG. 1 shows a user submitting a job or a query 110 to the cluster or local environment 104. The local environment will typically be a cluster or a grid with local workload. Jobs may be submitted which have explicit resource requirements. The local environment 104 will have various attributes such as operating systems, architecture, network types, applications, software, bandwidth capabilities, etc, which are expected by the job implicitly. In other words, jobs will typically expect that the local environment will have certain attributes that will enable it to consume resources in an expected way.

Other software is shown by way of example in a distributed resource manager such as Torque 128 and various nodes 130, 132 and 134. The management modules (both master and/or slave) may interact and operate with any resource manager, such as Torque, LSF, SGE, PBS and LoadLeveler and are agnostic in this regard. Those of skill in the art will recognize these different distributed resource manager software packages.

A hosting master or hosting management module 106 may also be an instance of a Moab software product with hosting center capabilities to enable an organization to dynamically control network, compute, application, and storage resources and to dynamically provision operating systems, security, credentials, and other aspects of a complete end-to-end compute environments. Module 106 is responsible for knowing all the policies, guarantees, promises and also for managing the provisioning of resources within the utility computing space 102. In one sense, module 106 may be referred to as the "master" module in that it couples and needs to know all of the information associated with both the utility environment and the local environment. However, in another sense it may be referred to as the slave module or provisioning broker wherein it takes instructions from the customer management module 108 for provisioning resources and builds whatever environment is requested in the on-demand center 102. A slave module would have none of its own local policies but rather follows all requests from another management module. For example, when module 106 is the slave module, then a master module 108 would submit automated or manual (via an administrator) requests that the slave module 106 simply follows to manage the build out of the requested environment. Thus, for both IT and end users, a single easily usable interface can increase efficiency, reduce costs including management costs and improve investments in the local customer environment. The interface to the local environment which also has the access to the on-demand environment may be a web-interface or access portal as well. Restrictions of feasibility only may exist. The customer module 108 would have rights and ownership of all resources, The allocated resources would not be shared but be dedicated to the requester. As the slave module 106 follows all directions from the master module 108, any policy restrictions will preferably occur on the master module 108 in the local environment.

The modules also provide data management services that simplify adding resources from across a local environment. For example, if the local environment comprises a wide area network, the management module 108 provides a security model that ensures, when the environment dictates, that administrators can rely on the system even when entrusted resources at the certain level have been added to the local environment or the on-demand environment. In addition, the management modules comply with n-tier web services based architectures and therefore scalability and. reporting are inherent parts of the system, A system operating according to the principles set forth herein also has the ability to track, record and archive information about jobs or other processes that have been run on the system.

A hosting center 102 provides scheduled dedicated resources to customers for various purposes and typically has a number of key attributes: secure remote access, guaranteed resource availability at a fixed time or series of times, tightly integrated auditing/accounting services, varying quality of service levels providing privileged access to a set of users, node image management allowing the hosting center to restore an exact customer-specific image before enabling access. Resources available to a module 106, which may also be referred to as a provider resource broker, will have both rigid (architecture, RAM, local disk space, etc.) and flexible (OS, queues, installed applications etc.) attributes. The provider or on-demand resource broker 106 can typically provision (dynamically modify) flexible attributes but not rigid attributes. The provider broker 106 may possess multiple resources each with different types with rigid attributes (i.e., single processor and dual processor nodes, Intel nodes, AMD nodes, nodes with 512 MB RAM, nodes with 1 GB RAM, etc).

This combination of attributes presents unique constraints on a management system. We describe herein how the management modules 108 and 106 are able to effectively manage, modify and provision resources in this environment and provide full array of services on top of these resources.

Utility-based computing technology allows a hosting center 102 to quickly harness existing compute resources, dynamically co-allocate the resources, and automatically provision them into a seamless virtual cluster. The management modules' advanced reservation and policy management tools provide support for the establishment of extensive service level agreements, automated billing, and instant chart and report creation.

Also shown in FIG. 1 are several other components such as an identity manager 112 and a node provisioner 118 as part of the hosting center 102. The hosting master' 128 may include an identity manager interface 112 that may coordinate global and local information regarding users, groups, accounts, and classes associated with compute resources. The identity manager interface 112 may also allow the management module 106 to automatically and dynamically create and modify user accounts and credential attributes according to current workload needs. The hosting master 128 allows sites extensive flexibility when it comes to defining credential access, attributes, and relationships. In most cases, use of the USERCFG, GROUPCFG, ACCOUNTCFG, CLASSCFG, and QOSCFG parameters is adequate to specify the needed configuration. However, in certain cases, such as the following, this approach may not be ideal or even adequate: environments with very large user sets; environments with very dynamic credential configurations in terms of fairshare targets, priorities, service access constraints, and credential relationships; grid environments with external credential mapping information services; enterprise environments with fairness policies based on multi-cluster usage.

The modules address these and similar issues through the use of the identity manager 112. The identity manager 112 allows the module to exchange information with an external identity management service. As with the module's resource manager interfaces, this service can be a full commercial package designed for this purpose, or something far simpler by which the module Obtains the needed information for a web service, text file, or database.

Next attention is turned to the node provisioner 118 and as an example of its operation, the node provisioner 118 can enable the allocation of resources in the hosting center 102 for workload from a local compute environment 104. The customer management module 108 will communicate with the hosting management module 106 to begin the provisioning process. In one aspect, the provisioning module 118 may generate another instance of necessary management software 120 and 122 which will be created in the hosting center environment as well as compute nodes 124 and 126 to be consumed by a submitted job. The new management module 120 is created on the fly, may be associated with a specific request and will preferably be operative on a dedicated node. If the new management module 120 is associated with a specific request or job, as the job consumes the resources associated with the provisioned compute nodes 124, 126, and the job becomes complete, then the system would remove the management module 120 since it was only created for the specific request. The new management module 120 may connect to other modules such as module 108. The module 120 does not necessarily have to be created but may be generated on the fly as necessary to assist in communication and provisioning and use of the resources in the utility environment 102. For example, the module 106 may go ahead and allocate nodes within the utility computing environment 102 and connect these nodes directly to module 108 but in that case you may lose some batch ability as a tradeoff. The hosting master 128 having the management module 106, identity manager 112 and node provisioner 118 preferably is co-located with the utility computing environment but may be distributed. The management module on the local environment 108 may then communicate directly with the created management module 120 in the hosting center to manage the transfer of workload and consumption of on-demand center resources.

Figure 6:
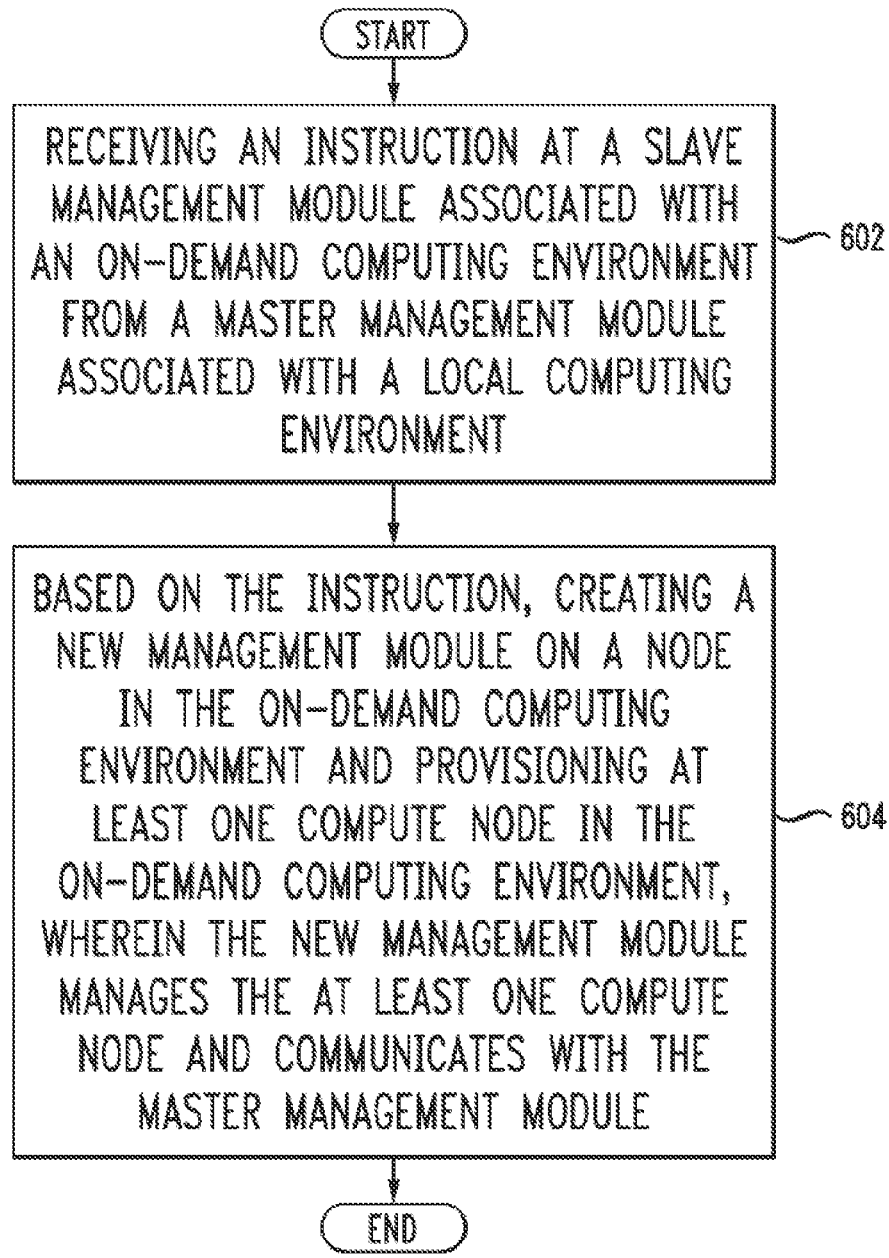
FIG. 6 illustrates another method aspect of the disclosure.

FIG. 6 provides an illustration of a method aspect of utilizing the new management module. As shown, this method comprises receiving an instruction at a slave management module associated with an on-demand computing environment from a master management module associated with a local computing environment (602) and based on the instruction, creating a new management module on a node in the on-demand computing environment and provisioning at least one compute node in the on-demand computing environment, wherein the new management module manages the at least one compute node and communicates with the master management module (604).

There are two supported primary usage models, a manual and an automatic model. In manual mode, utilizing the hosted resources can be as easy as going to a web site, specifying what is needed, selecting one of the available options, and logging in when the virtual cluster is activated. In automatic mode, it is even simpler. To utilize hosted resources, the user simply submits jobs to the local cluster. When the local cluster can no longer provide an adequate level of service, it automatically contacts the utility hosting center, allocates additional nodes, and runs the jobs. The end user is never aware that the hosting center even exists. He merely notices that the cluster is now bigger and that his jobs are being run more quickly.

When a request for additional resources is made from the local environment, either automatically or manually, a client module or client resource broker (which may be, for example, an instance of a management module 108 or 120) will contact the provider resource broker 106 to request resources. ft will send information regarding rigid attributes of needed resources as well as quantity or resources needed, request duration, and request timeframe (i.e., start time, feasible times of day, etc.) It will also send flexible attributes which must be provisioned on the nodes 124, 126. Both flexible and rigid resource attributes can come from explicit workload-specified requirement or from implicit requirements associated with the local or default compute resources. The provider resource broker 106 must indicate if it is possible to locate requested resources within the specified timeframe for sufficient duration and of the sufficient quantity. This task includes matching rigid resource attributes and identifying one or more provisioning steps required to put in place all flexible attributes.

When provider resources are identified and selected, the client resource broker 108 or 120 is responsible for seamlessly integrating these resources in with other local resources. This includes reporting resource quantity, state, configuration and load. This further includes automatically enabling a trusted connection to the allocated resources which can perform last mile customization, data staging, and job staging. Commands are provided to create this connection to the provider resource broker 106, query available resources, allocate new resources, expand existing allocations, reduce existing allocations, and release all allocated resources.

In most cases, the end goal of a hosting center 102. is to make available to a customer, a complete, secure, packaged environment which allows them to accomplish one or more specific tasks. This packaged environment may be called a virtual cluster and may consist of the compute, network, data, software, and other resources required by the customer. For successful operation, these resources must be brought together and provisioned or configured so as to provide a seamless environment which allows the customers to quickly and easily accomplish their desired tasks.

Another aspect of the invention is the cluster interface. The desired operational model for many environments is providing the customer with a fully automated self-service web interface. Once a customer has registered with the host company, access to a hosting center portal is enabled. Through this interface, customers describe their workload requirements, time constraints, and other key pieces of information. The interface communicates with the backed services to determine when, where, and how the needed virtual cluster can be created and reports back a number of options to the user. The user selects the desired option and can monitor the status of that virtual cluster via web and email updates. When the virtual cluster is ready, web and email notification is provided including access information. The customer logs in and begins working.

The hosting center 102 will have related policies and service level agreements. Enabling access in a first come-first served model provides real benefits but in many cases, customers require reliable resource access with guaranteed responsiveness. These requirements may be any performance, resource or time based rule such as in the following examples: I need my virtual cluster within 24 hours of asking; I want a virtual cluster available from 2 to 4 PM every Monday, Wednesday, and Friday; I want to always have a virtual cluster available and automatically grow/shrink it based on current load, etc.

Quality of service or service level agreement policies allow customers to convert the virtual cluster resources to a strategic part of their business operations greatly increasing the value of these resources. Behind the scenes, a hosting center 102 consists of resource managers, reservations, triggers, and policies. Once configured, administration of such a system involves addressing reported resource failures (i.e., disk failures, network outages, etc) and monitoring delivered performance to determine if customer satisfaction requires tuning policies or adding resources.

The modules associated with the local environment 104 and the hosting center environment 102 may be referred to as a master module 108 and a slave module 106. This terminology relates to the functionality wherein the hosting center 102 receives requests for workload and provisioning of resources from the module 108 and essentially follows those requests. In this regard, the module 108 may be referred to as a client resource broker 108 which will contact a provider resource broker 106 (such as an On-Demand version of Moab).

The management module 108 may also be, by way of example, a Moab Workload Manager® operating in a master mode. The management module 108 communicates with the compute environment to identify resources, reserve resources for consumption by jobs, provision resources and in general manage the utilization of all compute resources within a compute environment. As can be appreciated by one of skill in the art, these modules may be programmed in any programming language, such as C or C++ and which language is immaterial to the invention.

In a typical operation, a user or a group submits a job to a local compute environment 104 via an interface to the management module 108. An example of a job is a submission of a computer program that will perform a weather analysis for a television station that requires the consumption of a large amount of compute resources. The module 108 and/or an optional scheduler 128 such as TORQUE, as those of skill in the art understand, manages the reservation of resources and the consumption of resources within the environment 104 in an efficient manner that complies with policies and restrictions. The use of a resource manager like TORQUE 128 is optional and not specifically required as part of the disclosure.

A user or a group of users will typically enter into a service level agreement (SLA) which will define the policies and guarantees for resources on the local environment 104. For example, the SLA may provide that the user is guaranteed 10 processors and 50 GB of hard drive space within 5 hours of a submission of a job request. Associated with any user may be many parameters related to permissions, guarantees, priority level, time frames, expansion factors, and so forth. The expansion factor is a measure of how long the job is taking to run on a local environment while sharing the environment with other jobs versus how long it would take if the cluster was dedicated to the job only. It therefore relates to the impact of other jobs on the performance of the particular job. Once a job is submitted and will sit in a job queue waiting to be inserted into the cluster 104 to consume those resources. The management software will continuously analyze the environment 104 and make reservations of resources to seek to optimize the consumption of resources within the environment 104. The optimization process must take into account all the SLA's of users, other policies of the environment 104 and other factors.

As introduced above, this disclosure provides improvements in the connectivity between a local environment 104 and an on-demand center 102. The challenges that exist in accomplishing such a connection include managing all of the capabilities of the various environments, their various policies, current workload, workload queued up in the job queues and so forth.

As a general statement, disclosed herein is a method and system for customizing an on-demand compute environment based on both implicit and explicit job or request requirements. For example, explicit requirements may be requirements specified with a job such as a specific number of nodes or processor and a specific amount of memory. Many other attributes or requirements may be explicitly set forth with a job submission such as requirements set forth in an SLA for that user. Implicit prequirements may relate to attributes of the compute environment that the job is expecting because of where it is submitted. For example, the local compute environment 104 may have particular attributes, such as, for example, a certain bandwidth for transmission, memory, software licenses, processors and processor speeds, hard drive memory space, and so forth. Any parameter that may be an attribute of the local environment in which the job is submitted may relate to an implicit requirement. As a local environment 104 communicates with an on-demand environment 102 for the transfer of workload, the implicit and explicit requirements are seamlessly imported into the on-demand environment 102 such that the user's job can efficiently consume resources in the on-demand environment 102 because of the customization of that environment for the job. This seamless communication occurs between a master module 108 and a slave module 106 in the respective environments. As shown in FIG. 1, a new management module 120 may also be created for a specific process or job and also communicate with a master module 108 to manage the provisioning, consumption and clean up of compute nodes 124, 126 in the on-demand environment 102.

Part of the seamless communication process includes the analysis and provisioning of resources taking into account the need to identify resources such as hard drive space and bandwidth capabilities to actually perform the transfer of the workload. For example, if it is determined that a job in the queue has a SLA that guarantees resources within 5 hours of the request, and based on the analysis by the management module of the local environment the resources cannot be available for 8 hours, and if such a scenario is at triggering event, then the automatic and seamless connectivity with the on-demand center 102 will include an analysis of how long it will take to provision an environment in the on-demand center that matches or is appropriate for the job to run. That process, of provisioning the environment in the on-demand center 102, and transferring workload from the local environment 104 to the on-demand center 102, may take, for example, 1 hour. In that case, the on-demand center will begin the provisioning process one hour before the 5 hour required time such that the provisioning of the environment and transfer of data can occur to meet the SLA for that user. This provisioning process may involve reserving resources within the on-demand center 102 from the master module 108 as will be discussed more below.

Figure 3:
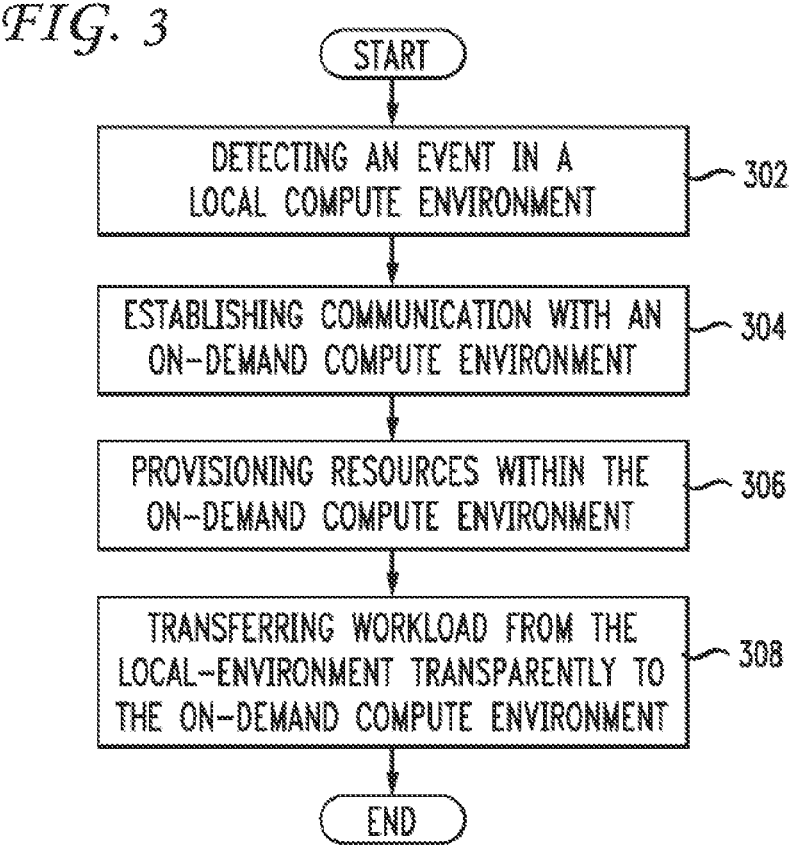
FIG. 3 illustrates a method aspect of the disclosure.

FIG. 3 illustrates an embodiment in this regard, wherein a method comprises detecting an event in a local compute environment (302). The event may be a resource need event such as a current resource need or a predicted resource need. Based on the detected event, a module automatically establishes communication with an on-demand compute environment (304). This may also involve dynamically negotiating and establishing a grid/peer relationship based on the resource need event. A module provisions resources within the on-demand compute environment (306) and workload is transferred from the local-environment transparently to the on-demand compute environment (308). Preferably, local information is imported to the on-demand environment and on-demand information is communicated to the local compute environment, although only local environment information may be needed to be transmitted to the on-demand environment. Typically, at least local environment information is communicated and also job information may be communicated to the on-demand environment. Examples of local enviromnent information may be at least one of class information, configuration policy information and other information. Information from the on-demand center may relate to at least one of resources, availability of resources, time frames associated with resources and any other kind of data that informs the local environment of the opportunity and availability of the on-demand resources. The communication and management of the data between the master module or client module in the local environment and the slave module is preferably transparent and unknown to the user who submitted the workload to the local environment. However, one aspect may provide for notice to the user of the tapping into the on-demand resources and the progress and availability of those resources.

Example triggering events may be related to at least one of a resource threshold, a service threshold, workload and a policy threshold or other factors. Furthermore, the event may be based one of all workload associated with the local compute environment or a subset of workload associated with the compute environment or any other subset of a given parameter or may be external to the compute environment such as a natural disaster or power outage or predicted event.

The disclosure below provides for various aspects of this connectivity process between a local environment 104 and an on-demand center 102. The CD submitted with the priority Provisional Patent Application includes source code that carries out this functionality. The various aspects will include an automatic triggering approach to transfer workload from the local environment 104 to the on-demand center 102, a manual "one-click" method of integrating the on-demand compute environment 102 with the local environment 104 and a concept related to reserving resources in the on-demand compute environment 102 from the local compute environment 104.

The first aspect relates to enabling the automatic detection of a triggering event such as passing a resource threshold or service threshold within the compute environment 104. This process may be dynamic and involve identifying resources in a hosting center, allocating resources and releasing them after consumption. These processes may be automated based on a number of factors, such as: workload and credential performance thresholds; a job's current time waiting in the queue for execution, (queuetime) (i.e. allocate if a job has waited more than 20 minutes to receive resources); a job's current expansion factor which relates to a comparison of the affect of other jobs consuming local resources has on the particular job in comparison to a value if the job was the only job consuming resources in the local environment; a job's current execution load (i.e., allocate if load on job's allocated resources exceeds 0.9); quantity of backlog workload (i.e., allocate if more than 50,000 proc-hours of workload exist); a job's average response time in handling transactions (i.e., allocate if job reports it is taking more than 0.5 seconds to process transaction); a number of failures workload has experienced (i.e., allocate if a job cannot start after 10 attempts); overall system utilization (i.e., allocate if more than 80% of machine is utilized) and so forth. This is an example list and those of skill in the art will recognize other factors that may be identified as triggering events.

Other triggering events or thresholds may comprise a predicted workload performance threshold. This would relate to the same listing of events above but be applied in the context of predictions made by a management module or customer resource broker.

Another listing of example events that may trigger communication with the hosting center include, but are not limited to events such as resource failures including compute nodes, network, storage, license (i.e., including expired licenses); service failures including DNS, information services, web services, database services, security services; external event detected (i.e., power outage or national emergency reported) and so forth. These triggering events or thresholds may be applied to allocate initial resources, expand allocated resources, reduce allocated resources and release all allocated resources. Thus, while the primary discussion herein relates to an initial allocation of resources, these triggering events may cause any number of resource-related actions. Events and thresholds may also be associated with any subset of jobs or nodes (i.e., allocate only if threshold backlog is exceeded on high priority jobs only or jobs from a certain user or project or allocate resources only if certain service nodes fail or certain licenses become unavailable.)

For example, if a threshold of 95% of processor consumption is met by 951 processors out of the 1000 processors in the environment are being utilized, then the system (which may or may not include the management module 108) automatically establishes a connection with the on-demand environment 102. Another type of threshold may also trigger the automatic connection such as a service level received threshold, a service level predicted threshold, a policy-based threshold, a threshold or event associated with environment changes such as a resource failure (compute node, network storage device, or service failures).

In a service level threshold, one example is where a SLA specifies a certain service level requirement for a customer, such as resources available within 5 hours. If an actual threshold is not met, i.e., a job has waited now for 5 hours without being able to consume resource, or where a threshold is predicted to not be met, these can be triggering events for communication with the on-demand center. The module 108 then communicates with the slave manager 106 to provision or customize the on-demand resources 102. The two environments exchange the necessary information to create reservations of resources, provision, handle licensing, and so forth, necessary to enable the automatic transfer of jobs or other workload from the local environment 104 to the on-demand environment 102. For a particular task or job, all or part of the workload may be transferred to the on-demand center. Nothing about a user job 110 submitted to a management module 108 changes. The on-demand environment 102 then instantly begins running the job without any change in the job or perhaps even any knowledge of the submitter.

There are several aspects of the disclosure that are shown in the source code on the CD. One is the ability to exchange information. For example, for the automatic transfer of workload to the on-demand center, the system will import remote classes, configuration policy information and other information from the local scheduler 108 to the slave scheduler 106 for use by the on-demand environment 102 Information regarding the on-demand compute environment, resources, policies and so forth are also communicated from the slave module 106 to the local module 108.

The triggering event for the automatic establishment of communication with the on-demand center and a transfer of workload to the on-demand center may be a threshold. that has been passed or an event that occurred. Threshold values may comprise an achieved service level, predicted service level and so forth. For example, a job sitting in a queue for a certain amount of time may trigger a process to contact the on-demand center and transfer that job to the on-demand center to run. If a queue has a certain number of jobs that have not been submitted to the compute environment for processing, if a job has an expansion factor that has a certain value, if a job has failed to start on a local cluster one or more times for whatever reason, then these types of events may trigger communication with the on-demand center. These have been examples of threshold values that when passed will trigger communication with the on-demand environment.

Example events that also may trigger the communication with the on-demand environment include, but are not limited to, events such as the failure of nodes within the environment, storage failure, service failure, license expiration, management software failure, resource manager fails, etc. In other words, any event that may be related to any resource or the management of any resource in the compute environment may be a qualifying event that may trigger workload transfer to an on-demand center. In the license expiration context, if the license in a local environment of a certain software package is going to expire such that a job cannot properly consume resources and utilize the software package, the master module 108 can communicate with the slave module 106 to determine if the on-demand center has the requisite license for that software. If so, then the provisioning of the resources in the on-demand center can be negotiated and the workload transferred wherein it can consume resources under an appropriate legal and licensed framework.

The basis for the threshold or the event that triggers the communication, provisioning and transfer of workload to the on-demand center may be all jobs/workload associated with the local compute environment or a subset of jobs/workload associated with the local compute environment. In other words, the analysis of when an event and/or threshold should trigger the transfer of workload may be based on a subset of jobs. For example, the analysis may be based on all jobs submitted from a particular person or group or may be based on a certain type of job, such as the subset of jobs that will require more than 5 hours of processing time to run. Any parameter may be defined for the subset of jobs used to base the triggering event.

The interaction and communication between the local compute environment and the on-demand compute environment enables an improved process for dynamically growing and shirking provisioned resource space based on load. This load balancing between the on-demand center and the local environment may be based on thresholds, events, all workload associated with the local environment or a subset of the local environment workload.

Another aspect of the disclosure is the ability to automate data management between two sites. This involves the transparent handling of data management between the on-demand environment 102 and the local environment 104 that is transparent to the user. Typically environmental information will always be communicated between the local environment 104 and the on-demand environment 102. In some cases, job information may not need to be communicated because a job may be gathering its own information, say from the Internet, or for other reasons. Therefore, in preparing to provision resources in the on-demand environment all information or a subset of information is communicated to enable the process. Yet another aspect of the invention relates to a simple and easy mechanism to enable on-demand center integration. This aspect of the invention involves the ability of the user or an administrator to, in a single action like the click of a button or a one-click action, be able to command the integration of an on-demand center information and capability into the local resource manager 108.

Figure 4:
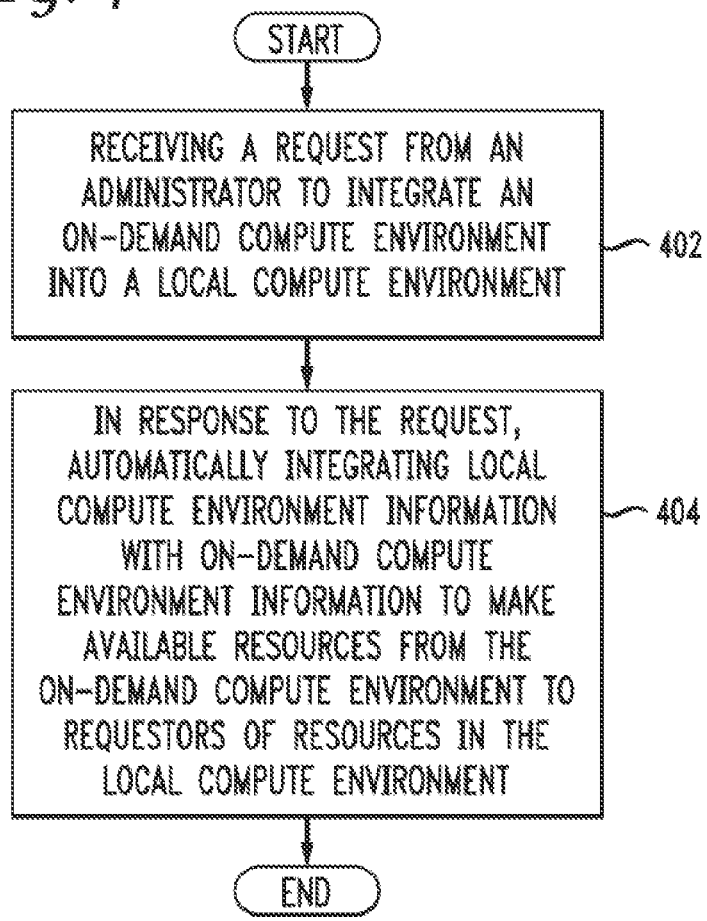
FIG. 4 illustrates a method aspect of the disclosure.

This feature is illustrated in FIG. 4. A module, preferably associated with the local compute environment, receives a request from an administrator to integrate an on-demand compute environment into the local compute environment (402). The creation of a reservation or of a provisioning of resources in the on-demand environment may be from a request from an administrator or local or remote automated broker, In this regard, the various modules will automatically integrate local compute environment information with on-demand compute environment information to make available resources from the on-demand compute environment to requesters of resources in the local compute environment (404). Integration of the on-demand compute environment may provide for integrating: resource configuration, state information, resource utilization reporting, job submission information, job management information resource management, policy controls including priority, resource ownership, queue configuration, job accounting and tracking and resource accounting and tracking. Thus, the detailed analysis and tracking of jobs and resources may be communicated back from the on-demand center to the local compute environment interface. Furthermore, this integration process may also include a step of automatically creating at least one of a data migration interface and a job migration interface.

Another aspect provides for a method of integrating an on-demand compute environment into a local compute environment. The method comprises receiving a request from an administrator or via an automated command from an event trigger or administrator action to integrate an on-demand compute environment into a local compute environment. In response to the request, local workload information and/or resource configuration information is routed to an on-demand center and an environment is created and customized in the on-demand center that is compatible with workload requirements submitted to the local compute environment. Billing and costing are also automatically integrated and handled.

The exchange and integration of all the necessary information and resource knowledge may be performed in a single action or click to broaden the set of resources that may be available to users who have access initially only to the local compute environment 104. The system may receive the request to integrate an on-demand compute environment into a local compute environment in other manners as well, such as any type of multi-modal request, voice request, graffiti on a touch-sensitive screen request, motion detection, and so forth. Thus the one-click action may be a single tap on a touch sensitive display or a single voice command such as "integrate" or another command or multi-modal input that is simple and singular in nature. In response to the request, the system automatically integrates the local compute environment information with the on-demand compute environment information to enable resources from the on-demand compute environment available to requestors of resources in the local compute environment.

The one-click approach relates to the automated approach expect a human is in the middle of the process. For example, if a threshold or a triggering event is passed, an email or a notice may be sent to an administrator with options to allocate resources from the on-demand center. The administrator may be presented with one or more options related to different types of allocations that are available in the on-demand center—and via one-click or one action the administrator may select the appropriate action. For example, three options may include 500 processors in 1 hour; 700 processors in 2 hours; and 1000 processors in 10 hours. The options may be intelligent in that they may take into account the particular triggering event, costs of utilizing the on-demand environment, SLAs, policies, and any other parameters to present options that comply with policies and available resources. The administrator may be given a recommended selection based on SLAs, cost, or any other parameters discussed herein but may then choose the particular allocation package for the on-demand center. The administrator also may have an option, without an alert, to view possible allocation packages in the on-demand center if the administrator knows of an upcoming event that is not capable of being detected by the modules, such as a meeting with a group wherein they decide to submit a large job the next day which will clearly require on-demand resources. The one-click approach encapsulates the command line instruction to proceed with the allocation of on-demand resources.

One of the aspects of the disclosure is the integration of an on-demand environment 102 and a local compute environment 104 is that the overall data appears locally. In other words, the local scheduler 108 will have access to the resources and knowledge of the on-demand environment 102 but those resources, with the appropriate adherence to local policy requirements, is handled locally and appears locally to users and administrators of the local environment 104.

Another aspect of the invention that is enabled with the attached source code is the ability to specify configuration information and feeding it down the line. For example, the interaction between the compute environments supports static reservations. A static reservation is a reservation that a user or an administrator cannot change, remove or destroy. It is a reservation that is associated with the resource manager 108 itself. A static reservation blocks out time frames when resources are not available for other uses. For example, if to enable a compute environment to have workload run on (or consume) resources, a job takes an hour to provision a resources, then the module 108 may make a static reservation of resources for the provisioning process. The module 108 will locally create a static reservation for the provisioning component of running the job. The module 108 will report on these constraints associated with the created static reservation within the on-demand compute environment.

Then, the module 108 will communicate with the slave module 106 if on-demand resources are needed to run a job. The module 108 communicates with the slave module 106 and identifies what resources are needed (20 processors and 512 MB of memory, for example) and inquires when can those resources be available. Assume that module 106 responds that the processors and memory will be available in one hour and that the module 108 can have those resources for 36 hours. Once all the appropriate information has been communicated between the modules 106 and 108, then module 108 creates a static reservation to block the first part of the resources which requires the one hour of provisioning. The module 108 may also block out the resources with a static reservation from hour 36 to infinity until the resources go away. Therefore, from zero to one hour is blocked out by a static reservation and from the end of the 36 hours to infinity is blocked out. In this way, the scheduler 108 can optimize the on-demand resources and insure that they are available for local workloads. The communication between the modules 106 and 108 is performed preferably via tunneling.

Another aspect relates to receiving requests or information associated with resources in an on-demand center. An example will illustrate. Assume that a company has a reservation of resources within an on-demand center but then finds out that their budget is cut for the year. There is a mechanism for an administrator to enter information such as a request for a cancellation of a reservation so that they do not have to pay for the consumption of those resources. Any type of modification of the on-demand resources may be contemplated here. This process involves translating a current or future state of the environment for a requirement of the modification of usable resources. Another example includes where a group determines that they will run a large job over the weekend that will knowingly need more than the local environment. An administrator can submit in the local resource broker 108 a submission of information associated with a parameter—such as a request for resources and the local broker 108 will communicate with the hosting center 106 and the necessary resources can be reserved in the on-demand center even before the job is submitted to the local environment.

The modification of resources within the on-demand center may be an increase, decrease, or cancellation of resources or reservations for resources. The parameters may be a direct request for resources or a modification of resources or may be a change in an SLA which then may trigger other modifications. For example, if an SLA prevented a user from obtaining more than 500 nodes in an on-demand center and a current reservation has maximized this request, a change in the SLA agreement that extended this parameter may automatically cause the module 106 to increase the reservation of nodes according to the modified SLA. Changing policies in this manner may or may not affect the resources in the on-demand center.

Figure 5:
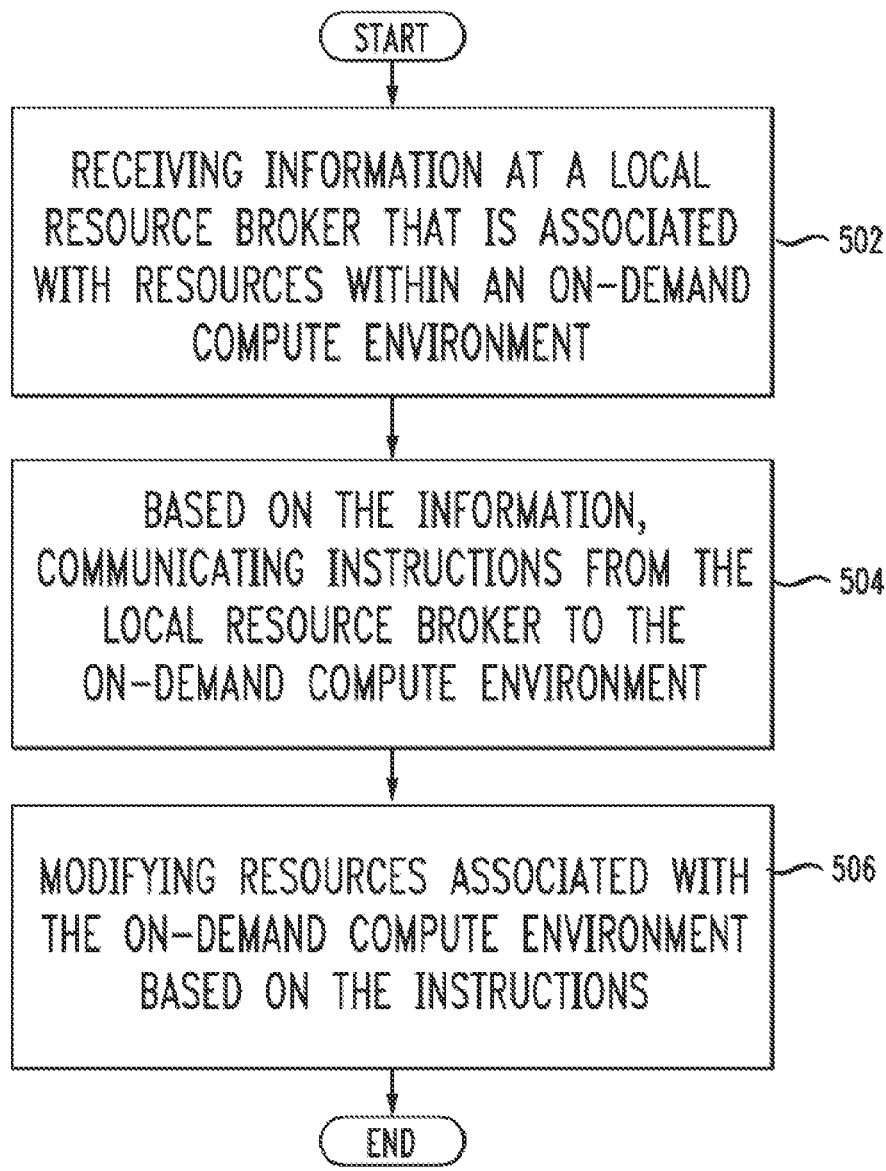
FIG. 5 illustrates another method aspect of the disclosure.

FIG. 5 illustrates a method embodiment related to modifying resources in the on-demand compute environment. The method comprises receiving information at a local resource broker that is associated with resources within an on-demand compute environment (502). Based on the information, the method comprises communicating instructions from the local resource broker to the on-demand compute environment (504) and modifying resources associated with the on-demand compute environment based on the instructions (506). As mentioned above, examples of the type of information that may be received include information associated with a request for a new reservation, a cancellation of an existing reservation, or a modification of a reservation such as expanding or contracting the reserved resources in the on-demand compute environment. Other examples include a revised policy or revision to an SLA that alters (increases or perhaps decreases) allowed resources that may be reserved in the on-demand center. The master module 108 will then provide instructions to the slave module 106 to create or modify reservations in the on-demand computing environment or to make some other alteration to the resources as instructed.

Receiving resource requirement information may be based on user specification, current or predicted workload. The specification of resources may be fully explicit, or may be partially or fully implicit based on workload or based on virtual private cluster (VPC) package concept where VPC package can include aspects of allocated or provisioning support environment and adjustments to resource request timeframes including pre-allocation, allocation duration, and post-allocation timeframe adjustments. The Application incorporated above provides information associated with the VPC that may be utilized in many respects in this invention.

The reserved resources may be associated with provisioning or customizing the delivered compute environment. A reservation may involve the co-allocation of resources including any combination of compute, network, storage, license, or service resources (i.e., parallel database services, security services, provisioning services) as part of a reservation across multiple different resource types. Also, the co-allocation of resources over disjoint timeframes to improve availability and utilization of resources may be part of a reservation or a modification of resources. Resources may also be reserved with automated failure handling and resource recovery.

Another feature associated with reservations of resources within the on-demand environment is the use of provisioning padding. This is an alternate approach to the static reservation discussed above, For example, if a reservation of resources would require 2 hours of processing time for 5 nodes, then that reservation may be created in the on-demand center as directed by the client resource broker 108. As part of that same reservation or as part of a separate process, the reservation may be modified or adjusted to increase its duration to accommodate for provisioning overhead and clean up processes. Therefore, there may need to be ½ hour of time in advance of the beginning of the two hour block wherein data transmission, operating system set up, or any other provisioning step needs to occur. Similarly, at the end of the two hours, there may need to be 15 minutes to clean up the nodes and transmit processed data to storage or hack to the local compute environment. Thus, an adjustment of the reservation may occur to account for this provisioning in the on-demand environment. This may or may not occur automatically, for example, the user may request resources for 2 hours and the system may automatically analyze the job submitted or utilize other information to automatically adjust the reservation for the provisioning needs. The administrator may also understand the provisioning needs and specifically request a reservation with provisioning pads on one or both ends of the reservation.

A job may also be broken into component parts and only one aspect of the job transferred to an on-demand center for processing. In that case, the modules will work together to enable co-allocation of resources across local resources and on-demand resources. For example, memory and processors may be allocated in the local environment while disk space is allocated in the on-demand center. In this regard, the local management module could request the particular resources needed for the co-allocation from the on-demand center and when the job is submitted for processing that portion of the job would consume on-demand center resources while the remaining portion of the job consumes local resources. This also may be a manual or automated process to handle the co-allocation of resources.

Another aspect relates to interaction between the master management module 106 and the slave management module 106. Assume a scenario where the local compute environment requests immediate resources from the on-demand center. Via the communication between the local and the on-demand environments, the on-demand environment notifies the local environment that resources are not available for eight hours but provides the information about those resources in the eight hours. At the local environment, the management module 108 may instruct the on-demand management module 106 to establish a reservation for those resources as soon as possible (in eight hours) including, perhaps, provisioning padding for overhead. Thus, although the local environment requested immediate resources from the on-demand center, the best that could be done in this case is a reservation of resources in eight hours given the provisioning needs and other workload and jobs running on the on-demand center. Thus, jobs running or in the queue at the local environment will have an opportunity to tap into the reservation and given a variety of parameters, say job number 12 has priority or an opportunity to get a first choice of those reserved resources.

Figure 2:
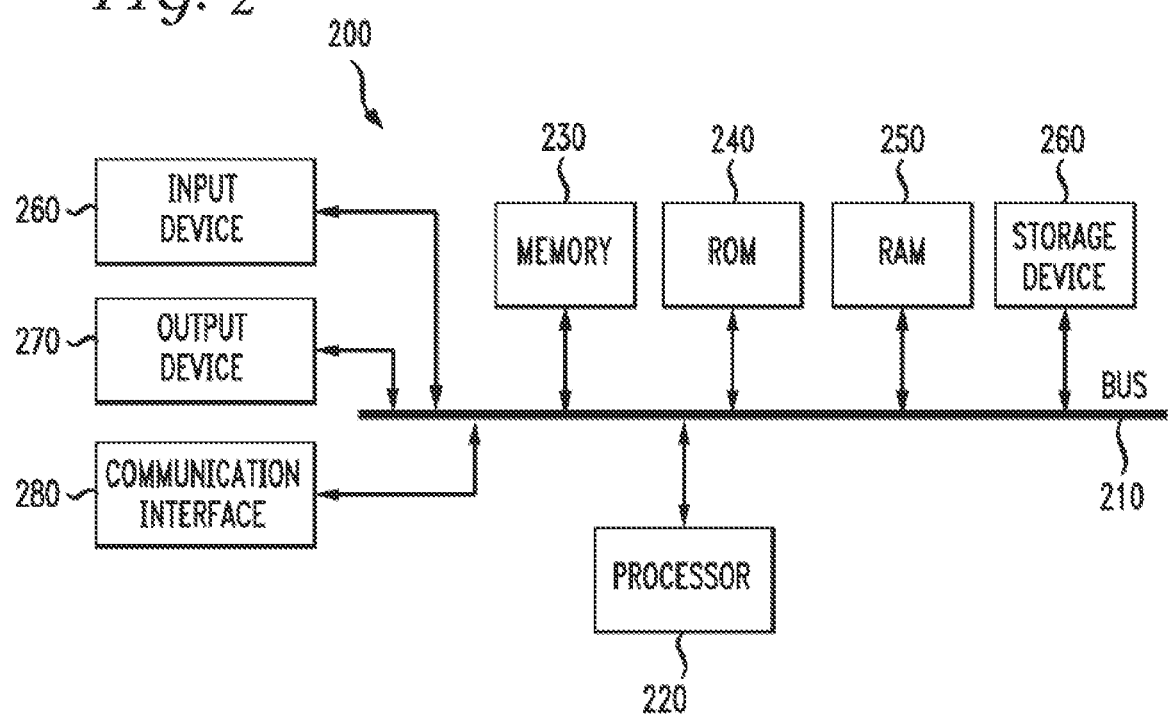
FIG. 2 illustrates basic hardware components.

With reference to FIG. 2, an exemplary system for implementing the invention includes a general purpose computing device 200, including a processing unit (CPU) 220, a system memory 230, and a system bus 210 that couples various system components including the system memory 230 to the processing unit 220. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. In this regard, the various functions associated with the invention that are primarily set forth as the method. embodiment of the invention may be practiced by using any programming language and programming modules to perform the associated operation within the system or the compute environment. Here the compute environment may be a cluster, grid, or any other type of coordinated commodity resources and may also refer to two separate compute environments that are coordinating workload, workflow and so forth such as a local compute environment and an on-demand compute environment. Any such programming module will preferably be associated with a resource management or workload manager or other compute environment management software such as Moab but may also be separately programmed. The basic components are known to those of skill in the art and appropriate variations are contemplated depending on the type of device, such as whether the device is a small, handheld computing device, a desktop computer, or a computer server.

As mentioned above, the present application is related to U.S. patent application Ser. No. 11/276,852, which was incorporated herein by reference. The following paragraphs, modified for formatting, are from that application.

The present invention provides a system, method and computer-readable media for generating virtual private clusters out of a group of compute resources. Typically, the group of compute resources involves a group of clusters independently administered. The method provides for aggregating the group of compute resources, partitioning the aggregated group of compute resources and presenting to each user in an organization a partition representation the organization's virtual private cluster. The users transparently view their cluster and have control over its operation. The partitions may be static or dynamic.

The present invention relates to clusters and more specifically a system and method of creating a virtual private cluster.

Figure 7:
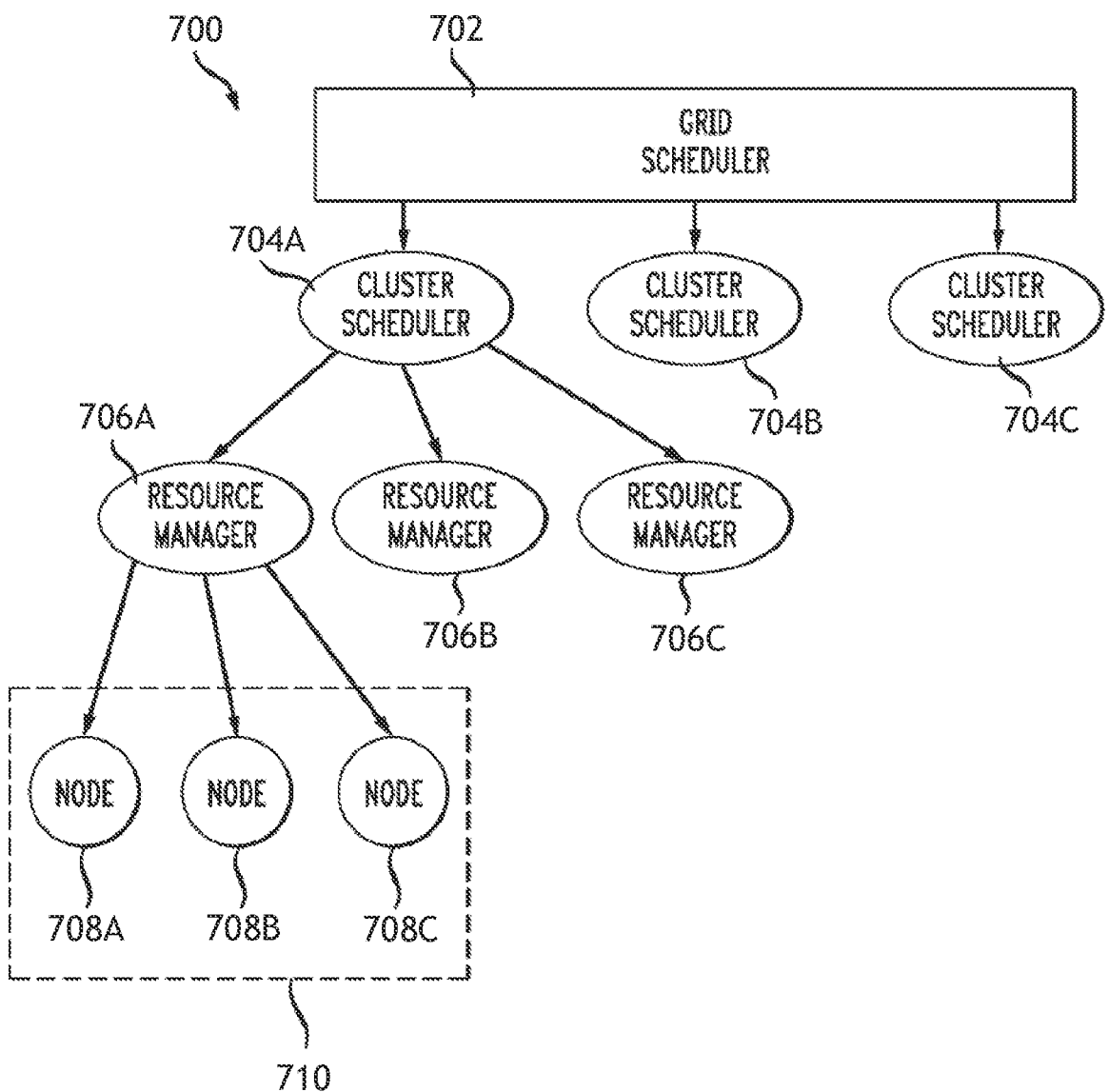
FIG. 7 illustrates the context of the invention by showing a prior art organization of clusters and a grid.

The present invention applies to computer clusters and computer grids. A computer cluster may be defined as a parallel computer that is constructed of commodity components and runs commodity software. FIG. 7 illustrates in a general way an example relationship between clusters and grids. A cluster 710 is made up of a plurality of nodes 708A, 708B, 708C, each containing computer processors, memory that is shared by processors in the node and other peripheral devices such as storage discs connected by a network. A resource manager 706A for the node 710 manages jobs submitted by users to be processed by the cluster. Other resource managers 706B, 706C are also illustrated that may manage other clusters (not shown). An example job would be a weather forecast analysis that is compute intensive that needs to have scheduled a cluster of computers to process the job in time for the evening news report.

A cluster scheduler 704A may receive job submissions and identify using information from the resource managers 706A, 706B, 706C which cluster has available resources. The job would then be submitted to that resource manager for processing. Other cluster schedulers 704B and 704C are shown by way of illustration. A grid scheduler 702 may also receive job submissions and identify based on information from a plurality of cluster schedulers 704A, 704B, 704C which clusters may have available resources and then submit the job accordingly.

Several books provide background information on how to organize and create a cluster or a grid and related technologies. See, e.g., *Grid Resource Management. State of the Art and Future Trends*, Jarek Nabrzyski, Jennifer M. Schopf, and Jan Weglarz, Kluwer Academic Publishers, 2004; and Beowulf Cluster Computing with Linux, edited by William Gropp, Ewing Lusk, and Thomas Sterling, Massachusetts Institute of Technology, 2003.

Figure 8:
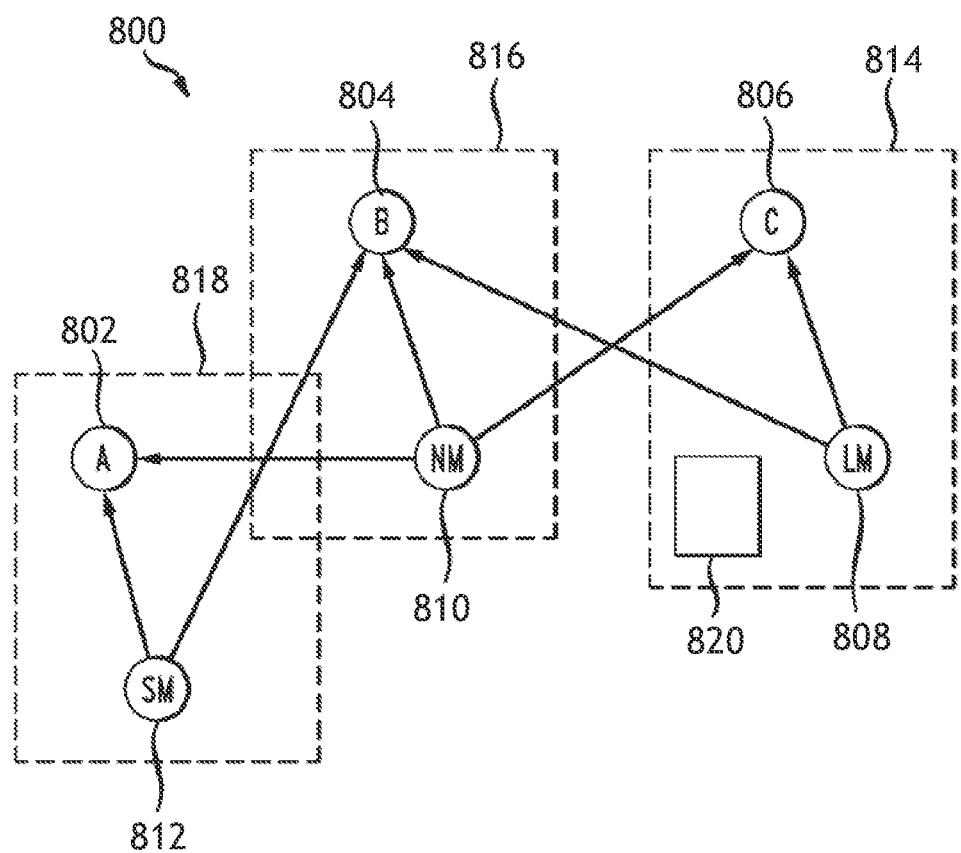
FIG. 8 illustrates a prior art arrangement of clusters within a company or organization.

FIG. 8 illustrates a known arrangement 800 comprising a group of computer clusters 814, 816, 818 consisting of a number of computer nodes 802, 804, 806 each having a group of memory disks, swap, local to the computer itself. In addition, there may exist a number of services that are a part of that cluster. Block 818 comprises two components, a cluster 802 and a storage manager 812 providing network storage services such as LAN-type services. Block 818 illustrates that the network storage services 812 and the cluster or object 802 are organized into a single and independently administered cluster. An example of this may be a marketing department in a large company may have an information technology ("IT") staff that administers this cluster for that department.

Storage manager 812 may also communicate with nodes or objects 804 in other clusters such as are shown in FIG. 7. Block 816 shows a computer cluster 804 and a network manager 810 that communicate with cluster 804 and may impact other clusters, shown in this case as cluster 802 and cluster 806.

Block 814 illustrates a computer cluster 806 and a software license manager 808. The license manager 808 is responsible for providing software licenses to various user applications and it ensures that an entity stays within bounds of its negotiated licenses with a software vendor. The license manager 808 may also communicate with other clusters 804 as shown.

Assuming that computer clusters 814, 816 and 818 are all part of a single company's computer resources, that company would probably have a number IT teams managing each cluster 816, 814, 818. Typically, there is little crossover or no crossover between the clusters in terms of managing and administration from one cluster to another other than the example storage manager 812, network manager 810 or license manager 808.

There are also many additional services that are local and internal to each cluster. The following are examples of local services that would be found within each cluster 814, 816, 818: cluster scheduling, message passing, network file system auto mounter, network information services and password services are examples of local services shown as feature 820 in block 814. These illustrate local services that are unique and locally managed. All of those have to be independently managed within each cluster by the respective IT staff.

Assuming that a company owns and administers each cluster 818, 816 and 814, there are reasons for aggregating and partitioning the compute resources. Each organization in the company desires complete ownership and administration over its compute resources. Take the example of a large auto manufacturing company. Various organizations within the company include sales, engineering, marketing and research and development. The sales organization does market research, looking at sales, historical information, analyzing related data and determining how to target the next sales campaign. Design graphics and rendering of advertising may require computer processing power. The engineering department performs aerodynamics and materials science studies and analysis. Each organization with in the company has its own set of goals and computer resource requirements to make certain they can generate its deliverables to the customers.

While this model provides each organization control over their resources, there are downsides to this arrangement. A large cost is the requirement for independent IT teams administering each cluster. There is no opportunity for load balancing where if the sale organization has extra resources not being used, there is no way to connect these clusters to enable access by the engineer teams.

Another cause of reduced efficiency with individual clusters as shown in FIG. 7 is over or under restraining. Users who submit jobs to the cluster for processing desire a certain level of response time according to their desired parameters and permissions. In order to insure the response time, cluster managers typically must significantly over-specify the cluster resources to get the results they want or control over the cycle distribution. When a job is over-specified and then submitted to the cluster, often the job simply does not utilize all the specified resources. This process can leave a percentage of the resources simply unused.

What is needed in the art is a means of maintaining cluster partitions but also sharing resources where needed to improve the efficiency of a cluster or a group of clusters.

Those who manage clusters or submit jobs to clusters want to be able to control the cluster's resources in an efficient manner. There was previously no mechanism to soft partition a cluster or a group of clusters to provide managers with the control they want without giving them a whole lot of additional overhead. Most users do not care how their cluster is set up as long as the resources are available to process submitted jobs and they have the desired level of control.

The present invention addresses the deficiencies in the prior art by providing a system and method of establishing a virtual private cluster out of a group of compute resources. In one aspect of the invention, the group of compute resources may be viewed as a group of clusters. In order to address the deficiencies in the prior art, the present invention introduces steps to create and utilize a virtual private cluster. The method comprises aggregating compute resources across the group of compute resources. This step may comprise two levels, a first level of aggregating multiple resources of the same type and a second level of aggregating resources of distinct types. Aggregating multiple resources of the same type would typically indicate pulling together compute hosts that are possibly connected across multiple networks (or clusters) and aggregating those as though they were one giant cluster. The second type of aggregating involving resources of various types involves aggregating compute resources together with network resources, application or license management resources and storage management resources.

The method next comprises establishing partitions of the group of compute resources to fairly distribute available compute resources amongst a plurality of organizations and presenting only partitioned resources accessible by each organization to users within each organization, wherein the resources presented to each is the virtual private cluster. In this manner, aggregating, partitioning and presenting to a user only their soft partitioned resources enables a more efficient use of the combined group of clusters and is also transparent to the user while providing the desired level of control over the virtual private cluster to the user.

Various embodiments of the invention include systems, methods and computer-readable media storing instructions for controlling a computing device to perform the steps of generating a virtual private cluster.

Applicants note that the capability for performing the steps set forth herein are contained within the source code filed with the CD in the parent provisional application.

Figure 9:
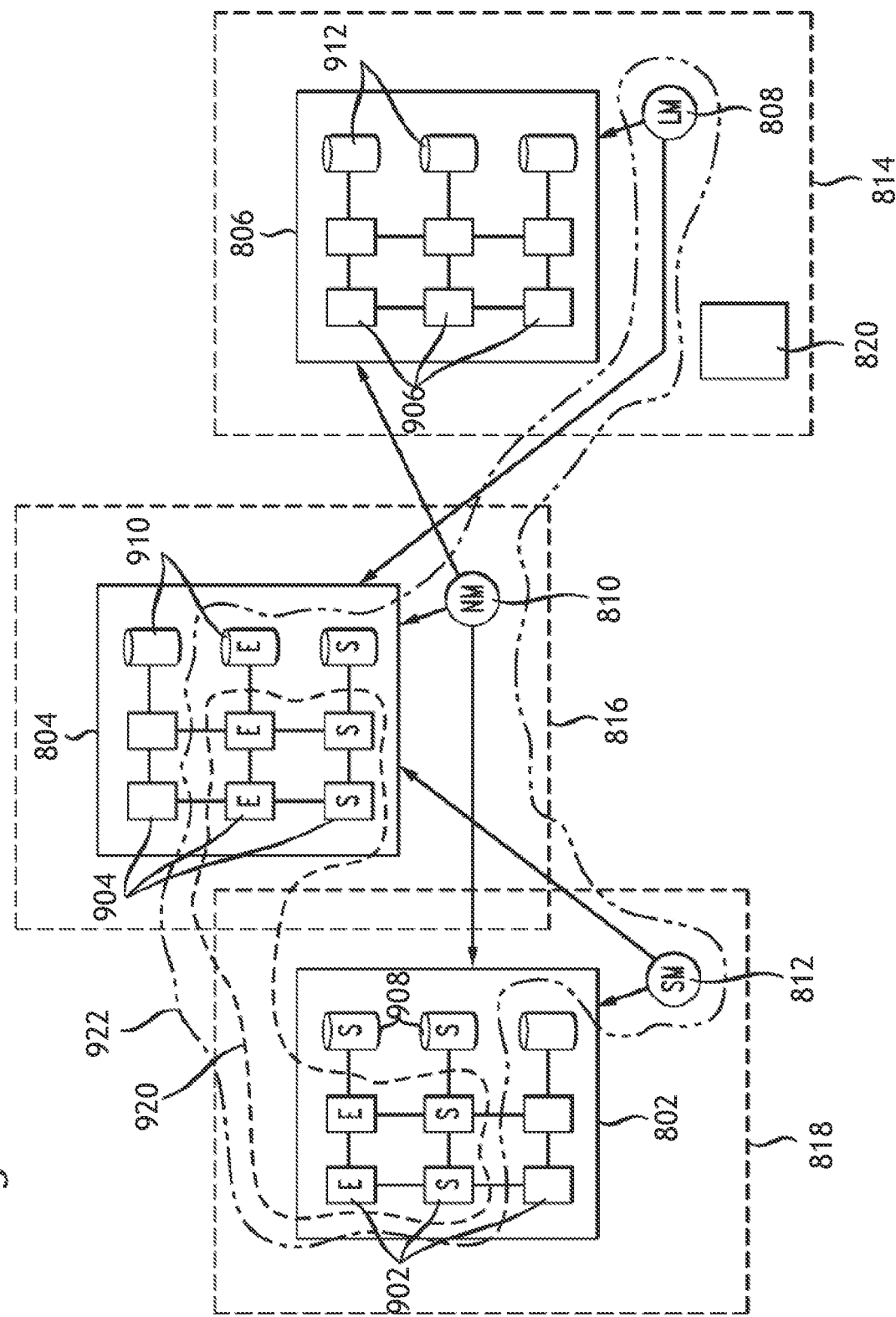
FIG. 9 illustrates an embodiment of the present invention.

FIG. 9 illustrates in more detail the example arrangement of three clusters 818, 816 and 814. In this figure, block 818 includes a group of compute nodes 912 and other compute resources 908 organized as a cluster 802. Block 816 includes compute nodes 904 and resources 910 organized as cluster 804. Block 814 includes compute nodes 906 and resources 912 in cluster 806.

Figure 10:
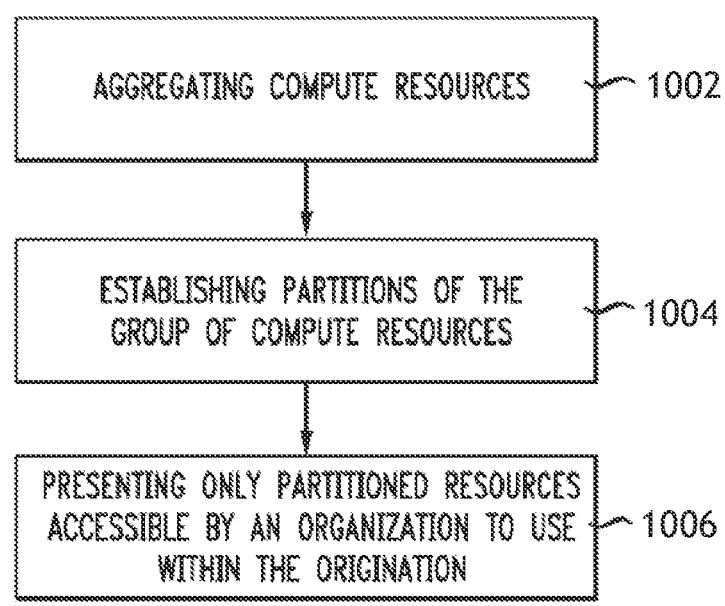
FIG. 10 illustrates a method embodiment of the invention.

One embodiment of the invention is a method of creating a virtual private cluster. The basic method steps are set forth in FIG. 10 and these will be discussed with further reference to FIG. 9. The method comprises first aggregating compute resources 1002. This step may comprise two levels, a first level of aggregating multiple resources of the same type and a second level of aggregating resources of distinct types. Aggregating multiple resources of the same type would typically indicate pulling together compute hosts that are possibly connected across multiple networks (or clusters) and aggregating those as though they were one giant cluster. FIG. 9 illustrates this step by aggregating some compute nodes from cluster 802 and some compute nodes from cluster 804. The aggregation is shown as feature 920, The second type of aggregating involving resources of various types. For example, this second type may involve aggregating compute resources together with network resources, application or license management resources and storage management resources. This aggregation of a plurality of types of compute resources is illustrated as feature 922. Other distinct compute resources may also be aggregated in addition to those illustrated.

The method next comprises establishing partitions of the group of compute resources to fairly distribute available compute resources amongst a plurality of organizations 1004 and presenting only partitioned resources accessible by each organization to users within each organization 1006, wherein the resources presented to each is the virtual private cluster. FIG. 9 shows that the sales organization "S" is partitioned with particular nodes and compute resources and the engineering organization "E" is assigned various nodes and compute resources. These span blocks 818 and 816 and span different clusters. In this manner, aggregating, partitioning and presenting to a user only their soft partitioned resources enables a more efficient use of the combined group of compute resources or clusters and is also transparent to the user while providing the desired level of control over the virtual private cluster to the user.

There are several aspects to aggregation. FIG. 9 illustrates an aggregation of a portion of the compute resources within blocks 814, 816 and 818. Another approach to aggregation involves aggregating all of the compute resources in the clusters 814, 816 and 818. In this case feature 920 would cover all of the compute resources and feature 922 would envelop all the compute resources including the storage manager 812, the network manager 810 and the license manager 808. The preferred approach would depend on the requirements for the resulting virtual private clusters.

Basically, any other type of resource could be controlled under any type of service middleware in a cluster space. The aggregation process generates a giant virtual cluster spanning all resources of all types. The giant virtual cluster is partitioned into a plurality of smaller sub-clusters. One aspect of the partitioning process involves partitioning based on organizational needs. These needs can be dynamic in that they can change over time and can change in terms of space and resources. They can also change according to environmental factors such as current load, quality of service, guarantees and a number of other factors. For example, a dynamic policy may be rigidly dynamic in time, or vary the same way in time, such as on Monday and Wednesday only. The policies can also be dynamic based on a load or backlog. There are many different ways in which policies can be established for creating partitions for virtual private clusters.

An important aspect of presenting the partition to each organization relates to organizing the partition so that users within each individual organization cannot tell that there is any other consumer any other load or any other resources outside of their own virtual partition. In other words, they only see inside their partition. In this regard, users only see their own jobs, their own historical information, their own resources, their own credentials, users, groups, classes, etc. This approach gives users a feeling of complete control, that they're in their own virtual environment and the policies that affect the site and the changes of that partition over time do not impact the user in their decisions. With this model, companies can have a single IT team manage a single compute resource for all parties and all that would be needed on a per organization basis is basically a single account manager or champion manager that would make certain that what was needed by each organization within the company was guaranteed within the scope of the virtual cluster partitioning policies.

The process of establishing partitions may further comprise establishing partitions of resources, workloads, policies/services and statistics. These are some of the main factors used in determining the structure of the various partitions for each of the virtual private clusters that are created out of the large aggregated cluster or grid. Other factors are also contemplated which may be the basis for partitioning decisions, such as based at least in part on accessibility credentials. Inside each partition exists a particular quality of service and groups of services are established within each virtual private cluster. Services such as the ability to pre-empt jobs, restart jobs and so forth are services that may be established with each partition.

A graphical user interface for generating virtual private clusters is also provided. The virtual private cluster would be generated by an IT manager or other user with a computer interface. The user would insure that the policies for the various organizations in the company were configured such that guarantees were made and that the needs of each individual organization were satisfied. That's interface would be with some of the software, the graphical interface a cluster manager which gives you the policies to manage the virtual partitioning.

There is no specific hardware layout necessary to accomplish virtual private clusters. Any desired model will work. For example, if one wanted these compute clusters to actually be distributed geographically, that invention would operate in the same manner across the distributed network. There may be some losses introduced and there may be difficulties associated with the management of the clusters for a single IT term. However, the concepts are the same. Because of these downsides, it is preferable to aggregate the hardware at a single location and have them virtually partitioned so that they look like they are independently available to the scattered end users. The present invention works according to either model but the recommended model would be to be geographically aggregate to take the benefits of scale.

The preferable programming language for the present invention is c code but there is no requirement for any specific language. The cluster manager that performs the operations of aggregation, partitioning and presenting would run on a server and would communicate with client modules on the various nodes within each cluster. The cluster manager would actually run on a single server or additional service, a fallback server enabled, but the way it talks is it talks to various services the services actually aggregate the information from the cluster and make it available over the network so it does not necessarily have to have its own client but it uses these clusters' peer services so whether the peer services are aggregated or distributed doesn't matter. It pulls it in over the network.

The interfaces allow the cluster manager to communicate natively with the various nodes in the clusters using the appropriate protocols. For example, the cluster manager uses SQL if it is communicating directly to databases. The cluster manager can communicate with any of the propriety resource manager interfaces including load leveler PBS, TORQUE, LSF, SGE and others. In addition it can also speak basic flat text the department of energy SSS, XML-based resource management specification. It can communicate with Ganglia natively. Basically every major protocol that is available in resource management is already speaks and is able to pull information from those nodes or services to perform the steps of the present invention. Those of skill in the art will understand these various protocols and interfaces. Therefore, no further details are provided herein.

An important aspect of dynamic partitioning is that as the partitioned virtual private cluster reflected by the system to each individual user is not a static partition. The partition boundaries will be based upon resource lines but they can change over time according to a fixed calendar schedule or they can change according to load based on needs. For example, if a particular organization needs additional resources it can actually vary the partition boundaries by dynamically modifying them according to the load. This modification is within the constraints of various policies. In addition, an administrator can step in and directly adjust either the calendar or the partition boundaries manually. Other factors can be incorporated into the policy to make certain decisions on when and where these partition boundaries or how their adjusted.

When it comes to reflecting the cluster to the end user, the cluster manager partitions not only according to a block of resources but also according to workload. All current and historic workload is analyzed and their use is returned on a per cluster basis. Thus, marketing or sales would only see jobs submitted by their own department and only have historical information on that. Each department would only be able to get start time estimates for jobs within their environment for resources within their environment. In addition, this virtual partitioning also constrains the resources the credentials that are displayed if there are a number of users or groups, or a number of qualities of service that are set up and configured to enable these users to have special services. Only the services or the credentials that are defined within their partition are reflected and shown out to them and so only those are the ones that they can reflect from, configure, check statistics on and so forth.

The definition of a cluster is varied within the industry but commonly it is used to denote a collection of compute resources under a single administrative domain. In most cases they are also within a single user space and single data space although that is not always the case. As used herein, the term cluster is broadly defined as anything that has a single administrative domain, a single group of policies and a single group of prioritizations. With the present invention, the creation of a virtual private cluster enables one to set up any number of virtual private clusters within a larger single aggregate cluster where each of them has their own set of distinct prioritizations, policies, rules, etc. That is the definition most sites would use as a grid so any place you have a multi-administration domain may be defined in this way.

What one achieves is a grid in a box using the principles of the present invention in that every group is able to set up their environment the way they want it, run independently and share workload across clusters and inside this space. It differs from a standard definition of a grid which typically involves pulling together geographically distributed resources under no centralized control. This model differs in that you have a centralized place of control but that centralized place of control is transparent to all the users and the account managers within the system only see their own private grid. They are not aware of the fact that the resources available within their grid are actually being modified and adjusted to meet a larger set of policy needs.

One of the unique aspects of this invention is the way in which it aggregates. The cluster manager has the ability to aggregate resources using multiple interfaces so its actually able to talk to multiple distinct services. Some of the key issues that it must handle in aggregating these resources is not only speaking to multiple APIs (application programming interfaces) or the various interfaces of any type. The cluster manager has to be able to speak all those interfaces, retrieve data related to each of those interfaces and correlate the data. That is another distinct issue is correlating conflicts in data, filling in holes of missing data. In addition to aggregating the data from those multiple sources and correlating the data and determining a resulting state, the present invention also uses the same interface to distribute its functionality across multiple services, and it is able to do that allowing a site or an administrator to actually assign various services and various pieces of control. The cluster manager may assign an allocation manager responsibility of reconfiguring a node while it talks to a queue manager for launching jobs in parallel across the system. Therefore, the ability of differentiating the required services that are needed to manage such a cluster amongst multiple services is valuable.

In experiments, the inventor set up a Portable Batch System (PBS) system, a standard resource manager which pulls in information about the state of the nodes allows you to also submit jobs, query the jobs, launch the jobs and manage the jobs. A shortcoming of that approach is the fact that it does not provide very accurate or very complete pieces of resource information. In the experiment, the particular lab setup was used to introduce the Ganglia service (which is a node monitor which allows an IT manager to see a lot more information about the node). A multiple resource manager configuration was set up to pull in basically everything PBS knows about the jobs and about the compute nodes and then on top of that the inventor (wed ayed the information available from Ganglia giving a more complete view including network load information, network traffic, IO, traffic swap activity and the like. This information is important for making good scheduling decisions that are not available through a standard resource manager. In addition to that, the system enables one to connect the cluster manager to Red Carpet or some other provisioning system. Those of skill in the art will understand the operation of the Red Carpet software in this space. This allows one to analyze workload that is coming in through PBS and view all the load metrics that are coming in from Ganglia. If it is determined that the load is such that the cluster is not properly configured to optimally meet customer needs, the IT manager or the system automatically can communicate with Red Carpet to change the configuration of this or that node such that it has the operating system or the applications that are needed by these jobs that are coming in through PBS. Then as the node(s) reboots, the information that is available from PBS is no longer valid because the node is off line, the PBS services are dead but the cluster manager does not care because it has alternate sources of information about state. The duster manager can use that information, continue to proceed with the understanding that the node is in fact being re-provisioned and rebuilt. Everything works properly and stays on track and the cluster manager can schedule the workload onto this newly installed node as soon as it becomes available.

There are several benefits to virtual clustering. One benefit is the aggregation which results in reduced cost in hardware, staffing, and fewer points of failure. Another benefit lies with the ability to specify the true partitioning boundaries along the lines of what users really care about without over specifying which is required by other systems where one again fragments the resources. With the dynamic partition one is able to load balance across the clusters while still providing a view as if they were independent and distinct to end users.

While load balancing is commonly used, the present invention is distinct in that it provides is load balancing with absolute guarantees (providing the resources do not fail). It guarantees resource availability to various organizations allowing them to have high levels of confidence that they can meet their deadlines and their objectives.

Although the exemplary environment described herein employs the hard disk, it should be appreciated by those skilled in the art that other types of computer readable media which can store data that is accessible by a computer, such as magnetic cassettes, flash memory cards, digital video disks, memory cartridges, random access memories (RAMs) read only memory (ROM), and the like, may also be used in the exemplary operating environment. The system above provides an example server or computing device that may be utilized and networked with a cluster, clusters or a grid to manage the resources according to the principles set forth herein. It is also recognized that other hardware configurations may be developed in the future upon which the method may be operable.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. As can also be appreciated, the compute environment itself, being managed according to the principles of the invention, may be an embodiment of the invention. Thus, separate embodiments may include an on-demand compute environment, a local compute environment, both of these environments together as a more general compute environment, and so forth. In a distributed computing environment, program modules may be located in both local and remote memory storage devices. Accordingly, the scope of the claims should be governed by the claims and their equivalents below rather than by any particular example in the specification.

What is claimed is:

1. A method of operating a compute environment comprising a plurality of resources so as to provide a plurality of logically independent clusters to respective ones of a plurality of users or organizations, the method comprising:

identifying a plurality of resource requirements associated with respective ones of the plurality of users or organizations;

causing partitioning of at least part of the plurality of resources based at least on the identified plurality of resource requirements, the partitioning enabling allocation of respective portions of the at least part of the plurality of resources to only the respective plurality of users or organizations for use thereby as a logically independent cluster such that each of the respective plurality of users or organizations have dedicated access to the respective portions of the at least part of the plurality of resources portioned therefor; and presenting each of the plurality of users or organizations with respective access to only one or more aspects of the logically independent cluster allocated thereto, the presenting comprising (i) presenting only one or more first services which the respective user or organization utilizes or has utilized for processing of workload, and (ii) selectively excluding presentation of one or more second services which do not relate to the logically independent cluster of the respective user or organization.

2. The method of claim 1, wherein:

the compute environment comprises one or more commonly managed clusters, each of the one or more clusters comprising a plurality of compute nodes; and each of the plurality of users or organizations are separately or independently managed.

3. The method of claim 2, further comprising:

receiving data indicative of one or more changes to at least one of the identified plurality of resource requirements; and based at least on the received data, dynamically varying the allocation of at least one of the respective portions to accommodate the one or more changes.

4. The method of claim 3, wherein the one or more changes comprise changes to one or more quality of service or service level requirements.

5. The method of claim 1, wherein:

the identifying the plurality of resource requirements associated with each of the respective ones of the plurality of users or organizations comprises identifying at least one quality of service (QOS) or service level requirement associated with at least one of the plurality of users or organizations; and the causing partitioning of at least part of the plurality of resources based at least on the identified plurality of resource requirements comprises causing partitioning so as to ensure the at least one QoS or service level requirement is at least met.

6. The method of claim 1, wherein the presenting each of the plurality of users or organizations with respective access to only one or more aspects of the logically independent cluster allocated thereto, comprises presentation of only resources which the respective user or organization may utilize for processing of workload.

7. The method of claim 1, wherein the presenting each of the plurality of users or organizations with respective access to only one or more aspects of the logically independent cluster allocated thereto, comprises presentation of only jobs or workload submitted by the respective user or organization.

8. The method of claim 1, wherein the presenting each of the plurality of users or organizations with respective access to only one or more aspects of the logically independent cluster allocated thereto, comprises presentation of only one or more users or user credentials for the respective user or organization.

9. The method of claim 1, wherein at least one of (i) the identifying a plurality of resource requirements associated with each of the respective ones of the plurality of users or organizations, or (ii) causing partitioning of at least part of the plurality of resources based at least on the identified plurality of resource requirements, comprises implementing at least one respective partitioning policy for each of the respective ones of the plurality of users or organizations.

10. The method of claim 1, further comprising:
monitoring one or more conditions; and
based at least on the monitoring, dynamically varying the allocation of at least one of the respective portions.

11. The method of claim 10, wherein the dynamically varying the allocation of at least one of the respective portions comprises dynamically varying in accordance with one or more virtual cluster-specific or user-specific policies.

12. The method of claim 10, wherein the dynamically varying the allocation of at least one of the respective portions comprises dynamically varying in accordance with one or more policies applicable to an entirety of the compute environment.

13. The method of claim 10, wherein the one or more conditions comprise a then-current load on at least one of (i) the compute environment, or (ii) the one or more logically independent clusters.

14. The method of claim 10, wherein the one or more conditions comprises a temporal condition or state.

15. The method of claim 14, wherein the temporal condition or state comprises one of (i) a guaranteed or required response time for processing of workload, or (ii) a particular calendared event.

16. A method of providing virtual compute clusters to respective ones of a plurality of users using one or more commonly managed compute environments, the method comprising:
identifying a plurality of resource requirements associated with respective ones of the plurality of users; and
causing partitioning of resources of the one or more commonly managed compute environments based at least on the identified plurality of resource requirements thereby generating respective partitions, the partitioning enabling allocation of respective portions of the resources to the respective plurality of users for concurrent use thereby as respective virtual compute clusters, wherein each of the respective plurality of users have exclusive access to the respective portions of the resources partitioned therefor; and
wherein the partitioning is performed so as to (i) at least provide at least some of the plurality of users with guaranteed availability of resources allocated to their respective virtual compute cluster for at least a period of time, and (ii) allow modification of the resources in support of one or more policies affecting both a) the at least some of the plurality of users and b) other users not part of the plurality of users, the modification being transparent to the at least some of the plurality of users.

17. The method of claim 16, wherein the sharing of at least some of the resources by two or more of the plurality of users comprises sharing which is dynamically modified as a function of at least one of a) time, or b) load on at least one of the virtual compute clusters.

18. The method of claim 16, further comprising providing load-balancing between at least two of the virtual compute clusters, the providing load-balancing between at least two of the virtual compute clusters comprises providing the load-balancing between at least two of the at least some of the plurality of users having guaranteed resource availability.

19. The method of claim 16, wherein the guaranteed resource availability is sufficient to at least meet the plurality of resource requirements associated with the at least some of the plurality of users.

20. The method of claim 16, wherein:
the one or more commonly managed compute environments comprise two or more commonly managed compute environments;
the partitioning is further performed so as to at least reduce over-specification of resources of the two or more commonly managed compute environments for workload, relative to a non-virtual clustered environment; and
the at least reduction of the over-specification of resources increases an efficiency of resource utilization within the two or more commonly managed compute environments.

21. A method of operating a compute environment comprising a plurality of resources so as to provide a plurality of logically independent clusters to respective ones of a plurality of users or organizations, the method comprising:
identifying a plurality of resource requirements associated with respective ones of the plurality of users or organizations;
causing partitioning of at least part of the plurality of resources based at least on the identified plurality of resource requirements, the partitioning enabling allocation of respective portions of the at least part of the plurality of resources to the respective plurality of users or organizations for use thereby as a logically independent cluster; and
presenting each of the plurality of users or organizations with respective access to only one or more aspects of the logically independent cluster allocated thereto, wherein the access comprises at least exclusive control of particular resources associated with the logically independent cluster, the one or more aspects of the logically independent cluster relating to one more particular services associated with a particular department of an organization or company.

22. The method of claim 21, further comprising varying the partition boundaries.

23. A commonly managed compute environment configured for provision of a plurality of virtual private clusters, comprising:
a plurality of resources, at least some of the resources which may be shared by two or more users of the commonly managed compute environment; and
at least one computerized management process in data communication with the plurality of resources and comprising computerized logic configured to, when executed:
access data identifying two or more requirements for resources associated with respective ones of the two or more users;
aggregate portions of the plurality of resources associated with respective ones of services via utilization of respective ones of a plurality of APIs (application programming interfaces) associated with the respective ones of services, the aggregation comprising (i) retrieval, via at least data communication with each of the plurality of APIs, of data related to each of the plurality of APIs and (ii) correlation of at least portions of the data related to each of the plurality of APIs with other portions of the data related to each of the plurality of APIs;

cause partitioning of the aggregated portions of the plurality of resources based at least on the identified two or more requirements for resources, the partitioning comprising allocation of two or more respective portions of the plurality of resources to the respective two or more users for concurrent and exclusive use thereby as respective virtual compute clusters; and thereafter, based at least on second data received by the computerized management process, the second data regarding one or more monitored parameters, cause dynamic modification of the partitioning to generate two or more new respective portions of the plurality of resources for allocation to the respective two or more users, at least one of the two or more new respective portions comprising at least some different ones of the plurality of resources.

24. The commonly managed compute environment of claim 23, wherein the computerized logic is further configured to, when executed:

receive policy data relating to respective one or more resource usage policies associated with respective ones of the two or more users; and utilize at least a portion of the received policy data in performance of at least one of (i) the partitioning of the plurality of resources, or (ii) the dynamic modification of the partitioning.

25. The commonly managed compute environment of claim 23, wherein:

at least one of (i) the partitioning of the plurality of resources, or (ii) the dynamic modification of the partitioning, is configured to obey or meet the at least one QoS or service level requirement.

26. The commonly managed compute environment of claim 23, wherein the one or more monitored parameters comprise at least one of: (i) then-current load on at least a portion of the commonly managed compute environment, or (ii) a predicted future load on at least a portion of the commonly managed compute environment.

27. The commonly managed compute environment of claim 23, wherein the one or more monitored parameters comprises a backlog of workload associated with one or more users of the commonly managed compute environment.

28. The commonly managed compute environment of claim 27, wherein the allocation of two or more respective portions of the plurality of resources to the respective two or more users for concurrent use thereby as respective virtual compute clusters comprises allocation only if a threshold for the backlog of the workload is exceeded for workloads with higher priority than other workloads.

29. The commonly managed compute environment of claim 23, wherein:

the plurality of resources comprises a plurality of compute nodes or hosts; and the allocation of two or more respective portions of the plurality of resources to the respective two or more users for concurrent use thereby as respective virtual compute clusters comprises aggregation of at least two of the compute nodes or hosts that are in data communication with one another over an existing network connection into at least one of the virtual compute clusters.

30. The commonly managed compute environment of claim 29, wherein:

the plurality of resources further comprises at least one of: a) one or more network resources, or b) one or more data storage management resources; and the allocation of two or more respective portions of the plurality of resources to the respective two or more users for concurrent use thereby as respective virtual compute clusters comprises aggregation of the at least one of a) or b) together with the at least one of the virtual compute clusters.

31. The commonly managed compute environment of claim 23, wherein:

the one or more monitored parameters comprises a failure of a node of one of the respective virtual compute clusters; and the allocation of two or more respective portions of the plurality of resources to the respective two or more users for concurrent use thereby as respective virtual compute clusters comprises allocation based at least on the failure.

32. The commonly managed compute environment of claim 23, wherein:

the one or more monitored parameters comprises a license becoming unavailable; and the allocation of two or more respective portions of the plurality of resources to the respective two or more users for concurrent use thereby as respective virtual compute clusters comprises allocation based at least on the license becoming unavailable.

* * * * *